(12) United States Patent
Nerad

(10) Patent No.: US 9,718,975 B2
(45) Date of Patent: Aug. 1, 2017

(54) RADIATION CURABLE INK COMPOSITION

(71) Applicant: 3M INNOVATIVE PROPERTIES COMPANY, St. Paul, MN (US)

(72) Inventor: Bruce A. Nerad, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/431,203

(22) PCT Filed: Mar. 20, 2013

(86) PCT No.: PCT/US2013/033039
§ 371 (c)(1),
(2) Date: Mar. 25, 2015

(87) PCT Pub. No.: WO2014/051702
PCT Pub. Date: Apr. 3, 2014

(65) Prior Publication Data
US 2015/0252202 A1    Sep. 10, 2015

Related U.S. Application Data

(60) Provisional application No. 61/705,441, filed on Sep. 25, 2012, provisional application No. 61/772,408, filed on Mar. 4, 2013.

(51) Int. Cl.
| | | |
|---|---|---|
| *C09D 11/107* | (2014.01) | |
| *C09D 11/30* | (2014.01) | |
| *C08F 2/50* | (2006.01) | |
| *C09D 11/101* | (2014.01) | |
| *C09D 11/322* | (2014.01) | |

(52) U.S. Cl.
CPC ............... *C09D 11/30* (2013.01); *C08F 2/50* (2013.01); *C09D 11/101* (2013.01); *C09D 11/107* (2013.01); *C09D 11/322* (2013.01)

(58) Field of Classification Search
CPC .............................. C09D 11/30; C09D 11/107
See application file for complete search history.

(56) References Cited

U.S. PATENT DOCUMENTS

| 7,037,952 B2 | 5/2006 | Itoh |
| 7,264,330 B2 | 9/2007 | Itoh |
| 8,053,169 B2 | 11/2011 | Ohnishi |
| 8,133,935 B2 | 3/2012 | Ward et al. |
| 8,211,508 B2 | 7/2012 | Hayata |
| 2002/0086914 A1 | 7/2002 | Lee |
| 2005/0191440 A1* | 9/2005 | Sen ................. B41M 5/52 428/32.3 |
| 2006/0211788 A1* | 9/2006 | Krohn ............. C09D 11/101 522/178 |
| 2009/0197988 A1 | 8/2009 | Kito |
| 2010/0075119 A1 | 3/2010 | Ohnishi |
| 2010/0080926 A1 | 4/2010 | Oshima |
| 2010/0239779 A1 | 9/2010 | Oshima |
| 2011/0230582 A1* | 9/2011 | Kito ................. C09D 11/101 522/39 |
| 2012/0083545 A1 | 4/2012 | Kida |

FOREIGN PATENT DOCUMENTS

JP    2004-131725    4/2004

OTHER PUBLICATIONS

Chimassorb 944 MSDS, Ciba Specialty Chemicals Corporation, Jun. 7, 2005.*
TINUVIN 144 MSDS, BASF, Feb. 24, 2014.*
International Search Report for PCT International Application No. PCT/2013/33039, mailed on Jul. 10, 2013, 10pgs.

* cited by examiner

*Primary Examiner* — Michael Pepitone
(74) *Attorney, Agent, or Firm* — Philip Y. Dahl; Brian Whipps; Sandra K. Nowak

(57) ABSTRACT

A radiation curable ink composition includes a first 2,2,6, 6-tetramethylpiperidinyl compound. The first 2,2,6,6-tetramethylpiperidinyl compound is present in the radiation curable ink composition at a concentration above 0.5 wt %. A hindered amine group of the first 2,2,6,6-tetramethylpiperidinyl compound is substituted with only carbon or hydrogen and is a solid at 20 degrees centigrade and does not include carbon to carbon double bonds.

5 Claims, 2 Drawing Sheets

RADIATION CURABLE INK COMPOSITION

CROSS REFERENCE TO RELATED APPLICATIONS

This application is a national stage filing under 35 U.S.C. 371 of PCT/US2013/033039, filed Mar. 20, 2013, which claims priority to U.S. Application No. 61/705,441, filed Sep. 25, 2012 and U.S. Application No. 61/772,408, filed Mar. 4, 2013, the disclosure of which is incorporated by reference in its/their entirety herein.

FIELD

The disclosure relates to radiation curable ink compositions and, in particular, to radiation curable ink compositions that are durable and useful for outdoor print applications.

BACKGROUND

Inkjet imaging techniques are popular in commercial and consumer applications. Ink jet printers operate generally by ejecting ink onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers can print on films that can be used in high flexibility and high stretch applications with outdoor durability, such as car wrap films for example.

Thermal ink jet printers and piezo inkjet printers are two main types of ink jet systems in use today. For both approaches, inks must meet performance requirements in order for the inks to be appropriately jettable and for the resultant printed features to have the desired mechanical, chemical, visual, and durability characteristics. In particular, inks must have relatively low viscosity when jetted, yet must be able to form accurate, durable images on the desired receiving substrate. For example, a typical ink for thermal ink jetting must typically have a viscosity in the range of 3 to 5 centipoise at 25° C., while piezo inks must typically have a viscosity in the range of 3 to 30 centipoise at the jetting temperature. The need to use low viscosity inks makes it challenging to obtain printed features with good mechanical, chemical, visual, and durability characteristics.

In order to avoid using a conventional solvent, ink compositions incorporating a free radically polymerizable diluent have been developed. The diluent not only functions as a solvent, but also functions as a viscosity reducer, as a binder when cured, and optionally as a crosslinking agent. In the uncured state, these compositions have a low viscosity and are readily jetted. However, the polymerizable monomers readily crosslink upon exposure to a suitable source of curing energy, e.g., ultraviolet light, electron beam energy, and/or the like, to form a crosslinked polymer network. Depending upon the kind of monomers incorporated into the diluent, the resultant network may provide the printed features with durability, flexibility, elasticity, gloss, hardness, chemical resistance, stiffness, combinations of these, and the like.

Conventional inks formed from radiation polymerizable monomers have some drawbacks. First, printed features formed from these materials might have a tendency to shrink when cured. Further, the adhesion, weatherability, resilience, toughness, flexibility, dot gain, and the like also may not be as good as is desired, particularly for outdoor signage and car wrap applications.

BRIEF SUMMARY

The disclosure relates to radiation curable ink compositions and, in particular, to radiation curable ink compositions that are durable and useful for outdoor print applications, among other aspects.

In many embodiments a radiation curable ink composition includes a first 2,2,6,6-tetramethylpiperidinyl compound. The first 2,2,6,6-tetramethylpiperidinyl compound is present in the radiation curable ink composition at a concentration above 0.5 wt %. A hindered amine group of the first 2,2,6,6-tetramethylpiperidinyl compound is substituted with only carbon or hydrogen and is a solid at 20 degrees centigrade and does not include carbon to carbon double bonds.

In further embodiments, a radiation curable ink composition includes a colorant, and a difunctional reactant. The difunctional reactant in a range from 0.05 to 0.21 moles of difunctional reactant per kilogram of radiation curable ink composition. The radiation curable ink composition has a calculated glass transition temperature in a range from 20 degrees centigrade to 45 degrees centigrade.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
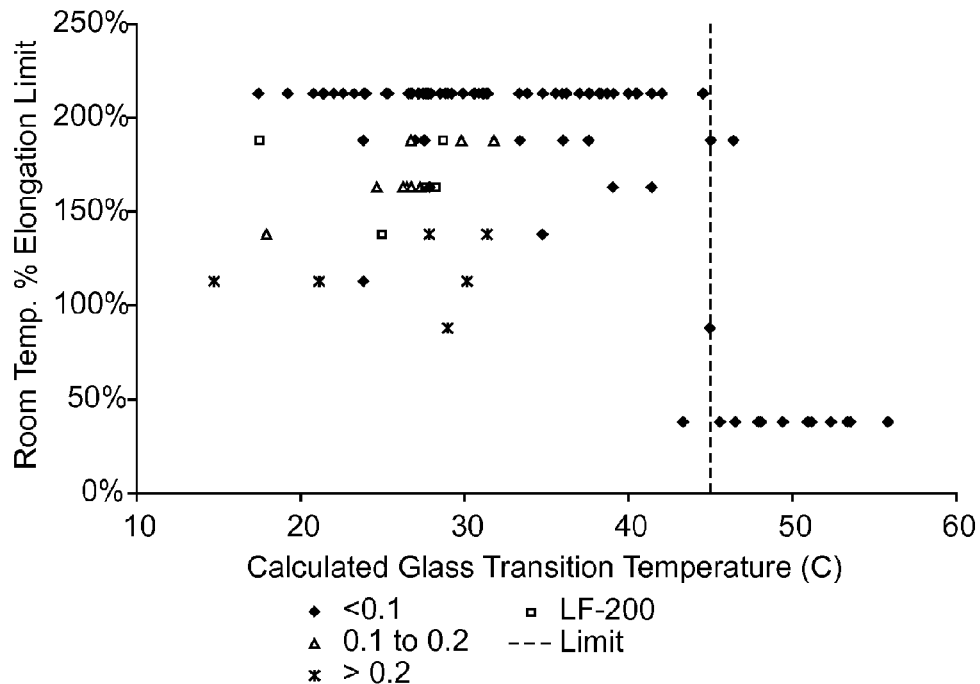
FIG. 1 is a graph of the room temperature percent elongation limits determined by the stretch-then-heat test plotted against the calculated glass transition temperature of Examples shown in Table 4.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The present disclosure describes relates to radiation curable ink compositions and, in particular, to radiation curable ink compositions that are durable and useful for outdoor applications, among other aspects. These radiation curable ink compositions have to strike a balance of a number of competing properties to perform as desired. Once printed it is desired that the ink not be tacky, be able to be stretched or elongated (with or without heat) a certain % and not crack. These printed inks also should be durable and be able to withstand the outdoor elements for an extended period of time. While the present disclosure is not so limited, an appreciation of various aspects of the disclosure will be gained through a discussion of the examples provided below.

The phrase "radiation curable" refers to functionality directly or indirectly pendant from a monomer, oligomer, or polymer backbone (as the case may be) that participate in crosslinking reactions upon exposure to a suitable source of curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. In many embodiments, free radically polymerizable groups are included. Of these, (meth)acryl moieties are preferred. The term "(meth)acryl", as used herein, encompasses acryl and/or methacryl.

The energy source used for achieving crosslinking of the radiation curable functionality may be actinic (e.g., radiation having a wavelength in the ultraviolet or visible region of the spectrum), accelerated particles (e.g., electron beam radiation), thermal (e.g., heat or infrared radiation), or the like. The energy can be actinic radiation or accelerated particles, as such energy provides excellent control over the initiation and rate of crosslinking.

Additionally, actinic radiation and accelerated particles can be used for curing at relatively low temperatures. This avoids degrading components that might be sensitive to the relatively high temperatures that might be required to initiate crosslinking of the radiation curable groups when using thermal curing techniques. Suitable sources of actinic radiation include mercury lamps, xenon lamps, carbon arc lamps, tungsten filament lamps, lasers, electron beam energy, sunlight, UVLEDs and the like. In many embodiments, ultraviolet radiation, especially from medium pressure mercury lamps or UVLEDs, is utilized.

A preferred radiation curable ink composition is one where the ink contains a first 2,2,6,6-tetramethylpiperidinyl compound at a concentration above 0.5 wt %. In many embodiments, the 2,2,6,6-tetramethylpiperidinyl compound include a carbon or hydrogen atom attached to the hindered nitrogen of the 2,2,6,6-tetramethylpiperidinyl group. In many embodiments, 2,2,6,6-tetramethylpiperidinyl compounds include a carbon or hydrogen atom attached to the hindered nitrogen of the 2,2,6,6-tetramethylpiperidinyl group and which are a solid at room temperature (i.e., 20 degrees centigrade). In many embodiments, the 2,2,6,6-tetramethylpiperidinyl compound includes a carbon or hydrogen atom attached to the hindered nitrogen of the 2,2,6,6-tetramethylpiperidinyl group and: 1) a solid at room temperature; and 2) free from carbon-carbon-double bonds. In further embodiments, the 2,2,6,6-tetramethylpiperidinyl compound includes a carbon or hydrogen atom attached to the hindered nitrogen of the 2,2,6,6-tetramethylpiperidinyl group and is: 1) are a solid at room temperature; 2) are free from carbon-carbon-double bonds; and 3) contain, on average, two or more 2,2,6,6-tetramethylpiperidinyl groups, or three or more 2,2,6,6-tetramethylpiperidinyl groups, or five or more 2,2,6,6-tetramethylpiperidinyl groups. Exemplary radiation curable ink includes 2,2,6,6-tetramethylpiperidinyl compounds and containing predominately a carbon atom attached to the hindered nitrogen.

One exemplary 2,2,6,6-tetramethylpiperidinyl compound is bis(1,2,2,6,6-pentamethyl-4-piperidinyl)-[[3,5-bis(1,1-dimethylethyl)-4-hydroxyphenyl]methyl]butylmalonate (i.e., Tinuvin 144).

A preferred range of total 2,2,6,6-tetramethylpiperidinyl compounds in the radiation curable ink is from 0.5 to 15 wt %, or from 0.5 to 7 wt %, or from 1 to 3 wt %. 2,2,6,6-tetramethylpiperidinyl compounds (many of which are conventionally known as hindered amine light stabilizers—HALS) are known to provide improved durability to printed inks and films by serving as free radical scavengers during use and or storage of the film or printed ink especially in outdoor environments. Surprisingly we have found that some 2,2,6,6-tetramethylpiperidinyl compounds can actually provide better apparent cure (reduced tack) of cured inks despite the fact that one would expect their free radical scavenging properties to interfere with the ink curing process. We have further found that some classes of the 2,2,6,6-tetramethylpiperidinyl compounds are preferred with some colorants due to the potential negative effects of other classes of 2,2,6,6-tetramethylpiperidinyl compounds on pigment dispersion stability.

FIG. 1 is a graph of the room temperature percent elongation limits determined by the stretch-then-heat test plotted against the calculated glass transition temperature in FIG. 1 for the examples in Table 4 below. The minimum and maximum values of the room temperature percent elongation limit are 38% and 213%. The data in FIG. 1 shows a transition from a low (38%) to a high room temperature percent elongation limit occurs at approximately 45 C as indicated by the vertical dashed line. The data in FIG. 1 are from over 100 examples in which the amounts of eighteen different reactants were varied. This confirms the universality of using a calculated glass transition temperature in general and of the 45 C transition temperature in specific. It is surprising that this transition from an ink that stretches at room temperature to one that cracks occurs at a calculated glass transition temperature that is more than 20 C above room temperature.

Based on FIG. 1, preferred radiation curable inks have a calculated glass transition temperature of less than 45 C, or are in a range from 20 C to 45 C (based upon reducing tackiness off printer), or are in a range from 20 C and 38 C (based upon room temperature percent elongation limit of printed M-0516), or are in a range from 30 C and 45 C (based upon further reducing tackiness off printer), or are in a range from 30 C and 38 C.

It has been found that there is a preferred range of the number of moles of difunctional reactant per kg of ink. The stretch-then-heat percent elongation limits determined by the stretch-then-heat test are plotted against the number of moles of difunctional reactant per kg of ink in FIG. 2 for the examples in Table 4. The minimum and maximum values of the room temperature percent elongation limit are 38% and 213%. There are no data points above the dashed line in FIG. 2. This means that for a given amount of moles of difunctional reactant per kg of ink, there is a maximum obtainable stretch-then-heat percent elongation limit.

A front bumper of a vehicle can be very challenging to wrap with printed film as it can require the film being heated, annealed, and stretched for example from approximately 50% up to about 110% or from 75% up to about 110% or from approximately 100% up to 110%, depending on the bumper and application technique. From FIG. 2, a stretch-then-heat percent elongation of 100% requires that the number of moles of difunctional reactant per kg of ink is less than approximately 0.21. To provide a cushion when doing challenging car wraps, a stretch-then-heat percent elongation of 150% is preferred or that the number of moles of difunctional reactant per kg of ink is less than approximately 0.16. Having a minimum amount of moles of difunctional reactant per kg of ink furnishes a printed graphic with better handling off the printer.

It has been found that a preferred range of the number of moles of difunctional reactant per kg of ink is less than or equal to approximately 0.21, or less than or equal to approximately 0.16, or less than or equal to approximately 0.21 and greater than or equal approximately 0.05, or less than or equal to approximately 0.21 and greater than or equal approximately 0.1, or less than or equal to approximately 0.16 and greater than or equal approximately 0.1. In many useful embodiments, it is preferred to simultaneously satisfy both the calculated glass transition temperature and the number of moles of difunctional reactant per kg of ink requirements described above.

In many embodiments, the radiation curable ink composition includes a difunctional reactant in a range from 0.05 to 0.21 moles of difunctional reactant per kilogram of radiation curable ink composition. In many embodiments, the radiation curable ink composition includes a difunctional reactant in a range from 0.1 to 0.21 moles of difunctional reactant per kilogram of radiation curable ink composition. In many embodiments, the radiation curable ink composition includes a difunctional reactant in a range from 0.05 to 0.16 moles of difunctional reactant per kilogram of radiation curable ink composition. In many embodiments, the radiation curable ink composition includes a difunctional reactant in a range from 0.1 to 0.16 moles of difunctional reactant per kilogram of radiation curable ink composition.

It is preferred that a radiation curable ink composition simultaneously satisfy all three of the following conditions, 1) use of a 2,2,6,6-tetramethylpiperidinyl compound described above, 2) have a calculated glass transition temperature in the ranges described above, and 3) include a number of moles of difunctional reactant per kg of ink in the ranges described above. Using a preferred 2,2,6,6-tetramethylpiperidinyl compound enhances the cure and stability of the ink. Being in the preferred calculated glass transition temperature range provides a good balance of lower tack or reduced surface impressions on the printed image and good room temperature elongation. Being in the preferred number of moles of difunctional reactant per kg of ink range provides a good balance of high elongation when heated or annealed and lower tack or reduced surface impressions of the printed image.

Figure 3:
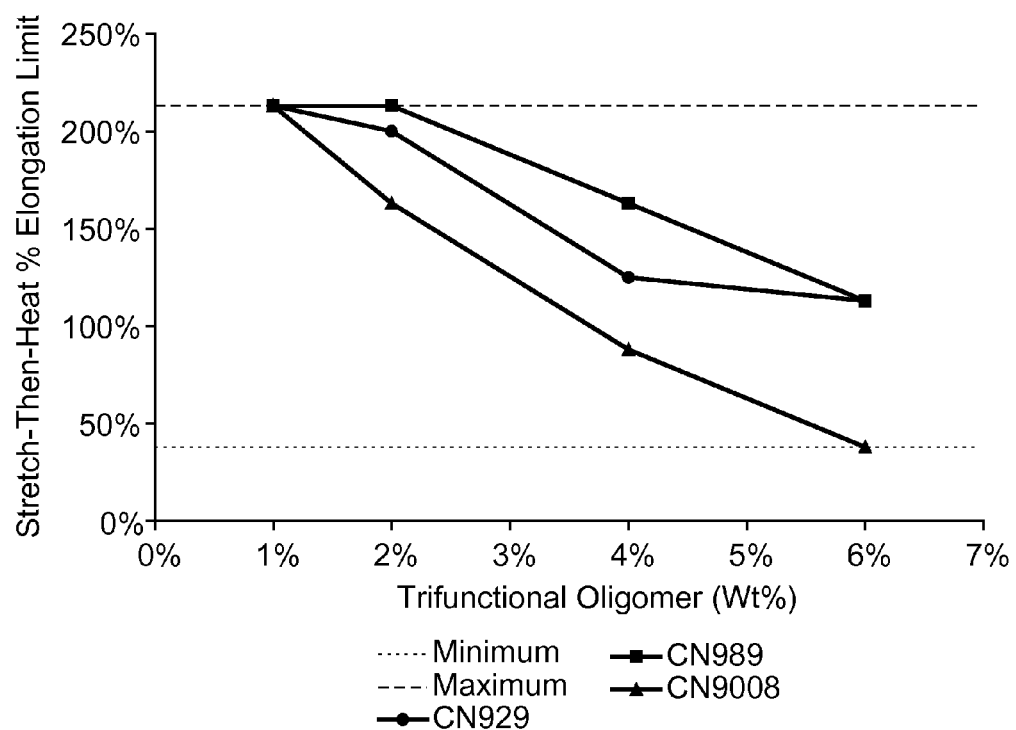
FIG. 3 is a graph of are stretch-then-heat percent elongation limit values plotted versus weight percent of trifunctional oligomer.

There is a limitation on the amount of trifunctional (or higher functionality) reactant that forms a useful radiation curable ink. The data in FIG. 3 are stretch-then-heat percent elongation limit values measured for the examples in Table 8, below. These examples contained varying amounts of one of three different trifunctional reactants. As seen in FIG. 3, as the amount of trifunctional reactants was increased, the stretch-then-heat percent elongation limit values decrease.

It is preferable to limit the amount of trifunctional reactant to 10 wt % or less. In many embodiments, the amount of trifunctional reactant is 7 wt % or less (approximate concentration where the stretch-then-heat percent elongation limit value equals 100% for the top two curves of FIG. 3). In many embodiments, the amount of trifunctional reactant is 4.5 wt % or less (approximate concentration where the stretch-then-heat percent elongation limit value equals 150% for the top curve of FIG. 3). In many embodiments, the amount of trifunctional reactant is 2 wt % or less (approximate concentration where the stretch-then-heat percent elongation limit value equals 200% for the top two curves of FIG. 3).

At times, it may be difficult to meet the viscosity target for the ink jet ink while maintaining a low number of moles of difunctional reactant per kg. In these instances it is useful to incorporate a high viscosity mono-functional reactant. In some of these embodiments, a high molecular weight, high viscosity mono-functional acrylated urethane can be utilized in the radiation curable ink composition.

In many of these embodiments, mono-functional acrylated reactants have a number average molecular weight above 500 g/mol and are free of hydroxyl-functionality. In exemplary embodiments, mono-functional acrylated reactants have a number average molecular weight above 1000 g/mol and are free of hydroxyl-functionality. In further embodiments, mono-functional acrylated reactants have a number average molecular weight above 2000 g/mol and are free of hydroxyl-functionality. Preferred mono-functional acrylated reactants are liquids at room temperature, have at viscosity at 25 C above 300 mPa*s and are free of hydroxyl-functionality. Preferred mono-functional acrylated reactants are liquids at room temperature, have at viscosity at 25 C above 1000 mPa*s and are free of hydroxyl-functionality. More preferred mono-functional acrylated reactants are liquids at room temperature, have at viscosity at 25 C above 10,000 mPa*s and are free of hydroxyl-functionality. One exemplary reactant is a mono-functional acrylated polymethacrylate. Another exemplary reactant as describe above is a mono-functional acrylated urethane. Another exemplary reactant as describe above is a mono-functional acrylated aliphatic urethane.

In some embodiments the radiation curable ink composition is substantially free of difunctional reactants. In many of these embodiments the radiation curable ink composition reactants are only monofunctional or trifunctional reactants. The examples in Table 8 (below) contain only mono and trifunctional reactants. In some of these embodiments the radiation curable ink composition reactants are only mono-functional reactants. The Table 4 (below) Examples C-0401 and Y-0407 contain monofunctional reactants only.

In some embodiments the radiation curable ink composition contains a total alkyl-substituted mono-functional acrylate content of less than 25 wt %. Examples of alkyl-substituted mono-functional acrylates include isobornyl acrylate, stearyl acrylate, lauryl acrylate, isodecyl acrylate, isooctyl acrylate, tridecyl acrylate, 2-ethylhexyl acrylate, and the like. Limiting the total alkyl-substituted mono-functional acrylate content in an ink can make the ink more "environmentally-friendly" and can aid in preventing the ink being labeled with the "dead tree/dead fish" designation in Europe. Many of the inks in Table 13 contains less than 25 wt % total alkyl-substituted mono-functional acrylate content.

Representative examples of radiation curable monomers suitable for use as the reactant include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, nonylphenol ethoxylate (meth)acrylate, isononyl (meth)acrylate, isobornyl (meth)acrylate, 2-(2-ethoxyethoxyl)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional caprolactone ester (meth)acrylate, isooctyl (meth)acrylate, hydroxyethyl (meth)acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, reactants sometimes referred to as oligo/resins as described below, combinations of these, and the like.

Suitable radiation curable oligo/resins for use in the present invention include, but are not limited to, (meth)acrylated urethanes (i.e., urethane (meth)acrylates), (meth)acrylated epoxies (i.e., epoxy(meth)acrylates), (meth)acrylated polyesters (i.e., polyester (meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

Preferred (meth)acrylated aliphatic urethanes are di(meth)acrylate esters of hydroxy terminated NCO extended aliphatic polyesters or aliphatic polyethers. (Meth)acrylated polyesters are the reaction products of (meth)acrylic acid with an aliphatic dibasic acid/aliphatic diol-based polyester. Examples of commercially available (meth)acrylated urethanes and polyesters include those known by the trade designations PHOTOMER (Henkel Corp. of Hoboken, N.J.); EBECRYL 284, 810, 4830, 8402, 1290, 1657, 1810, 2001, 2047, 230, 244, 264, 265, 270, 4833, 4835, 4842, 4866, 4883, 657, 770, 80, 81, 811, 812, 83, 830, 8301, 835, 870, 8800, 8803, 8804 (UCB Radcure Inc. of Smyrna, Ga.); SARTOMER CN series CN964 B-85, CN292, CN704, CN816, CN817, CN818, CN929, CN944B-85, CN945A-60, CN945B-85, CN953, CN961, CN962, CN963, CN 965, CN966, CN968, CN980, CN981, CN982, CN983, CN984, CN985 (Sartomer Co. of Exton, Pa.); ACTILANE (Akcross Chemicals of New Brunswick, N.J.); and UVITHANE (Morton International of Chicago, Ill.).

Preferred acrylated acrylics are acrylic oligomers or polymers that have reactive pendant or terminal (meth)acrylic acid groups capable of forming free radicals for subsequent reaction. Examples of commercially available (meth)acrylated acrylics include those known by the trade designations ELVACITE 1010, 4026, 4054 and 4059. Examples of commercially available oligo/resins dissolved in acrylate monomers include those known by the trade designation EBECRYL 745, 754, 767, 1701, and 1755 from UCB Radcure Inc., Smyrna, Ga. Other oligo/resin examples include polymers available under the trade designations ELVACITE 2014 (ICI Acrylics, Inc., Wilmington, Del.); JONCRYL 587 (S. C. Johnson, Racine, Wis.); and ACRYLOID B series and PARALOID B series such as PARALOID B-60 (Rohm and Haas Co., Philadelphia, Pa.)

The radiation curable ink includes a colorant. Colorants can be a pigment or dye. A pigment used in the ink composition provides the desired color. Durable pigments are preferred for use in the inks of the invention, meaning that they have good outdoor durability and resist fading upon exposure to sun and the elements.

Pigments useful in the invention may be organic or inorganic. Suitable inorganic pigments include carbon black and titania ($TiO_2$), while suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines. It will be recognized by those skilled in the art that organic pigments will be differently shaded, or even have different colors, depending on the functional groups attached to the main molecule.

Commercial examples of useful organic pigments include those known described in The Colour Index, Vols. 1-8, Society of Dyers and Colourists, Yorkshire, England having the designations Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60 (blue pigments); Pigment Brown 5, Pigment Brown 23, and Pigment Brown 25 (brown pigments); Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, and Pigment Yellow 175 (yellow pigments); Pigment Green 1, Pigment Green 7, Pigment Green 10, and Pigment Green 36 (green pigments); Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61 (orange pigments); Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224 (red pigments); Pigment Violet 19, Pigment Violet 23, Pigment Violet 37, Pigment Violet 32, and Pigment Violet 42 (violet pigments); and Pigment Black 6 or 7 (black pigments).

The pigment is generally incorporated into the ink composition by milling the pigment into selected reactive monomers and optional oligo/resin materials. If the ink is to be used in applications wherein the ink is used in combination with a retroreflective backing, the pigment is milled to a particle size that provides sufficient transparency to permit retroreflection and provide retroreflective color.

If a colorant in the form of pigment is used, a dispersant may be desired in some instances in order to stabilize the pigment. The choice of dispersant depends on factors such as the type of pigment used, the type of oligo/resin(s) in the formulation, the composition of the phase(s) into which the pigment will be dispersed, and the like. Example of commercially available dispersants suitable for this application include those sold under the trade designations SOL-SPERSE from The Lubrizol Corp. of Wickliff, Ohio, EFKA from BASF Corporation of Florham Park, N.J. and BYK from BYK Chemie, USA of Wallingford, Conn. It is possible to use mixtures of dispersants also. The amount of dispersant added depends on the type and concentration of the pigment. Typically 20 to 100 parts by weight of dispersant are used per 100 parts by weight of organic pigment, and between 5 to 80 parts by weight of the dispersant per 100 parts by weight inorganic pigment. Desirably, to avoid destabilizing the ink, the dispersant, if any, has a higher affinity for the pigment than for the oligo/resin(s), if any.

The radiation curable inks can be cured using UV radiation, which typically benefits from the presence of at least one photoinitiator. The type of photoinitiator used depends on the choice of colorant in the ink and on the wavelength of the radiation. Commercially available free-radical generating photoinitiators suitable for the invention include, but are not limited to benzophenone, benzoin ether and acylphosphine photoinitiators such as those sold under the trade designations IRGACURE and DAROCUR from BASF Corporation, Florham Park, N.J.

In addition, the colorant in the ink will absorb part of the incident radiation, depleting the available energy to activate the photoinitiator(s). This will slow down the curing rate and may result in poor through and/or surface cure of the applied ink. It is therefore preferred to use a mixture of photoinitiators in order to provide both surface and through cure. The amount of photoinitiator(s) used typically varies between 1 and 15 weight percent and preferably between 3 and 12 weight percent and more preferably between 5 and 10 weight percent for formulations containing colorant. The uncolored inks can have lower initiator concentrations. Co-initiators and amine synergists can be included in order to improve curing rate. Examples include isopropylthioxanthone, ethyl-4-(dimethylamino)benzoate, 2-ethylhexyl dimethylaminobenzoate, and dimethylaminoethyl methacrylate.

Some of the advantages of the disclosed compositions are further illustrated by the following examples. The particular materials, amounts and dimensions recited in this example, as well as other conditions and details, should not be construed to unduly limit the present disclosure.

EXAMPLES

Viscosity Measurement

Ink viscosity was measured using a Rheolyst AR1000-N Rheometer (TA Instruments, New Castle, Del.) equipped with a 2.36 in (6 cm) 1 degree cone. Unless otherwise stated, measurements were made at 113 F (45 C) and at 14.7/s, then at 1200/s, and then again at 14.7/s. Values of the viscosity at 1200/s and the ratio of the minimum of the two values at 14.7/s to the value at 1200/s are reported.

Stretch-then-Heat Test

Test Panel Preparation

Aluminum panels measuring 0.25 in (0.64 mm) by 2.75 in (69.9 mm) by 11 in (279 mm) were obtained from Q-Panel Corporation (Cleveland, Ohio). Lines were drawn or scribed on the large faces of the panel and parallel to the short edge at distances of 2 in (50.8 mm), 5.5 in (139.7 mm), 6 in (152.4 mm), 6.5 in (165.1 mm), 7 in (177.8 mm), 7.5 in (190.5 mm) and 8 in (203.2 mm) from one end.

Sample Coating and Curing

A 12 in (304.8 mm) by 12 in (304.8 mm) piece of 3M FloorMinders™ Graphics Screen/Offset Film 162-10 (3M, St. Paul, Minn.) was placed in an RK coater unit number 34593 (RK Print-Coat Instruments Ltd, Royston, Hers., UK) equipped with a red-handled wire-wound coating rod. The coating rod was lowered onto the film, and then approximately 1 ml of ink was pipetted onto the film. The RK coater was activated and the ink was spread across the film. The resulting film thickness was 0.5 mils (13 microns). The coated film was removed and secured onto an aluminum sheet measuring 0.05 in (1.3 mm) by 18 in (457 mm) by 18 in (457 mm) with a piece of tape along one film edge. The aluminum sheet was next placed onto the web of a UV processor (American Ultraviolet Company, Murray Hill, N.J.) equipped with two medium-pressure mercury H bulbs. The web speed was 70 fpm (21.3 m/min) and both lamps were energized at 300 W/in. After a first pass through the processor, the aluminum sheet was returned to the moving belt for a second pass through the processor.

The coated film was removed from the aluminum sheet and re-mounted in the RK coater. The coating rod was lowered onto the film, and then approximately 1 ml of ink was pipetted onto the film. The RK coater was activated and the ink was spread across the film for a second time. The re-coated film was cured as described above. The total film thickness was approximately 1.0 mils (25 microns).

Sample Preparation

The cured and coated film was placed on a drying rack for a minimum of 16 hours. The cured and coated film was next cut into pieces measuring 0.5 in (12.7 mm) by 4 in (101.6 mm). Marks were placed along the long side of the film at distances of 1 in (25.4 mm) and 3 in (76.2 mm) from one end.

The backing was removed from a cut piece and the cut piece was attached at each end to a wooden tongue depressor leaving at least the central 2 in (50.8 mm) between the marks unattached. A tongue depressor was grasped between the thumb and index finger of each hand where the film piece was attached. The film was pre-stretched by hand until the distance between the marks measured 3.5 in (88.9 mm); i.e., the distance between the first two lines scribed on the test panel. The tension was released and the pre-stretched piece was removed from the depressors. Each end of the film was grasped between thumb and index finger outside the marks. The film piece was stretched again until the distance between the marks measured 3.5 in (88.9 mm) and the stretched film piece was applied to the test panel with the marks aligned to the first two scribed lines. The above procedure was followed with a second film piece, except that the pre-stretch distance was 4 in (101.6 mm) and the film was mounted with the marks aligned to the first and third lines on the test panel. This procedure was repeated until six pieces of film were mounted to the test panel with the distance between marks incrementing by 0.5 in (13.7 mm) for each test piece. The elongation (difference between stretched and initial length divided by the initial length) for the test pieces was 75%, 100%, 125%, 150%, 175% and 200%.

Occasionally a test piece will break when stretched. If a piece breaks, then two more attempts are made for that elongation. If all three attempts break, then no more samples are placed on the test panel. The elongation at break was recorded as the average of elongation of the last successfully stretched piece and the attempted elongation where the three attempts failed. For example, if a sample was successfully elongated 125% and all three test pieces broke when attempting to elongate 150%, then the elongation at break was recorded as 138%. Similarly if all three test pieces broke when attempting to elongate 75%, then the elongation at break was recorded as 38%. If it was possible to stretch and mount samples at each elongation, then the elongation at break was recorded as 213%.

After the sample pieces are mounted on the test panel, the portions of the samples between the marks are inspected for cracking. The examination started with the test piece with the smallest elongation and proceeded through each test piece in order of elongation until cracking was observed or all pieces examined. The test piece was first examined with a ten-power lens. If cracking is observed with the lens, then the test piece is examined with the unaided eye. If the cracking was not obvious with the unaided eye, or if the obvious cracking only occurred over a minority of the sample length between the marks, then the cracking limit was recording as this elongation of this sample piece. If obvious cracking occurred over the majority of this sample piece, then the cracking length was recorded as the average of the elongation of this sample piece and the next lowest elongation tested. For example, if the majority of a sample was obviously cracked at 150% elongation, then the cracking limit was recorded as 138%. Similarly if a majority of a sample was obviously cracked at 75% elongation, then the cracking limit was recorded as 38%. If no cracking was observed for any of the sample pieces, then the cracking limit was recorded as 213%.

The room temperature elongation limit was recorded as the lower of the elongation at break and cracking limit values. The minimum value of the room temperature elongation limit is 38% and the maximum value of the room temperature elongation limit is 213%.

After the room temperature elongation limit was determined for the mounted samples, the panel was placed in a 150 F (65.6 C) oven for one hour. After one hour, the panel was removed and allowed to cool. The samples on the heat treated panel were inspected for cracking in the same manner as it was prior to heating. The examination started with the test piece with the smallest elongation and proceeded through each test piece in order of elongation until cracking was observed or all pieces examined. The test piece was first examined with a ten-power lens. If cracking is observed with the lens, then the test piece is examined with the unaided eye. If the cracking was not obvious with the unaided eye, or if the obvious cracking only occurred over a minority of the sample length between the marks, then the cracking limit was recording as this elongation of this sample piece. If obvious cracking occurred over the majority of this sample piece, then the cracking length was recorded as the average of the elongation of this sample piece and the next lowest elongation tested. For example, if the majority of a sample was obviously cracked at 150% elongation, then the heat then stretch elongation limit was recorded as 138%. Similarly if a majority of a sample was obviously cracked at 75% elongation, then the heat then stretch elongation limit was recorded as 38%. If no cracking was observed for any of the sample pieces, then the heat then stretch cracking limit was recorded as 213%.

The minimum value of the heat then stretch elongation limit is 38% and is shown in FIG. 3 as a thin dashed line parallel to the x-axis at a value of 38%. The maximum value of the heat then stretch elongation limit is 213% and is shown in FIG. 3 as a heavy dashed line parallel to the x-axis at a value of 213%.

Calculated Glass Transition Temperature

The Fox equation can be used to estimate the glass transition temperature of polymer blends and statistical copolymers. The Fox equation states that the reciprocal of the calculated glass transition temperature ($T_g$) of a mixture is equal to the summation over each component of the weight fraction of each component ($w_i$) divided by its glass transition temperature ($T_{g,i}$) expressed in Kelvin.

$$\frac{1}{T_g} = \sum_i \frac{w_i}{T_{g,i}}$$

In estimating the glass transition of an ink, only the ink ingredients with polymerizable carbon-carbon-double-bonds and which do not phase separate upon polymerization are included in the calculation. In this case, the Fox equation is modified as $$\frac{w_T}{T_g} = \sum_i \frac{w_i}{T_{g,i}}$$

where ($w_T$) is the total weight fraction of the ink ingredients with polymerizable carbon-carbon-double-bonds and which do not phase separate upon polymerization. An example of a material known to phase-separate upon polymerization of acrylates is an acrylated-polymethylmethacrylate-macromer such as Elvacite 1010. The relevant glass transition temperatures ($T_{g,i}$) used in the above equation are those of the homopolymer of the reactant.

The glass transition temperature of a homopolymer of a reactant can often be obtained from the supplier or from the published literature. Reported values can differ widely, so good judgment must be exercised in choosing a representative value. One preferred reference for homopolymer glass transition temperature is "Reference: Polymer Properties, Thermal Transitions of Homopolymers: Glass Transition & Melting Point" found on the Sigma-Aldrich Corp. (St. Louis, Mo.) website. Glass transition temperature can be measured, for example, by using differential scanning calorimetry (DSC) or dynamic mechanical analysis (DMA) methods. Of these two methods, values obtained from DSC measurements are preferred.

The values of the homopolymer glass transition temperatures for the reactants used in the example inks can be found in the following Table 1.

TABLE 1

| Reactant | Tg (C.) | Reactant | Tg (C.) | Reactant | Tg (C.) |
|---|---|---|---|---|---|
| IOA | −54 | CTFA | 40 | CN131 | 4 |
| EHA | −50 | HX-620 | −29 | CN371 | −39 |
| IBOA | 94 | M164 | −28 | CN386 | 10 |
| THFA | −15 | M166 | −41 | CN964 | −24 |
| EEEA | −54 | 1122 | −3 | CN965 | −37 |
| PEA | −22 | CN929 | 17 | CN981 | 22 |
| HDDA | 43 | CN989 | 72 | CN991 | 27 |
| HDDMA | 30 | CN9008 | 111 | CN3100 | 7 |
| HX-220 | 13 | E-1010 | 105 | CN3105 | 5 |
| VCAP | 146 | 4188/M22 | −3 | CN9001 | 60 |
| DAAM | 77 | 4188/EHA | −17 | CN9007 | 1 |
| TC-110S | −58 | Medol 10 | −7 | CN9011 | 53 |

Subsurface Tack Evaluation

A 12 in (304.8 mm) by 12 in (304.8 mm) piece of 3M Controltac™ Graphic Film 162-10 (3M, St. Paul, Minn.)

was placed in an RK coater unit number 34593 (RK Print-Coat Instruments Ltd, Royston, Hers., UK) equipped with a red-handled wire-wound coating rod. The coating rod was lowered onto the film, and then approximately 1 ml of ink was pipetted onto the film. The RK coated was activated and the ink was spread across the film. The resulting film thickness was approximately 0.5 mils (13 microns). The coated film was removed and secured onto an aluminum sheet measuring 0.05 in (1.3 mm) by 18 in (457 mm) by 18 in (457 mm) with a piece of tape along one film edge. The aluminum sheet was next placed onto the web of a UV processor (American Ultraviolet Company, Murray Hill, N.J.) equipped with two medium-pressure mercury H bulbs. The web speed was 100 fpm (30.5 m/min) and both lamps were energized at 200 W/in.

To rate the degree of subsurface tack, a finger was firmly placed onto the ink and held for five seconds and then slowly removed. The force required to remove the finger was compared for different cured ink formulations.

Printed Images

Test inks were installed in a VUTEk GS3250LX printer (Electronics For Imaging, Inc., Foster City, Calif., USA) and test prints were generated on 3M™ Controltac™ Graphic Film with Comply™ Adhesive IJ162C-10 white vinyl film (3M, St. Paul, Minn., USA). The test prints consisted of solid blocks of individual ink colors at 100% fill. The images were processed with the Fiery XF RIP, version 4.5.2 (Electronics For Imaging, Inc., Foster City, Calif., USA) at 600×360 print mode resolution, standard RIP resolution, with no color management or color adjustments. The printer settings were double-strike interlace mode, light smoothing, maximum curing and double shutter mode. According to the printer's computer control client (VUTEk User Interface, or VUI, client and middleware versions 2.1.3 (8220)), the indicated ink usage for a single ink color was approximately 0.063 fluid oz per sq ft (20.1 ml per sq cm), which translates to an ink film thickness of approximately 0.79 mils (20.1 microns). The test inks listed in Tables 5 and 13 were printed on a VUTEk printer.

The inks listed in Table 14 were printed on a Mimaki UJF-3042FX printer.

Materials

The following materials contain carbon-carbon double bonds and are termed "reactants".

1122 is 2-acrylic acid, 2-(((butyl amino)carbonyl)oxy) ethyl ester, a mono-functional urethane acrylate monomer (MW=215 g/mol) available as Genomer 1122 from Rahn USA Corp. (Aurora, Ill., USA).

CTFA is cyclic trimethylolpropane formal acrylate, a mono-functional acrylate available as SR531 from Sartomer USA, LLC (Exton, Pa., USA).

DAAM is diacetone acrylamide, a mono-functional available as from Kyowa Hakko Chemical Co., LTD (Tokyo, Japan).

DCPA is dicyclopentadienyl acrylate, a mono-functional acrylate available as Laromer DCPA from BASF Corporation (Florham Park, N.J., USA).

EEEA is 2-(2-ethoxyethoxy) ethyl acrylate, a mono-functional acrylate available as SR256 from Sartomer USA, LLC (Exton, Pa., USA).

EHA is 2-ethylhexyl acrylate, a mono-functional acrylate available from BASF Corporation (Florham Park, N.J., USA).

HDDA is 1,6-hexanediol diacrylate, a di-functional acrylate (MW=226 g/mol) available as HDODA from Cytec Industries (Woodland Park, N.J., USA).

HX-220 is [2-mole] caprolactone-modified neopentylglycol hydroxypivalate diacrylate, a di-functional acrylate (MW=541 g/mol) available as NAM-HX220 from Nagase America Corporation (New York, N.Y., USA).

HX-620 is [4-mole] caprolactone-modified neopentylglycol hydroxypivalate diacrylate, a di-functional acrylate available as NAM-HX620 from Nagase America Corporation (New York, N.Y., USA).

IBOA is isobornyl acrylate, a mono-functional acrylate available as IBXA from San Esters Corporation (New York, N.Y., USA).

IOA is isooctyl acrylate, a mono-functional acrylate made by 3M (Saint Paul, Minn., USA).

M144 is ethoxylated (4) phenoxyethyl acrylate, a mono-functional acrylate available as Miramer M144 from Rahn USA Corp. (Aurora, Ill., USA).\

M164 is ethoxylated (4) nonylphenol acrylate, a mono-functional acrylate available as Miramer M164 from Rahn USA Corp. (Aurora, Ill., USA).

M166 is ethoxylated (8) nonylphenol acrylate, a mono-functional acrylate available as Miramer M166 from Rahn USA Corp. (Aurora, Ill., USA).

MEDOL-10 is 2-ethyl-2-methyl-1,3-dioxolan-4-yl) methyl acrylate, a mono-functional acrylate available as Medol-10 from San Esters Corporation (New York, N.Y., USA).

PEA is 2-phenoxy ethyl acrylate, a mono-functional acrylate available as Etemer 210 from Eternal Chemical Co., LTD (Kaohsiung, Taiwan).

PEA6 is 6-mole polyethyleneglycol monoacrylate, a mono-functional acrylate available as Bisomer PEA 6 from Cognis GmbH (Dusseldorf, Germany).

TC-110S is caprolactone-modified tetrahydrofurfuryl acrylate, a mono-functional acrylate available as NAM-110S from Nagase America Corporation (New York, N.Y., USA).

THFA is tetrahydrofurfuryl acrylate, a mono-functional acrylate available as Viscoat 150 from San Esters Corporation (New York, N.Y., USA).

VCAP is N-vinyl caprolactam, a mono-functional vinyl available as VCAP from BASF Corporation (Florham Park, N.J., USA).

CN131 is a low viscosity aromatic monoacrylate oligomer, hydroxy functional available from Sartomer USA, LLC (Exton, Pa., USA).

CN3100 is a mono-functional hydroxy-functional oligomer available from Sartomer USA, LLC (Exton, Pa., USA).

CN3105 is a low viscosity epoxy-based monoacrylate oligomer, hydroxy functional available from Sartomer USA, LLC (Exton, Pa., USA).

CN371 is an amine-functional di-acrylate available from Sartomer USA, LLC (Exton, Pa., USA).

CN964 is an aliphatic polyester based urethane di-acrylate oligomer available from Sartomer USA, LLC (Exton, Pa., USA).

CN965 is a di-functional aliphatic urethane acrylate oligomer available from Sartomer USA, LLC (Exton, Pa., USA).

CN929 is a trifunctional aliphatic polyester urethane acrylate oligomer available from Sartomer USA, LLC (Exton, Pa., USA).

CN981 is an aliphatic polyester/polyether based urethane di-acrylate oligomer available from Sartomer USA, LLC (Exton, Pa., USA).

CN981B88 is an aliphatic polyester/polyether based urethane di-acrylate oligomer blended with 12% SR238

(1,6-hexanediol di-acrylate) available from Sartomer USA, LLC (Exton, Pa., USA).

CN989 is a trifunctional aliphatic urethane acrylate oligomer available from Sartomer USA, LLC (Exton, Pa., USA).

CN991 is an aliphatic polyester based urethane di-acrylate oligomer available from Sartomer USA, LLC (Exton, Pa., USA).

CN9001 is a di-functional aliphatic urethane acrylate oligomer available from Sartomer USA, LLC (Exton, Pa., USA).

CN9007 is a di-functional aliphatic urethane acrylate oligomer available from Sartomer USA, LLC (Exton, Pa., USA).

CN9008 is a trifunctional aliphatic polyester urethane acrylate oligomer available from Sartomer USA, LLC (Exton, Pa., USA).

E-1010 is a mono-functional methyl methacrylate macromer available from Lucite International, Inc. (Memphis, Tenn., USA).

4188/M22 is a mono-functional urethane acrylate in GENOMER 1122 available from Rahn USA Corp. (Aurora, Ill., USA).

4188/EHA is a mono-functional urethane acrylate in EHA available from Rahn USA Corp. (Aurora, Ill., USA).

DM5400 is a mono-functional aliphatic urethane acrylate oligomer available from Double Bond Chemical Ind. USA, Inc. (West Simsbury, Conn., USA).

AA is acrylic acid, a mono-functional acrylate available from Polyscience, Inc. (Warrington, Pa., USA). The homopolymer of AA has a glass transition temperature of 106 C.

Beta-CEA is 2-carboxyethyl acrylate, a mono-functional acrylate available from Daicel-Cytec Company, Ltd. (Tokyo, Japan). The homopolymer of Beta-CEA has a glass transition temperature of 37 C.

CN9011 is a di-functional aliphatic urethane acrylate oligomer available from Sartomer USA, LLC (Exton, Pa., USA). The homopolymer of CN9011 has a glass transition temperature of 53 C.

DCP is tricyclodecane dimethanol diacrylate, a di-functional acrylate (MW=304 g/mol) available from Shin Nakamura Chemical Co., Ltd. (Wakayama prefecture, Japan). The homopolymer of DCP has a glass transition temperature of 67 C.

DMAA is N,N-dimethylacrylamide, a mono-functional acrylamide available from Kohjin Film and Chemicals, Ltd. (Tokyo, Japan). The homopolymer of DMAA has a glass transition temperature of 119 C.

DMAEA is dimethylaminoethylacrylate, a mono-functional acrylamide available from Kohjin Film and Chemicals, Ltd. (Tokyo, Japan). The homopolymer of DMAEA has a glass transition temperature of 18 C.

PONPGDA is 2 mole proproxylated neopentylglycol diacrylate, a di-functional acrylate (MW=328 g/mol) available as CN9003IJ from Sartomer USA, LLC (Exton, Pa., USA). The homopolymer of PONPGA has a glass transition temperature of 32 C.

The following materials are photoinitiators.

DETX is 2,4-diethylthioxanthone, a photoinitiator available as Speedcure DETX from Aceto Corporation (Lake Success, N.Y., USA).

TPO is 2,4,6-trimethylbenzoyldiphenylphosphine oxide, a photoinitiator available as Chivacure TPO from Chitec Technology Co., LTD. (Taipei City, Taiwan).

The following materials contain 2,2,6,6-tetramethyl-4-piperidyl groups.

BLS 1944 is poly[[6-[(1,1,3,3,-tetramethylbutyl)amino]-s-triazine-2,4-diyl][2,2,6,6-tetramethyl-4-piperidyl)imino]]hexamethylene[(2,2,6,6-tetramethyl-4-piperidyl)imino]], a polymeric (N—H) HALS with a molecular weight greater than 2500 g/mole and, on average, more than 5.6 tetramethylpiperidinyl groups per molecule available as BLS 1944 from Mayzo, Inc. (Suwanee, Ga., USA).

BLS 1622 is dimethyl succinate polymer with 4-hydroxy-2,2,6,6-tetramethyl-1-piperidine ethanol, a polymeric (N—C) HALS with a molecular weight greater than 2500 g/mole and, on average, more than 7.2 tetramethylpiperidinyl groups per molecule available as BLS 1622 from Mayzo, Inc. (Suwanee, Ga., USA).

C-582L is 2-propenoic acid, 2-methyhyl-,1,2,2,6,6-pentamethyl-4-piperidinyl ester, a liquid, mono-meric (N—CH3) HALS, which contains one methacrylate group per molecule available as Chisorb 582L from Double Bond Chemical Ind. USA, Inc. (West Simsbury, Conn., USA).

C-770 is bis(2,2,6,6-tetramethyl-4-piperidyl) sebacate, a di-meric (N—H) HALS available as Chisorb 770 from Double Bond Chemical Ind. USA, Inc. (West Simsbury, Conn., USA).

C-3346 is poly[(6-morpholino-s-triazine-2,4-diyl)[2,2,6,6-tetramethyl-4-piperidyl) imino]-hexamethylene[(2,2,6,6-tetramethyl-4-piperidyl)imino]], a polymeric (N—H) HALS available as Cyasorb UV33346 from Cytec Industries (Woodland Park, N.J., USA).

C-3529 is 1,6-hexanediamine, N,N'-bis(1,2,2,6,6-pentamethyl-4-piperidinyl)-polymers with 2,4-dichloro-6-(4-morpholinyl)-1,3,5-triazine piperidinyl)imino]]), a polymeric (N—CH3) HALS available as Cyasorb UV3529 from Cytec Industries (Woodland Park, N.J., USA).

NOR 116 is, a polymeric (NOR with some N—H) flame retardant, with predominately 4 to 8 tetramethylpiperidinyl groups per molecule available as Flamestab NOR 116 from BASF Corporation (Florham Park, N.J., USA).

PR31 is propanedioic acid [(4-methoxyphenyl)-methylene]-bis(1,2,2,6,6-pentamethyl-4-piperidinyl) ester, a di-meric (N—CH3) HALS which contains a C=C group available as Hostavin PR31 from Clariant International Ltd. (Muttenz, Switzerland).

S-64 is 1,6-hexanediamine, N,N'-bis(1,2,2,6,6-pentamethyl-4-piperidinyl)-polymers with 2,4-Dichloro-6-(4-morpholinyl)-1,3,5-triazine piperidinyl)imino]]), a polymeric (N—CH3) HALS with a molecular weight of approximately 1700 g/mole and, on average, approximately 5.8 tetramethylpiperidinyl groups per molecule available as Sabo® Stab UV 64 from Sabo SrL (Italy).

S-79 is poly[(6-morpholino-s-triazine-2,4-diyl)[2,2,6,6-tetramethyl-4-piperidyl)imino]-hexamethylene[(2,2,6,6-tetramethyl-4-piperidyl)imino]], a polymeric (N—H) HALS with a molecular weight of approximately 1440-1760 g/mole and, on average, approximately 5.2-6.3 tetramethylpiperidinyl groups per molecule available as Sabo® Stab ELC-79 from Sabo SrL (Italy).

S-119 is 1,3,5-triazine-2,4,6-triamine, N,N-1,2-ethanediylbisN-3-4,6-bisbutyl(1,2,2,6,6-pentamethyl-4-piperidinyl)amino-1,3,5-triazin-2-ylaminopropyl-N,N-dibutyl-N,N-bis(1,2,2,6,6-pentamethyl-4-piperidinyl)-, a polymeric (N—CH3) HALS with 8.0 tetramethylpiperidinyl groups per molecule available as Sabo® Stab UV 119 from Sabo SrL (, Italy).

T-123 is decanedioic acid, bis(2,2,6,6-tetramethyl-1-(octyloxy)-4-piperidinyl) ester, a liquid mixture of mono- and di-meric (NOR) HALS available as Tinuvin 123 from BASF Corporation (Florham Park, N.J., USA).

T-144 is bis(1,2,2,6,6-pentamethyl-4-piperidinyl)-[[3,5-bis(1,1-dimethylethyl)-4-hydroxyphenyl]methyl]butylmalonate, a di-meric (N—CH3) HALS available as Tinuvin 144 from BASF Corporation (Florham Park, N.J., USA).

T-152 is 2,4-bis[N-butyl-N-(1-cyclohexyloxy-2,2,6,6-tetramethylpiperidin-4-yl)amino]-6-(2-hydroxyethylamine)-1,3,5-triazine, a di-meric, low basicity aminoether (NOR) HALS available as Tinuvin 152 from BASF Corporation (Florham Park, N.J., USA).

T-292 is bis(1,2,2,6,6-pentamethyl-4-piperidyl) sebacate & b) Methyl 1,2,2,6,6-pentamethyl-4-piperidyl sebacate, a liquid mixture of mono- and di-meric (N—CH3) HALS available as Tinuvin 292 from BASF Corporation (Florham Park, N.J., USA).

U-5050H is alkenes, C20-24 a-, polymers with maleicanhydride, reaction products with 2,2,6,6-tetramethyl-4-piperidinamine, a polymeric (N—H) HALS with a molecular weight of approximately 3000-4000 g/mole and, on average, approximately 5.2-6.9 tetramethylpiperidinyl groups per molecule available as Uvinul 5050H from BASF Corporation (Florham Park, N.J., USA).

UV10 is bis(1-oxyl-2,2,6,6-tetramethylpiperidine-4-yl) sebacate, a di-meric (N—O radical) inhibitor available as Irgastab UV 10 from BASF Corporation (Florham Park, N.J., USA).

Inhibitor #1 is a polymerization inhibitor which contains an oxygen radical bonded to the hindered nitrogen of 2,6,6-tetramethyl-piperidinyl group(s).

Inhibitor #2 is a polymerization inhibitor which contains an oxygen radical bonded to the hindered nitrogen of 2,6,6-tetramethyl-piperidinyl group(s).

C-582L and PR31 also contain a carbon-carbon double bond and are reactants that contain a 2,2,6,6-tetramethyl-4-piperidyl group.

T-622 is dimethyl succinate polymer with 4-hydroxy-2,2,6,6-tetramethyl-1-piperidine ethanol, a polymeric (N—C) HALS with a molecular weight ranging from 3100 to 4000 g/mole and from 8.9 to 11.5 tetramethylpiperidinyl groups per molecule available as Tinuvin 622 SF from BASF Corporation (Florham Park, N.J., USA).

The following materials are dispersants, synergists and surfactants.

Surf #1 is a polyether siloxane copolymer.
Dispersant #1 is a waxy, solid, polymeric dispersant.
Dispersant #2 is a liquid polymeric dispersant.
Synergist is a synergist.
Dispersant is dispersant(s).
N-9100 is a powder dispersing agent available as Nuosperse 9100 from Elementis Specialties (East Windsor, N.J., USA).
SURF #2 is a polyacrylate leveling agent.
SURF #3 is hydroxy-functional silicone surface agent.

The following materials are pigments.
PB 15:3 is a cyan pigment.
PR 202 is a magenta pigment.
PY 150 is a yellow pigment.
PB 7 is a black pigment.
PW 6 is a white pigment.
Cyan pigment #2 is a cyan pigment.
PB 15:4 is a cyan pigment.
Magenta pigment #2 is a magenta pigment.
PR 122 is a magenta pigment.

Additional materials used in some of the examples include the following.

Inhibitor #3 is a polymerization inhibitor which does not contain 2,6,6-tetramethyl-piperidinyl group(s).
Inhibitor #4 is a polymerization inhibitor.
Inhibitor #5 is a polymerization inhibitor.
DM-55 is an acrylic resin available as Paraloid DM-55 from The Dow Chemical Company (Midland, Mich., USA).

Tables of Examples

Table 1: Cure of magenta inks with various hindered amine compounds
Table 2: Room temperature elongation of magenta inks with various hindered amine compounds
Table 3: Heat aging of inks with various hindered amine compounds
Table 4: Examples tested by draw-downs
Table 5: Examples tested in the VUTEk printer
Table 6: Tabular summary of FIG. 1
Table 7: Tabular summary of FIG. 2
Table 8: Examples containing trifunctional reactants
Table 9: Examples containing other reactants of interest
Table 10: Comparative examples
Table 11: Effect of Thickness
Table 12: Examples covering ranges of interest
Table 13: Additional examples tested in the VUTEk printer
Table 14: Examples tested in the Mimaki printer TABLE 1a

| Example | M-0101 | M-0102 | M-0103 | M-0104 | M-0105 |
|---|---|---|---|---|---|
| Ingredients | | | | | |
| IBOA | 41.80 | 39.80 | 39.80 | 39.80 | 39.80 |
| THFA | 19.99 | 19.99 | 19.99 | 19.99 | 19.99 |
| PEA | 15.90 | 15.90 | 15.90 | 15.90 | 15.90 |
| CN981 | 4.30 | 4.30 | 4.30 | 4.30 | 4.30 |
| TPO | 8.00 | 8.00 | 8.00 | 8.00 | 8.00 |
| DETX | 2.00 | 2.00 | 2.00 | 2.00 | 2.00 |
| T-152 | — | 2.00 | — | — | — |
| T-123 | — | — | 2.00 | — | — |
| NOR 116 | — | — | — | 2.00 | — |
| UV10 | — | — | — | — | 2.00 |
| S-64 | — | — | — | — | — |
| S-119 | — | — | — | — | — |
| C-3529 | — | — | — | — | — |
| BLS 1622 | — | — | — | — | — |
| S-79 | — | — | — | — | — |
| C-3346 | — | — | — | — | — |
| BLS 1944 | — | — | — | — | — |
| U-5050H | — | — | — | — | — |
| T-144 | — | — | — | — | — |
| C-582L | — | — | — | — | — |
| T-292 | — | — | — | — | — |
| PR31 | — | — | — | — | — |
| C-770 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| PR 202 | 5.19 | 5.19 | 5.19 | 5.19 | 5.19 |
| Total | 100.00 | 100.00 | 100.00 | 100.00 | 100.00 |
| Data | | | | | |
| Viscosity (cP) at 45 C. and 1200/s | 9.56 | 10.40 | 10.25 | 11.09 | 10.20 |

TABLE 1a-continued

| Example | M-0101 | M-0102 | M-0103 | M-0104 | M-0105 |
|---|---|---|---|---|---|
| Viscosity Ratio - 14.7/s over 1200/s | 1.08 | 1.08 | 1.08 | 1.08 | 1.08 |
| Calculated Tg (C.) - Fox Equation | 31 | 30 | 30 | 30 | 30 |
| RT % Elongation Limit | 213% | 213% | nm | nm | nm |
| Stretch-Then-Heat % Elongation | 213% | 213% | nm | nm | nm |

TABLE 1b

| Examples | M-0106 | M-0107 | M-0108 | M-0109 | M-0110 |
|---|---|---|---|---|---|
| Ingredients | | | | | |
| IBOA | 39.80 | 39.80 | 39.80 | 39.80 | 39.80 |
| THFA | 19.99 | 19.99 | 19.99 | 19.99 | 19.99 |
| PEA | 15.90 | 15.90 | 15.90 | 15.90 | 15.90 |
| CN981 | 4.30 | 4.30 | 4.30 | 4.30 | 4.30 |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| T-123 | — | — | — | — | — |
| NOR 116 | — | — | — | — | — |
| UV10 | — | — | — | — | — |
| S-64 | 2.00 | — | — | — | — |
| S-119 | — | 2.00 | — | — | — |
| C-3529 | — | — | 2.00 | — | — |
| BLS 1622 | — | — | — | 2.00 | — |
| S-79 | — | — | — | — | 2.00 |
| C-3346 | — | — | — | — | — |
| BLS 1944 | — | — | — | — | — |
| U-5050H | — | — | — | — | — |
| T-144 | — | — | — | — | — |
| C-582L | — | — | — | — | — |
| T-292 | — | — | — | — | — |
| PR31 | — | — | — | — | — |
| C-770 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| PR 202 | 5.19 | 5.19 | 5.19 | 5.19 | 5.19 |
| Total | 100.00 | 100.00 | 100.00 | 100.00 | 100.00 |
| Data | | | | | |
| Viscosity (cP) at 45 C. and 1200/s | 10.58 | 10.61 | 10.68 | 11.58 | 10.61 |
| Viscosity Ratio - 14.7/s over 1200/s | 1.07 | 1.07 | 1.07 | 1.07 | 1.06 |
| Calculated Tg (C.) - Fox Equation | 30 | 30 | 30 | 30 | 30 |
| RT % Elongation Limit | nm | nm | nm | nm | nm |
| Stretch-Then-Heat % Elongation | nm | nm | nm | nm | nm |

TABLE 1c

| Examples | M-0111 | M-0112 | M-0113 | M-0114 |
|---|---|---|---|---|
| Ingredients | | | | |
| IBOA | 39.80 | 39.80 | 39.80 | 39.80 |
| THFA | 19.99 | 19.99 | 19.99 | 19.99 |
| PEA | 15.90 | 15.90 | 15.90 | 15.90 |
| CN981 | 4.30 | 4.30 | 4.30 | 4.30 |
| TPO | 8.00 | 8.00 | 8.00 | 8.00 |
| DETX | 2.00 | 2.00 | 2.00 | 2.00 |
| T-152 | — | — | — | — |
| T-123 | — | — | — | — |
| NOR 116 | — | — | — | — |
| UV10 | — | — | — | — |
| S-64 | — | — | — | — |
| S-119 | — | — | — | — |
| C-3529 | — | — | — | — |
| BLS 1622 | — | — | — | — |
| S-79 | — | — | — | — |
| C-3346 | 2.00 | — | — | — |
| BLS 1944 | — | 2.00 | — | — |
| U-5050H | — | — | 2.00 | — |
| T-144 | — | — | — | 2.00 |
| C-582L | — | — | — | — |
| T-292 | — | — | — | — |
| PR31 | — | — | — | — |
| C-770 | — | — | — | — |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 1.81 | 1.81 | 1.81 | 1.81 |
| PR 202 | 5.19 | 5.19 | 5.19 | 5.19 |
| Total | 100.00 | 100.00 | 100.00 | 100.00 |
| Data | | | | |
| Viscosity (cP) at 45 C. and 1200/s | 10.62 | 11.62 | 10.48 | 10.30 |
| Viscosity Ratio - 14.7/s over 1200/s | 1.06 | 1.07 | 1.07 | 1.09 |
| Calculated Tg (C.) - Fox Equation | 30 | 30 | 30 | 30 |
| RT % Elongation Limit | nm | nm | nm | nm |
| Stretch-Then-Heat % Elongation | nm | nm | nm | nm |

TABLE 1d

| Examples | M-0115 | M-0116 | M-0117 | M-0118 |
|---|---|---|---|---|
| Ingredients | | | | |
| IBOA | 39.80 | 39.80 | 39.80 | 39.80 |
| THFA | 19.99 | 19.99 | 19.99 | 19.99 |
| PEA | 15.90 | 15.90 | 15.90 | 15.90 |
| CN981 | 4.30 | 4.30 | 4.30 | 4.30 |
| TPO | 8.00 | 8.00 | 8.00 | 8.00 |
| DETX | 2.00 | 2.00 | 2.00 | 2.00 |
| T-152 | — | — | — | — |
| T-123 | — | — | — | — |
| NOR 116 | — | — | — | — |
| UV10 | — | — | — | — |
| S-64 | — | — | — | — |
| S-119 | — | — | — | — |
| C-3529 | — | — | — | — |
| BLS 1622 | — | — | — | — |
| S-79 | — | — | — | — |
| C-3346 | — | — | — | — |
| BLS 1944 | — | — | — | — |
| U-5050H | — | — | — | — |
| T-144 | — | — | — | — |
| C-582L | 2.00 | — | — | — |
| T-292 | — | 2.00 | — | — |
| PR31 | — | — | 2.00 | — |
| C-770 | — | — | — | 2.00 |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 1.81 | 1.81 | 1.81 | 1.81 |
| PR 202 | 5.19 | 5.19 | 5.19 | 5.19 |
| Total | 100.00 | 100.00 | 100.00 | 100.00 |
| Data | | | | |
| Viscosity (cP) at 45 C. and 1200/s | 9.74 | 10.04 | 10.23 | 10.03 |
| Viscosity Ratio - 14.7/s over 1200/s | 1.09 | 1.07 | 1.09 | 1.08 |
| Calculated Tg (C.) - Fox Equation | — | 30 | — | 30 |
| RT % Elongation Limit | 213% | nm | nm | 213% |
| Stretch-Then-Heat % Elongation | 213% | nm | nm | 213% |

Examples M-0101 through M-0118 were tested for sub-surface tack.

The example (M-0101) without a 2,2,6,6-tetramethylpiperidinyl compound and examples (M-0102 through M-0105)

containing a 2,2,6,6-tetramethylpiperidinyl compound where predominately an oxygen atom is attached to their hindered 2,2,6,6-tetramethylpiperidinyl nitrogen atom had the most subsurface tack.

Example M-0117 containing a compound with two 2,2,6,6-tetramethylpiperidinyl groups with a carbon atom attached to their hindered nitrogen atoms and with a carbon-carbon-double-bond also had high subsurface tack.

Examples (M-0106 through M-0113) containing a compound with, on average, 3 or more 2,2,6,6-tetramethylpiperidinyl groups where a carbon or hydrogen atom is attached to their 2,2,6,6-tetramethylpiperidinyl nitrogen atoms had the least subsurface tack.

The rest of the examples tested (M-0114 through M-0116, and M-0118) which contained a compound with, on average, one to two 2,2,6,6-tetramethylpiperidinyl groups where carbon or hydrogen atom is attached to their 2,2,6,6-tetramethylpiperidinyl nitrogen atom(s) had an intermediate level of subsurface tack.

TABLE 2a

| Examples | M-0201 | M-0202 | M-0203 | M-0204 | M-0205 |
|---|---|---|---|---|---|
| Ingredients | | | | | |
| IBOA | 49.80 | 49.80 | 49.80 | 49.80 | 49.80 |
| THFA | 19.99 | 19.99 | 19.99 | 19.99 | 19.99 |
| PEA | 5.90 | 5.90 | 5.90 | 5.90 | 5.90 |
| CN981 | 6.30 | 4.30 | 4.30 | 4.30 | 4.30 |
| TPO | 8.00 | 8.00 | 8.00 | 8.00 | 8.00 |
| DETX | 2.00 | 2.00 | 2.00 | 2.00 | 2.00 |
| T-152 | — | 2.00 | — | — | — |
| T-123 | — | — | 2.00 | — | — |
| NOR 116 | — | — | — | 2.00 | — |
| UV10 | — | — | — | — | 2.00 |
| S-64 | — | — | — | — | — |
| S-119 | — | — | — | — | — |
| C-3529 | — | — | — | — | — |
| BLS 1622 | — | — | — | — | — |
| S-79 | — | — | — | — | — |
| C-3346 | — | — | — | — | — |
| BLS 1944 | — | — | — | — | — |
| U-5050H | — | — | — | — | — |
| T-144 | — | — | — | — | — |
| C-582L | — | — | — | — | — |
| T-292 | — | — | — | — | — |
| PR31 | — | — | — | — | — |
| C-770 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| PR 202 | 5.19 | 5.19 | 5.19 | 5.19 | 5.19 |
| Total | 100.00 | 100.00 | 100.00 | 100.00 | 100.00 |
| Data | | | | | |
| Viscosity (cP) at 45 C. and 1200/s | 10.91 | 10.41 | 10.29 | 11.07 | 10.11 |
| Viscosity Ratio - 14.7/s over 1200/s | 1.09 | 1.08 | 1.08 | 1.08 | 1.09 |
| Calculated Tg (C.) - Fox Equation | 45 | 45 | 45 | 45 | 45 |
| RT % Elongation Limit | 138% | 38% | 163% | 38% | 38% |
| Stretch-Then-Heat % Elongation | 138% | 38% | 163% | 38% | 38% |

TABLE 2b

| Examples | M-0206 | M-0207 | M-0208 | M-0209 | M-0210 |
|---|---|---|---|---|---|
| Ingredients | | | | | |
| IBOA | 49.80 | 49.80 | 49.80 | 49.80 | 49.80 |
| THFA | 19.99 | 19.99 | 19.99 | 19.99 | 19.99 |
| PEA | 5.90 | 5.90 | 5.90 | 5.90 | 5.90 |
| CN981 | 4.30 | 4.30 | 4.30 | 4.30 | 4.30 |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| T-123 | — | — | — | — | — |
| NOR 116 | — | — | — | — | — |
| UV10 | — | — | — | — | — |
| S-64 | 2.00 | — | — | — | — |
| S-119 | — | 2.00 | — | — | — |
| C-3529 | — | — | 2.00 | — | — |
| BLS 1622 | — | — | — | 2.00 | — |
| S-79 | — | — | — | — | 2.00 |
| C-3346 | — | — | — | — | — |
| BLS 1944 | — | — | — | — | — |
| U-5050H | — | — | — | — | — |
| T-144 | — | — | — | — | — |
| C-582L | — | — | — | — | — |
| T-292 | — | — | — | — | — |
| PR31 | — | — | — | — | — |
| C-770 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| PR 202 | 5.19 | 5.19 | 5.19 | 5.19 | 5.19 |
| Total | 100.00 | 100.00 | 100.00 | 100.00 | 100.00 |
| Data | | | | | |
| Viscosity (cP) at 45 C. and 1200/s | 10.41 | 10.70 | 10.74 | 13.43 | 10.76 |
| Viscosity Ratio - 14.7/s over 1200/s | 1.08 | 1.09 | 1.10 | 1.12 | 1.11 |
| Calculated Tg (C.) - Fox Equation | 45 | 45 | 45 | 45 | 45 |
| RT % Elongation Limit | 38% | 38% | 38% | 38% | 38% |
| Stretch-Then-Heat % Elongation | 38% | 38% | 38% | 38% | 38% |

TABLE 2c

| Examples | M-0211 | M-0212 | M-0213 | M-0214 |
|---|---|---|---|---|
| Ingredients | | | | |
| IBOA | 49.80 | 49.80 | 49.80 | 49.80 |
| THFA | 19.99 | 19.99 | 19.99 | 19.99 |
| PEA | 5.90 | 5.90 | 5.90 | 5.90 |
| CN981 | 4.30 | 4.30 | 4.30 | 4.30 |
| TPO | 8.00 | 8.00 | 8.00 | 8.00 |
| DETX | 2.00 | 2.00 | 2.00 | 2.00 |
| T-152 | — | — | — | — |
| T-123 | — | — | — | — |
| NOR 116 | — | — | — | — |
| UV10 | — | — | — | — |
| S-64 | — | — | — | — |
| S-119 | — | — | — | — |
| C-3529 | — | — | — | — |
| BLS 1622 | — | — | — | — |
| S-79 | — | — | — | — |
| C-3346 | 2.00 | — | — | — |
| BLS 1944 | — | 2.00 | — | — |
| U-5050H | — | — | 2.00 | — |
| T-144 | — | — | — | 2.00 |
| C-582L | — | — | — | — |
| T-292 | — | — | — | — |
| PR31 | — | — | — | — |
| C-770 | — | — | — | — |
| Inhibitor #1 | 0.10 | 0.10 | 0.10 | 0.10 |
| Inhibitor #2 | 0.01 | 0.01 | 0.01 | 0.01 |

TABLE 2c-continued

| Examples | M-0211 | M-0212 | M-0213 | M-0214 |
|---|---|---|---|---|
| SURF #1 | 0.90 | 0.90 | 0.90 | 0.90 |
| Dispersant #1 | 1.81 | 1.81 | 1.81 | 1.81 |
| PR 202 | 5.19 | 5.19 | 5.19 | 5.19 |
| Total | 100.00 | 100.00 | 100.00 | 100.00 |
| Data | | | | |
| Viscosity (cP) at 45 C. and 1200/s | 10.63 | 11.27 | 10.81 | 10.34 |
| Viscosity Ratio - 14.7/s over 1200/s | 1.08 | 1.07 | 1.07 | 1.08 |
| Calculated Tg (C.) - Fox Equation | 45 | 45 | 45 | 45 |
| RT % Elongation Limit | 38% | 38% | 38% | 38% |
| Stretch-Then-Heat % Elongation | 38% | 38% | 38% | 38% |

TABLE 2d

| Examples | M-0215 | M-0216 | M-0217 | M-0218 |
|---|---|---|---|---|
| Ingredients | | | | |
| IBOA | 49.80 | 49.80 | 49.80 | 49.80 |
| THFA | 19.99 | 19.99 | 19.99 | 19.99 |
| PEA | 5.90 | 5.90 | 5.90 | 5.90 |
| CN981 | 4.30 | 4.30 | 4.30 | 4.30 |
| TPO | 8.00 | 8.00 | 8.00 | 8.00 |
| DETX | 2.00 | 2.00 | 2.00 | 2.00 |
| T-152 | — | — | — | — |
| T-123 | — | — | — | — |
| NOR 116 | — | — | — | — |
| UV10 | — | — | — | — |
| S-64 | — | — | — | — |
| S-119 | — | — | — | — |
| C-3529 | — | — | — | — |
| BLS 1622 | — | — | — | — |
| S-79 | — | — | — | — |
| C-3346 | — | — | — | — |
| BLS 1944 | — | — | — | — |
| U-5050H | — | — | — | — |
| T-144 | — | — | — | — |
| C-582L | 2.00 | — | — | — |
| T-292 | — | 2.00 | — | — |
| PR31 | — | — | 2.00 | — |
| C-770 | — | — | — | 2.00 |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 1.81 | 1.81 | 1.81 | 1.81 |
| PR 202 | 5.19 | 5.19 | 5.19 | 5.19 |
| Total | 100.00 | 100.00 | 100.00 | 100.00 |
| Data | | | | |
| Viscosity (cP) at 45 C. and 1200/s | 9.54 | 9.98 | 10.41 | 10.76 |
| Viscosity Ratio - 14.7/s over 1200/s | 1.09 | 1.08 | 1.08 | 1.08 |
| Calculated Tg (C.) - Fox Equation | — | 45 | — | 45 |
| RT % Elongation Limit | 138% | 138% | 213% | 38% |
| Stretch-Then-Heat % Elongation | 138% | 138% | 113% | 38% |

Examples M-0201 through M-0218 were evaluated with the stretch-then-heat test.

Examples M-0202 through M-0218 differ only in the 2,2,6,6-tetramethylpiperidinyl compound they contain. Example M-0201 had additional CN981 in place of a 2,2,6,6-tetramethylpiperidinyl compound. All examples had a calculated glass transition temperature of approximately 45 C.

The room temperature percent elongation limit for examples M-0202, M-0204 through M-0214, and M-0218 was measured at 38%. Since these examples contained a low amount of di- or higher functional reactants, presumably the observed cracking was owing to good curing and the attainment of a high glass transition temperature for these examples.

The room temperature percent elongation limit values for the rest of the examples was measured at greater than 100%, presumably indicating less complete cure and/or plasticization of the cured ink.

The poorer result for example M-0201 which contains more difunctional reactant content and no 2,2,6,6-tetramethylpiperidinyl compound demonstrated the enhanced cure obtainable with the inclusion of the proper 2,2,6,6-tetramethylpiperidinyl compound.

Examples M-0203 and M-0216 contained a (room temperature) liquid 2,2,6,6-tetramethylpiperidinyl compound which presumably led to increased room temperature percent elongation limits by plasticization of the cured ink film. It may be possible to counteract the plasticization of these materials by increasing the calculated glass transition temperature of the cured ink. This is not a preferred approach as these 2,2,6,6-tetramethylpiperidinyl compounds are known to migrate which would making their cured-ink plasticization effect time dependent and unreliable.

Example M-0215 contained a 2,2,6,6-tetramethylpiperidinyl compound which is a liquid at room temperature and which contains a methacrylate group. The addition of a methacrylate is known to slow down the speed of acrylate polymerization. Presumably either this retardation or the plasticization effect of unreacted C-582L could have lead to the observed increased room temperature percent elongation limit.

Example M-0217 contained a 2,2,6,6-tetramethylpiperidinyl compound which contains a non-acrylate carbon-carbon-double-bond. Presumably the presence of this non-acrylate carbon-carbon-double-bond retarded the curing of the ink and led to the observed increased room temperature percent elongation limit.

TABLE 3

| Example | C-0300 | M-0300 | Y-0300 | K-0300 | W-0300 |
|---|---|---|---|---|---|
| Ingredients | | | | | |
| IOA | 2.70 | — | 3.60 | — | 4.25 |
| IBOA | 50.20 | 39.80 | 49.20 | 47.18 | 39.95 |
| THFA | — | 19.99 | — | — | 10.00 |
| EEEA | 7.50 | — | 7.50 | 10.00 | 10.00 |
| PEA | 15.90 | 15.90 | 15.90 | 15.90 | 10.90 |
| CN981 | 8.60 | 4.30 | 8.00 | 8.00 | 4.40 |
| TPO | 10.00 | 8.00 | 8.00 | 8.00 | 10.00 |
| DETX | — | 2.00 | 2.00 | 4.00 | — |
| Hindered Amine | 2.00 | 2.00 | 2.00 | 2.00 | 2.00 |
| Inhibitor #1 | 0.10 | 0.10 | 0.10 | 0.10 | 0.10 |
| Inhibitor #2 | 0.00 | 0.01 | 0.01 | 0.01 | 0.02 |
| SURF #1 | 0.90 | 0.90 | 0.90 | 0.90 | 0.90 |
| Dispersant #1 | 0.65 | 1.81 | 0.80 | — | 1.48 |
| Dispersant #2 | — | — | — | 1.12 | — |
| Synergist | 0.12 | — | — | — | — |
| PB 15:3 | 1.33 | — | — | — | — |
| PR 202 | — | 5.19 | — | — | — |
| PY 150 | — | — | 2.00 | — | — |
| PB 7 | — | — | — | 2.79 | — |
| PW 6 | — | — | — | — | 16.00 |
| Total | 100.00 | 100.00 | 100.00 | 100.00 | 100.00 |
| Data | | | | | |
| Delta Viscosity (%) at 45 C. and 1200/s after 4 wks at 60 C. | | | | | |
| T-152 | −2% | nm | −1% | 0% | 1% |
| T-123 | nm | 24% | nm | nm | nm |
| NOR 116 | nm | 18% | nm | nm | nm |
| UV10 | nm | 91% | nm | nm | nm |
| S-64 | 10% | 111% | 0% | 0% | 4% |
| S-119 | 11% | 136% | 0% | 1% | 3% |

TABLE 3-continued

| Example | C-0300 | M-0300 | Y-0300 | K-0300 | W-0300 |
|---|---|---|---|---|---|
| C-3529 | 10% | 99% | 0% | 0% | 3% |
| BLS 1622 | −2% | 355% | −2% | −1% | −2% |
| S-79 | 57% | 136% | 6% | 5% | X |
| C-3346 | 63% | 158% | 10% | 16% | X |
| BLS 1944 | 36% | 238% | 0% | 3% | X |
| U-5050H | 46% | 93% | 13% | 11% | 2% |
| T-144 | 2% | 91% | −1% | −1% | −1% |
| C-582L | 0% | nm | −1% | 1% | 1% |
| T-292 | −1% | 111% | −1% | 0% | 1% |
| PR31 | nm | 94% | nm | nm | nm |
| C-770 | nm | 155% | nm | nm | nm |

Examples C-0300, M-0300, Y-0300, K-0300, and W-0300 had their viscosities measured before and after heat aging at 140 F (60 C) for four weeks. The percent change in viscosity (final divided by initial minus one) after heat aging was calculated for each example.

The magnitude of the change in viscosity after heat aging was dependent on both the ink color and the 2,2,6,6-tetramethylpiperidinyl compound used. The M-0300 examples had the largest increase in viscosity followed by the C-0300 examples. This demonstrates that a preferred ink set is one where a first ink contains a first 2,2,6,6-tetramethylpiperidinyl compound and a second ink contains a second 2,2,6,6-tetramethylpiperidinyl compound.

The M-0300 inks with the best viscosity stability all contain a 2,2,6,6-tetramethylpiperidinyl compound with an ether group (OR) attached to their hindered nitrogen (T-123 and NOR 116). Very good viscosity stability is also seen for C-0300, Y-0300, K-0300, and W-0300 inks containing a 2,2,6,6-tetramethylpiperidinyl compound with an ether group (OR) attached to their hindered nitrogen (T-152).

The M-0300 ink with containing a 2,2,6,6-tetramethylpiperidinyl compound with an oxygen radical attached to their hindered nitrogen (UV-10) had poor viscosity stability.

Inks containing a 2,2,6,6-tetramethylpiperidinyl compound with a hydrogen atom attached to their hindered nitrogen (S-79, C-3346, BLS 1944, U-5050H, and C-770) generally showed the greatest increase in viscosity. In the W-0300 inks, these 2,2,6,6-tetramethylpiperidinyl compounds led to a hard cake formation that could not be easily re-dispersed.

Inks containing a 2,2,6,6-tetramethylpiperidinyl compound with a carbon atom attached to their hindered nitrogen (S-64, S-119, C-3529, BLS 1622, T-144, C-582L, T-292 and PR31) generally had intermediate increases in viscosity. For C-0300 inks, the dimeric 2,2,6,6-tetramethylpiperidinyl compound with a carbon atom attached to their hindered nitrogen had better viscosity stability than the polymeric compounds with, on average, 3 or more 2,2,6,6-tetramethylpiperidinyl groups. T-144 is particularly preferred for use in a cyan ink.

TABLE 4a

| Example | C-0401 | C-0402 | C-0403 | C-0404 | C-0405 |
|---|---|---|---|---|---|
| Ingredients | | | | | |
| IOA | 2.70 | 2.70 | 2.70 | 2.70 | 2.70 |
| IBOA | 39.90 | 36.30 | 42.00 | 41.40 | 47.10 |
| THFA | 20.00 | 20.00 | 15.00 | 20.00 | 15.00 |
| EEEA | — | — | — | — | — |
| PEA | 10.90 | 15.90 | 15.90 | 10.90 | 10.90 |
| HDDA | — | — | — | — | — |
| HX-220 | — | — | — | — | — |
| CTFA | — | — | — | — | — |
| CN981B88 | — | — | — | — | — |
| CN981 | — | 5.00 | 5.30 | 4.90 | 5.20 |
| CN991 | — | — | — | — | — |
| CN9007 | — | — | — | — | — |
| CN964 | — | — | — | — | — |
| CN965 | — | — | — | — | — |
| E-1010 | — | 3.00 | 2.00 | 3.00 | 2.00 |
| 4188/M22 | — | — | — | — | — |
| TPO | 8.00 | 12.00 | 12.00 | 12.00 | 12.00 |
| DETX | 2.00 | — | — | — | — |
| T-152 | — | — | — | — | — |
| S-64 | 13.40 | 2.00 | 2.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | | | | | |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 11.81 | 10.54 | 10.44 | 10.31 | 10.38 |
| Viscosity Ratio - 14.7/s over 1200/s | 1.08 | 1.10 | 1.03 | 1.07 | 1.05 |
| Calculated Tg (C.) - Fox Equation | 30.7 | 24.0 | 30.9 | 31.2 | 38.3 |
| RT % Elongation Limit | nm | 213% | 213% | 213% | 213% |
| Stretch-Then-Heat % Elongation Limit | nm | 213% | 213% | 213% | 213% |
| Moles Difunction in 1 kg of Ink | 0.000 | 0.029 | 0.031 | 0.029 | 0.030 |

TABLE 4b

| Example | C-0406 | C-0407 | C-0408 | C-0409 | C-0410 |
|---|---|---|---|---|---|
| Ingredients | | | | | |
| IOA | 2.70 | 2.70 | 2.70 | 2.70 | 2.70 |
| IBOA | 36.00 | 41.90 | 41.10 | 47.00 | 38.60 |
| THFA | 20.00 | 15.00 | 20.00 | 15.00 | 17.50 |
| EEEA | — | — | — | — | — |
| PEA | 15.90 | 15.90 | 10.90 | 10.90 | 15.90 |
| HDDA | — | — | — | — | — |
| HX-220 | — | — | — | — | — |
| CTFA | — | — | — | — | — |
| CN981B88 | 4.30 | 3.90 | 4.20 | 3.80 | — |
| CN981 | — | — | — | — | 10.20 |
| CN991 | — | — | — | — | — |
| CN9007 | — | — | — | — | — |
| CN964 | — | — | — | — | — |
| CN965 | — | — | — | — | — |
| E-1010 | 4.00 | 3.50 | 4.00 | 3.50 | — |
| 4188/M22 | — | — | — | — | — |
| TPO | 12.00 | 12.00 | 12.00 | 12.00 | 10.00 |
| DETX | — | — | — | — | — |
| T-152 | — | — | — | — | — |
| S-64 | 2.00 | 2.00 | 2.00 | 2.00 | — |
| T-144 | — | — | — | — | — |
| PR31 | — | — | — | — | 2.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |

TABLE 4b-continued

| Example | C-0406 | C-0407 | C-0408 | C-0409 | C-0410 |
|---|---|---|---|---|---|
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.60 | 10.55 | 10.53 | 10.45 | 10.49 |
| Viscosity Ratio - 14.7/s over 1200/s | 1.04 | 1.03 | 1.05 | 1.04 | 1.04 |
| Calculated Tg (C.) - Fox Equation | 23.9 | 31.1 | 31.2 | 38.7 | 26.7 |
| RT % Elongation Limit | 213% | 213% | 213% | 213% | 213% |
| Stretch-Then-Heat % Elongation Limit | 213% | 213% | 213% | 213% | 125% |
| Moles Difunction in 1 kg of Ink | 0.045 | 0.041 | 0.044 | 0.040 | 0.060 |

TABLE 4c

| Example | C-0411 | C-0412 | C-0413 | C-0414 | C-0415 |
|---|---|---|---|---|---|
| Ingredients | | | | | |
| IOA | — | 2.70 | — | 2.70 | 2.70 |
| IBOA | 38.50 | 38.60 | 38.70 | 56.10 | 51.70 |
| THFA | 22.90 | 17.50 | 22.90 | — | — |
| EEEA | — | — | — | — | — |
| PEA | 13.40 | 15.90 | 13.40 | 10.90 | 10.90 |
| HDDA | — | — | — | — | — |
| HX-220 | — | — | — | — | — |
| CTFA | — | — | — | 10.00 | 15.00 |
| CN981B88 | — | — | — | — | — |
| CN981 | 10.10 | 10.20 | 9.90 | 5.20 | 4.60 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | — | 2.00 | 2.00 | 2.00 | 2.00 |
| PR31 | 2.00 | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.60 | 0.65 | 0.60 | 0.65 | 0.65 |
| Dispersant #2 | — | — | — | — | — |
| Synergist | 0.15 | 0.12 | 0.15 | 0.12 | 0.12 |
| PB 15:3 | 1.35 | 1.33 | 1.35 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.70 | 10.51 | 10.52 | 10.45 | 10.42 |
| Viscosity Ratio - 14.7/s over 1200/s | 1.03 | 1.04 | 1.06 | 1.03 | 1.05 |
| Calculated Tg (C.) - Fox Equation | 28.8 | 26.7 | 29.0 | 55.8 | 53.4 |
| RT % Elongation Limit | 213% | 213% | 213% | 38% | 38% |
| Stretch-Then-Heat % Elongation Limit | 138% | 138% | 138% | 38% | 38% |
| Moles Difunction in 1 kg of Ink | 0.059 | 0.060 | 0.058 | 0.030 | 0.027 |

TABLE 4d

| Example | C-0416 | C-0417 | C-0418 | C-0419 | C-0420 |
|---|---|---|---|---|---|
| Ingredients | | | | | |
| IOA | 2.70 | 2.70 | 2.70 | 2.70 | 2.70 |
| IBOA | 47.30 | 51.00 | 46.60 | 42.30 | 46.00 |
| THFA | — | — | — | — | — |
| EEEA | — | — | — | — | — |
| PEA | 10.90 | 15.90 | 15.90 | 15.90 | 20.90 |
| HDDA | — | — | — | — | — |
| HX-220 | — | — | — | — | — |
| CTFA | 20.00 | 10.00 | 15.00 | 20.00 | 10.00 |
| CN981B88 | — | — | — | — | — |
| CN981 | 4.00 | 5.30 | 4.70 | 4.00 | 5.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.20 | 10.47 | 10.34 | 10.15 | 10.23 |
| Viscosity Ratio - 14.7/s over 1200/s | 1.04 | 1.05 | 1.03 | 1.04 | 1.09 |
| Calculated Tg (C.) - Fox Equation | 50.9 | 47.9 | 45.6 | 43.3 | 40.5 |
| RT % Elongation Limit | 38% | 38% | 38% | 38% | 213% |
| Stretch-Then-Heat % Elongation Limit | 38% | 38% | 38% | 38% | 138% |
| Moles Difunction in 1 kg of Ink | 0.023 | 0.031 | 0.027 | 0.023 | 0.031 |

TABLE 4e

| Example | C-0421 | C-0422 | C-0423 | C-0424 | C-0425 |
|---|---|---|---|---|---|
| Ingredients | | | | | |
| IOA | 2.70 | 2.70 | 2.70 | 2.70 | 2.70 |
| IBOA | 41.60 | 37.20 | 34.50 | 39.50 | 44.60 |
| THFA | — | — | — | — | — |
| EEEA | — | — | — | — | — |
| PEA | 20.90 | 20.90 | 40.90 | 35.90 | 30.90 |
| HDDA | — | — | — | — | — |
| HX-220 | — | — | — | — | — |
| CTFA | 15.00 | 20.00 | — | — | — |
| CN981B88 | — | — | — | — | — |

TABLE 4e-continued

| Example | C-0421 | C-0422 | C-0423 | C-0424 | C-0425 |
|---|---|---|---|---|---|
| CN981 | 4.70 | 4.10 | 6.80 | 6.80 | 6.70 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.30 | 10.16 | 10.42 | 10.45 | 10.39 |
| Viscosity Ratio - 14.7/s over 1200/s | 1.04 | 1.04 | 1.11 | 1.04 | 1.05 |
| Calculated Tg (C.) - Fox Equation | 38.2 | 36.0 | 17.4 | 23.8 | 30.6 |
| RT % Elongation Limit | 213% | 188% | 213% | 188% | 213% |
| Stretch-Then-Heat % Elongation Limit | 113% | 113% | 138% | 113% | 138% |
| Moles Difunction in 1 kg of Ink | 0.027 | 0.024 | 0.040 | 0.040 | 0.039 |

TABLE 4f

| Example | C-0426 | C-0427 | C-0428 | C-0429 | C-0430 |
|---|---|---|---|---|---|
| Ingredients | | | | | |
| IOA | 2.70 | 2.70 | 2.70 | 2.70 | 2.70 |
| IBOA | 49.70 | 54.70 | 53.40 | 47.10 | 40.70 |
| THFA | — | — | — | — | — |
| EEEA | — | — | 10.00 | 15.00 | 20.00 |
| PEA | 25.90 | 20.90 | 0.90 | 0.90 | 0.90 |
| HDDA | — | — | — | — | — |
| HX-220 | — | — | — | — | — |
| CTFA | — | — | 10.00 | 10.00 | 10.00 |
| CN981B88 | — | — | — | — | — |
| CN981 | 6.60 | 6.60 | 7.90 | 9.20 | 10.60 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.34 | 10.49 | 10.84 | 10.79 | 11.07 |
| Viscosity Ratio - 14.7/s over 1200/s | 1.04 | 1.08 | 1.03 | 1.05 | 1.07 |
| Calculated Tg (C.) - Fox Equation | 37.6 | 45.0 | 46.4 | 34.7 | 23.8 |
| RT % Elongation Limit | 213% | 88% | 188% | 138% | 113% |
| Stretch-Then-Heat % Elongation Limit | 175% | 88% | 138% | 113% | 113% |
| Moles Difunction in 1 kg of Ink | 0.039 | 0.039 | 0.046 | 0.054 | 0.062 |

TABLE 4g

| Example | C-0431 | C-0432 | C-0433 | C-0434 | C-0435 |
|---|---|---|---|---|---|
| Ingredients | | | | | |
| IOA | 2.70 | 2.70 | 2.70 | 2.70 | 2.70 |
| IBOA | 42.00 | 43.80 | 45.70 | 45.10 | 47.00 |
| THFA | — | — | — | — | — |
| EEEA | 10.00 | 12.50 | 15.00 | 7.50 | 10.00 |
| PEA | 20.90 | 15.90 | 10.90 | 20.90 | 15.90 |
| HDDA | — | — | — | — | — |
| HX-220 | — | — | — | — | — |
| CTFA | — | — | — | — | — |
| CN981B88 | — | — | — | — | — |
| CN981 | 9.30 | 10.00 | 10.60 | 8.70 | 9.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.70 | 10.85 | 10.87 | 10.57 | 10.69 |
| Viscosity Ratio - 14.7/s over 1200/s | 1.03 | 1.03 | 1.03 | 1.04 | 1.03 |
| Calculated Tg (C.) - Fox Equation | 22.6 | 23.9 | 25.2 | 27.8 | 29.2 |
| RT % Elongation Limit | 213% | 213% | 213% | 213% | 213% |
| Stretch-Then-Heat % Elongation Limit | 113% | 125% | 113% | 125% | 138% |
| Moles Difunction in 1 kg of Ink | 0.054 | 0.058 | 0.062 | 0.051 | 0.054 |

TABLE 4h

| Example | C-0436 | C-0437 | C-0438 | C-0439 | C-0440 |
|---|---|---|---|---|---|
| Ingredients | | | | | |
| IOA | 2.70 | 2.70 | 2.70 | 2.70 | 2.70 |
| IBOA | 48.90 | 48.30 | 50.20 | 52.10 | 51.50 |
| THFA | — | — | — | — | — |
| EEEA | 12.50 | 5.00 | 7.50 | 10.00 | 2.50 |
| PEA | 10.90 | 20.90 | 15.90 | 10.90 | 20.90 |
| HDDA | — | — | — | — | — |
| HX-220 | — | — | — | — | — |
| CTFA | — | — | — | — | — |
| CN981B88 | — | — | — | — | — |
| CN981 | 9.90 | 8.00 | 8.60 | 9.20 | 7.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.72 | 10.53 | 10.63 | 10.70 | 10.47 |
| Viscosity Ratio - 14.7/s over 1200/s | 1.07 | 1.23 | 1.03 | 1.07 | 1.04 |
| Calculated Tg (C.) - Fox Equation | 30.6 | 33.3 | 34.8 | 36.2 | 39.0 |
| RT % Elongation Limit | 213% | 213% | 213% | 213% | 163% |
| Stretch-Then-Heat % Elongation Limit | 125% | 138% | 138% | 138% | 163% |
| Moles Difunction in 1 kg of Ink | 0.058 | 0.047 | 0.050 | 0.054 | 0.043 |

TABLE 4i

| Example | C-0441 | C-0442 | C-0443 | C-0444 | C-0445 |
|---|---|---|---|---|---|
| Ingredients | | | | | |
| IOA | 2.70 | 2.70 | 2.70 | 2.70 | 2.70 |
| IBOA | 53.40 | 55.30 | 56.60 | 58.50 | 56.90 |
| THFA | — | — | — | — | 15.00 |
| EEEA | 5.00 | 7.50 | 2.50 | 5.00 | — |
| PEA | 15.90 | 10.90 | 15.90 | 10.90 | 0.90 |
| HDDA | — | — | — | — | — |
| HX-220 | — | — | — | — | — |
| CTFA | — | — | — | — | — |
| CN981B88 | — | — | — | — | — |
| CN981 | 7.90 | 8.50 | 7.20 | 7.80 | 9.40 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.71 | 10.74 | 10.60 | 10.68 | 10.49 |
| Viscosity Ratio - 14.7/s over 1200/s | 1.04 | 1.04 | 1.05 | 1.04 | 1.04 |
| Calculated Tg (C.) - Fox Equation | 40.5 | 42.0 | 46.5 | 48.1 | 52.3 |
| RT % Elongation Limit | 213% | 213% | 38% | 38% | 38% |
| Stretch-Then-Heat % Elongation Limit | 163% | 163% | 38% | 138% | 38% |
| Moles Difunction in 1 kg of Ink | 0.046 | 0.050 | 0.042 | 0.046 | 0.055 |

TABLE 4j

| Example | C-0446 | C-0447 | C-0448 | C-0449 | C-0450 |
|---|---|---|---|---|---|
| Ingredients | | | | | |
| IOA | 2.70 | 2.70 | 2.70 | 2.70 | 2.70 |
| IBOA | 50.90 | 44.80 | 38.80 | 62.20 | 59.00 |
| THFA | 20.00 | 25.00 | 30.00 | — | — |
| EEEA | — | — | — | 10.00 | 12.50 |
| PEA | 0.90 | 0.90 | 0.90 | 0.90 | 0.90 |
| HDDA | — | — | — | — | — |
| HX-220 | — | — | — | — | — |
| CTFA | — | — | — | — | — |
| CN981B88 | — | — | — | — | — |
| CN981 | 10.40 | 11.50 | 12.50 | 9.10 | 9.80 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | — | — |
| T-152 | — | — | — | — | — |
| S-64 | — | — | — | — | — |
| T-144 | 2.00 | 2.00 | 2.00 | 2.00 | 2.00 |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |

TABLE 4j-continued

| Example | C-0446 | C-0447 | C-0448 | C-0449 | C-0450 |
|---|---|---|---|---|---|
| PB 7 | — | — | — | — | — |
| PW 6 | — | — | — | — | — |
| Total | 100.00 | 100.00 | 100.00 | 100.00 | 100.00 |
| Data |  |  |  |  |  |
| Viscosity (cP) at 45 C. and 1200/s | 10.52 | 10.55 | 10.63 | 10.95 | 11.00 |
| Viscosity Ratio - 14.7/s over 1200/s | 1.14 | 1.06 | 1.05 | 1.04 | 1.04 |
| Calculated Tg (C.) - Fox Equation | 44.5 | 37.0 | 29.9 | 51.2 | 45.0 |
| RT % Elongation Limit | 213% | 213% | 213% | 38% | 188% |
| Stretch-Then-Heat % Elongation Limit | 138% | 138% | 138% | 38% | 138% |
| Moles Difunction in 1 kg of Ink | 0.061 | 0.067 | 0.073 | 0.053 | 0.057 |

TABLE 4k

| Example | C-0451 | C-0452 | C-0453 | M-0401 | M-0402 |
|---|---|---|---|---|---|
| Ingredients |  |  |  |  |  |
| IOA | 2.70 | 2.70 | 2.70 | — | — |
| IBOA | 55.80 | 52.60 | 49.40 | 34.60 | 29.90 |
| THFA | — | — | — | 19.99 | 19.99 |
| EEEA | 15.00 | 17.50 | 20.00 | — | — |
| PEA | 0.90 | 0.90 | 0.90 | 10.90 | 15.90 |
| HDDA | — | — | — | — | — |
| HX-220 | — | — | — | 14.50 | 14.50 |
| CTFA | — | — | — | — | — |
| CN981B88 | — | — | — | — | — |
| CN981 | 10.50 | 11.20 | 11.90 | — | — |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 10.00 | 10.00 |
| DETX | — | — | — | 2.00 | 2.00 |
| T-152 | — | — | — | — | — |
| S-64 | — | — | — | 2.00 | 2.00 |
| T-144 | 2.00 | 2.00 | 2.00 | — | — |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.01 | 0.01 |
| SURF #1 | 0.90 | 0.90 | 0.90 | 0.90 | 0.90 |
| Dispersant #1 | 0.65 | 0.65 | 0.65 | 1.81 | 1.81 |
| Dispersant #2 | — | — | — | — | — |
| Synergist | 0.12 | 0.12 | 0.12 | — | — |
| PB 15:3 | 1.33 | 1.33 | 1.33 | — | — |
| PR 202 | — | — | — | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data |  |  |  |  |  |
| Viscosity (cP) at 45 C. and 1200/s | 11.00 | 11.13 | 11.20 | 10.73 | 10.70 |
| Viscosity Ratio - 14.7/s over 1200/s | 1.04 | 1.04 | 1.04 | 1.07 | 1.07 |
| Calculated Tg (C.) - Fox Equation | 39.1 | 33.4 | 27.9 | 27.8 | 21.1 |
| RT % Elongation Limit | 213% | 188% | 163% | 138% | 113% |
| Stretch-Then-Heat % Elongation Limit | 138% | 113% | 113% | 38% | 38% |
| Moles Difunction in 1 kg of Ink | 0.061 | 0.065 | 0.070 | 0.268 | 0.262 |

TABLE 4l

| Example | M-0403 | M-0404 | M-0405 | M-0406 | M-0407 |
|---|---|---|---|---|---|
| Ingredients |  |  |  |  |  |
| IOA | — | — | — | — | — |
| IBOA | 25.20 | 38.50 | 33.70 | 29.00 | 42.30 |
| THFA | 19.99 | 19.99 | 19.99 | 19.99 | 19.99 |
| EEEA | — | — | — | — | — |
| PEA | 20.90 | 10.90 | 15.90 | 20.90 | 10.90 |
| HDDA | — | — | — | — | — |
| HX-220 | 13.90 | 8.60 | 8.40 | 8.10 | 2.80 |
| CTFA | — | — | — | — | — |
| CN981B88 | — | — | — | — | — |
| CN981 | — | — | — | — | — |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| S-64 | 2.00 | 4.00 | 4.00 | 4.00 | 6.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| Dispersant #2 | — | — | — | — | — |
| Synergist | — | — | — | — | — |
| PB 15:3 | — | — | — | — | — |
| PR 202 | 5.19 | 5.19 | 5.19 | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data |  |  |  |  |  |
| Viscosity (cP) at 45 C. and 1200/s | 10.68 | 10.72 | 10.70 | 10.68 | 10.60 |
| Viscosity Ratio - 14.7/s over 1200/s | 1.08 | 1.06 | 1.05 | 1.06 | 1.07 |
| Calculated Tg (C.) - Fox Equation | 14.7 | 31.8 | 24.6 | 17.9 | 36.0 |
| RT % Elongation Limit | 113% | 188% | 163% | 138% | 213% |
| Stretch-Then-Heat % Elongation Limit | 38% | 125% | 113% | 113% | 213% |
| Moles Difunction in 1 kg of Ink | 0.257 | 0.159 | 0.155 | 0.150 | 0.052 |

TABLE 4m

| Example | M-0408 | M-0409 | M-0410 | M-0411 | M-0412 |
|---|---|---|---|---|---|
| Ingredients |  |  |  |  |  |
| IOA | — | — | — | — | — |
| IBOA | 37.60 | 32.80 | 42.30 | 44.80 | 47.30 |
| THFA | 19.99 | 19.99 | 19.99 | 19.99 | 19.99 |
| EEEA | — | — | — | — | — |
| PEA | 15.90 | 20.90 | 13.40 | 10.90 | 8.40 |
| HDDA | — | — | — | — | — |
| HX-220 | 2.50 | 2.30 | — | — | — |
| CTFA | — | — | — | — | — |
| CN981B88 | — | — | — | — | — |
| CN981 | — | — | 4.30 | 4.30 | 4.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |

TABLE 4m-continued

| Example | M-0408 | M-0409 | M-0410 | M-0411 | M-0412 |
|---|---|---|---|---|---|
| T-152 | — | — | 2.00 | 2.00 | 2.00 |
| S-64 | 6.00 | 6.00 | — | — | — |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| Dispersant #2 | — | — | — | — | — |
| Synergist | — | — | — | — | — |
| PB 15:3 | — | — | — | — | — |
| PR 202 | 5.19 | 5.19 | 5.19 | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.52 | 10.54 | 10.39 | 10.41 | 10.44 |
| Viscosity Ratio - 14.7/s over 1200/s | 1.08 | 1.06 | 1.08 | 1.09 | 1.09 |
| Calculated Tg (C.) - Fox Equation | 28.5 | 21.3 | 33.8 | 37.6 | 41.4 |
| RT % Elongation Limit | 213% | 213% | 213% | 213% | 213% |
| Stretch-Then-Heat % Elongation Limit | 213% | 213% | 213% | 213% | 213% |
| Moles Difunction in 1 kg of Ink | 0.046 | 0.043 | 0.025 | 0.025 | 0.025 |

TABLE 4n

| Example | M-0413 | M-0414 | M-0415 | M-0416 | M-0417 |
|---|---|---|---|---|---|
| Ingredients | | | | | |
| IOA | — | — | — | — | — |
| IBOA | 39.80 | 44.80 | 47.30 | 52.30 | 54.80 |
| THFA | 29.99 | 19.99 | 19.99 | 19.99 | 19.99 |
| EEEA | — | — | — | — | — |
| PEA | 5.90 | 10.90 | 8.40 | 3.40 | 0.90 |
| HDDA | — | — | — | — | — |
| HX-220 | — | — | — | — | — |
| CTFA | — | — | — | — | — |
| CN981B88 | — | — | — | — | — |
| CN981 | 4.30 | 4.30 | 4.30 | 4.30 | 4.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | 2.00 | — | — | — | — |
| S-64 | — | 2.00 | 2.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.81 | 1.81 | 1.81 |
| Dispersant #2 | — | — | — | — | — |
| Synergist | — | — | — | — | — |
| PB 15:3 | — | — | — | — | — |
| PR 202 | 5.19 | 5.19 | 5.19 | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 9.31 | 10.73 | 10.68 | 10.71 | 10.76 |
| Viscosity Ratio - 14.7/s over 1200/s | 1.07 | 1.09 | 1.08 | 1.13 | 1.08 |
| Calculated Tg (C.) - Fox Equation | 31.4 | 37.6 | 41.4 | 49.4 | 53.5 |
| RT % Elongation Limit | 213% | 188% | 163% | 38% | 38% |
| Stretch-Then-Heat % Elongation Limit | 213% | 188% | 163% | 38% | 38% |
| Moles Difunction in 1 kg of Ink | 0.025 | 0.025 | 0.025 | 0.025 | 0.025 |

TABLE 4o

| Example | M-0418 | M-0419 | M-0420 | M-0421 | M-0422 |
|---|---|---|---|---|---|
| Ingredients | | | | | |
| IOA | — | — | — | — | — |
| IBOA | 37.30 | 37.30 | 39.30 | 38.80 | 38.30 |
| THFA | 19.99 | 19.99 | 14.39 | 14.39 | 14.39 |
| EEEA | — | — | — | — | — |
| PEA | 18.40 | 18.40 | 23.40 | 23.40 | 23.40 |
| HDDA | — | — | — | 0.50 | 1.00 |
| HX-220 | — | — | — | — | — |
| CTFA | — | — | — | — | — |
| CN981B88 | — | — | — | — | — |
| CN981 | 4.30 | 4.30 | 4.30 | 4.30 | 4.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | — | — | 2.00 | 2.00 | 2.00 |
| S-64 | — | — | — | — | — |
| T-144 | — | 2.00 | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.81 | 1.81 | 1.45 | 1.45 | 1.45 |
| Dispersant #2 | — | — | — | — | — |
| Synergist | — | — | — | — | — |
| PB 15:3 | — | — | — | — | — |
| PR 202 | 5.19 | 5.19 | 4.15 | 4.15 | 4.15 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.48 | 10.44 | 10.20 | 10.16 | 10.23 |
| Viscosity Ratio - 14.7/s over 1200/s | 1.09 | 1.09 | 1.06 | 1.06 | 1.06 |
| Calculated Tg (C.) - Fox Equation | 26.6 | 26.6 | 27.7 | 27.5 | 27.2 |
| RT % Elongation Limit | 213% | 213% | 213% | 213% | 213% |
| Stretch-Then-Heat % Elongation Limit | 213% | 213% | 213% | 188% | 163% |
| Moles Difunction in 1 kg of Ink | 0.025 | 0.025 | 0.025 | 0.047 | 0.069 |

TABLE 4p

| Example | M-0423 | M-0424 | M-0425 | M-0426 | Y-0401 |
|---|---|---|---|---|---|
| Ingredients | | | | | |
| IOA | — | — | — | — | 3.60 |
| IBOA | 37.80 | 37.30 | 36.80 | 36.30 | 34.40 |
| THFA | 14.39 | 14.39 | 14.39 | 14.39 | 20.00 |
| EEEA | — | — | — | — | — |
| PEA | 23.40 | 23.40 | 23.40 | 23.40 | 15.90 |
| HDDA | 1.50 | 2.00 | 2.50 | 3.00 | — |
| HX-220 | — | — | — | — | — |
| CTFA | — | — | — | — | — |
| CN981B88 | — | — | — | — | — |
| CN981 | 4.30 | 4.30 | 4.30 | 4.30 | 6.30 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | 2.00 | 2.00 | 2.00 | 2.00 | — |
| S-64 | — | — | — | — | 6.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 1.45 | 1.45 | 1.45 | 1.45 | 0.80 |
| Dispersant #2 | — | — | — | — | — |
| Synergist | — | — | — | — | — |
| PB 15:3 | — | — | — | — | — |
| PR 202 | 4.15 | 4.15 | 4.15 | 4.15 | — |
| PY 150 | — | — | — | — | 2.00 |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.12 | 10.13 | 10.16 | 10.14 | 10.57 |
| Viscosity Ratio - 14.7/s over 1200/s | 1.06 | 1.06 | 1.06 | 1.06 | 1.07 |
| Calculated Tg (C.) - Fox Equation | 27.0 | 26.7 | 26.5 | 26.2 | 21.4 |
| RT % Elongation Limit | 188% | 188% | 163% | 163% | 213% |
| Stretch-Then-Heat % Elongation Limit | 138% | 125% | 113% | 88% | 213% |
| Moles Difunction in 1 kg of Ink | 0.092 | 0.114 | 0.136 | 0.158 | 0.037 |

TABLE 4q

| Example | Y-0402 | Y-0403 | Y-0404 | Y-0405 | Y-0406 |
|---|---|---|---|---|---|
| Ingredients | | | | | |
| IOA | 3.60 | 3.60 | 3.60 | 3.60 | 3.60 |
| IBOA | 41.20 | 42.70 | 42.70 | 40.20 | 37.70 |
| THFA | 15.00 | 12.00 | 10.00 | 10.00 | 10.00 |
| EEEA | — | — | — | — | — |
| PEA | 15.90 | 15.90 | 15.90 | 15.90 | 15.90 |
| HDDA | 1.50 | 3.00 | 5.00 | 7.50 | 10.00 |
| HX-220 | — | — | — | — | — |
| CTFA | — | — | — | — | — |
| CN981B88 | — | — | — | — | — |
| CN981 | — | — | — | — | — |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | 7.00 | 7.00 | 7.00 | 7.00 | 7.00 |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| S-64 | 2.00 | 2.00 | 2.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 0.80 | 0.80 | 0.80 | 0.80 | 0.80 |
| Dispersant #2 | — | — | — | — | — |
| Synergist | — | — | — | — | — |
| PB 15:3 | — | — | — | — | — |
| PR 202 | — | — | — | — | — |
| PY 150 | 2.00 | 2.00 | 2.00 | 2.00 | 2.00 |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.35 | 10.63 | 10.73 | 10.75 | 10.72 |
| Viscosity Ratio - 14.7/s over 1200/s | 1.08 | 1.08 | 1.07 | 1.07 | 1.07 |
| Calculated Tg (C.) - Fox Equation | 26.8 | 29.8 | 31.4 | 30.2 | 29.0 |
| RT % Elongation Limit | 213% | 188% | 138% | 113% | 88% |
| Stretch-Then-Heat % Elongation Limit | 213% | 125% | 88% | 38% | 38% |
| Moles Difunction in 1 kg of Ink | 0.066 | 0.133 | 0.221 | 0.332 | 0.442 |

TABLE 4r

| Example | Y-0407 | Y-0408 | Y-0409 | Y-0410 | K-0401 |
|---|---|---|---|---|---|
| Ingredients | | | | | |
| IOA | 3.60 | 3.60 | 3.60 | 3.60 | — |
| IBOA | 42.70 | 39.60 | 39.60 | 42.70 | 36.59 |
| THFA | 15.00 | 15.00 | 15.00 | 15.00 | 20.00 |
| EEEA | — | — | — | — | — |
| PEA | 15.90 | 15.90 | 15.90 | 15.90 | 15.90 |
| HDDA | — | — | — | — | — |
| HX-220 | — | — | — | — | — |
| CTFA | — | — | — | — | — |
| CN981B88 | — | — | — | — | — |
| CN981 | — | 10.10 | 10.10 | — | 9.70 |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | 7.00 | — | — | 7.00 | — |
| TPO | 8.00 | 8.00 | 8.00 | 8.00 | 8.00 |
| DETX | 2.00 | 2.00 | 2.00 | 2.00 | 4.00 |
| T-152 | — | — | — | — | — |
| S-64 | 2.00 | — | — | 2.00 | — |
| T-144 | — | — | 2.00 | — | — |
| PR31 | — | 2.00 | — | — | 2.00 |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Dispersant #1 | 0.80 | 0.80 | 0.80 | 0.80 | — |
| Dispersant #2 | — | — | — | — | 0.80 |
| Synergist | — | — | — | — | — |
| PB 15:3 | — | — | — | — | — |
| PR 202 | — | — | — | — | — |
| PY 150 | 2.00 | 2.00 | 2.00 | 2.00 | — |

TABLE 4r-continued

| Example | Y-0407 | Y-0408 | Y-0409 | Y-0410 | K-0401 |
|---|---|---|---|---|---|
| PB 7 | — | — | — | — | 2.00 |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.39 | 10.59 | 10.55 | 10.46 | 10.56 |
| Viscosity Ratio - 14.7/s over 1200/s | 1.07 | 1.08 | 1.07 | 1.07 | 1.04 |
| Calculated Tg (C.) - Fox Equation | 27.5 | 27.6 | 27.6 | 27.5 | 27.6 |
| RT % Elongation Limit | 213% | 213% | 213% | 188% | 188% |
| Stretch-Then-Heat % Elongation Limit | 213% | 138% | 138% | 188% | 113% |
| Moles Difunction in 1 kg of Ink | 0.000 | 0.059 | 0.059 | 0.000 | 0.057 |

TABLE 4s

| Example | K-0402 | W-0401 | W-0402 | W-0403 | W-0404 |
|---|---|---|---|---|---|
| Ingredients | | | | | |
| IOA | — | 3.40 | 4.25 | 4.25 | 4.25 |
| IBOA | 36.79 | 38.90 | 35.65 | 39.95 | 34.95 |
| THFA | 20.00 | 10.00 | 10.00 | 10.00 | 10.00 |
| EEEA | — | — | — | — | — |
| PEA | 15.90 | 15.90 | 15.90 | 10.90 | 15.90 |
| HDDA | — | — | — | — | — |
| HX-220 | — | — | — | — | — |
| CTFA | — | — | — | — | — |
| CN981B88 | — | — | — | 4.40 | 4.40 |
| CN981 | 9.50 | 4.60 | 3.70 | — | — |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 8.00 | 10.00 | 10.00 | 10.00 | 10.00 |
| DETX | 4.00 | — | — | — | — |
| T-152 | — | — | — | — | — |
| S-64 | — | 2.00 | 2.00 | 2.00 | 2.00 |
| T-144 | 2.00 | — | — | — | — |
| PR31 | — | — | — | — | — |
| Inhibitor #1 | 0.10 | 0.10 | 0.10 | 0.10 | 0.10 |
| Inhibitor #2 | 0.01 | 0.01 | 0.01 | 0.02 | 0.02 |
| SURF #1 | 0.90 | 0.90 | 0.90 | 0.90 | 0.90 |
| Dispersant #1 | — | 1.38 | 1.48 | 1.48 | 1.48 |
| Dispersant #2 | 0.80 | — | — | — | — |
| Synergist | — | — | — | — | — |
| PB 15:3 | — | — | — | — | — |
| PR 202 | — | — | — | — | — |
| PY 150 | — | — | — | — | — |
| PB 7 | 2.00 | — | — | — | — |
| PW 6 | — | 12.80 | 16.00 | 16.00 | 16.00 |
| Total | 100.00 | 100.00 | 100.00 | 100.00 | 100.00 |
| Data | | | | | |
| Viscosity (cP) at 45 C. and 1200/s | 10.42 | 10.39 | 10.31 | 10.45 | 10.50 |
| Viscosity Ratio - 14.7/s over 1200/s | 1.03 | 1.09 | 1.09 | 1.06 | 1.05 |
| Calculated Tg (C.) - Fox Equation | 27.7 | 31.3 | 27.6 | 35.6 | 27.2 |
| RT % Elongation Limit | 213% | 213% | 213% | 213% | 213% |
| Stretch-Then-Heat % Elongation Limit | 125% | 213% | 213% | 188% | 175% |
| Moles Difunction in 1 kg of Ink | 0.056 | 0.027 | 0.022 | 0.046 | 0.046 |

TABLE 4t

| | Example | | | | |
|---|---|---|---|---|---|
| Ingredients | W-0405 | W-0406 | Y-0407 | LC-0401 | LC-0402 |
| IOA | 4.25 | 4.25 | 4.25 | 4.25 | 4.25 |
| IBOA | 29.95 | 42.95 | 45.95 | 35.48 | 36.28 |
| THFA | 10.00 | 7.50 | 5.00 | 25.00 | 20.00 |
| EEEA | — | — | — | — | — |
| PEA | 20.90 | 10.90 | 10.90 | 15.90 | 15.90 |
| HDDA | — | — | — | — | — |
| HX-220 | — | — | — | — | — |
| CTFA | — | — | — | — | — |
| CN981B88 | 4.40 | 3.90 | 3.40 | — | 13.80 |
| CN981 | — | — | — | 13.60 | — |
| CN991 | — | — | — | — | — |
| CN9007 | — | — | — | — | — |
| CN964 | — | — | — | — | — |
| CN965 | — | — | — | — | — |
| E-1010 | — | — | — | — | — |
| 4188/M22 | — | — | — | — | — |
| TPO | 10.00 | 10.00 | 10.00 | 6.00 | 8.00 |
| DETX | — | — | — | — | 2.00 |
| T-152 | — | — | — | — | — |
| S-64 | 2.00 | 2.00 | 2.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.02 | 0.02 | 0.02 | 0.00 | 0.00 |
| SURF #1 | 0.90 | 0.90 | 0.90 | 0.90 | 0.90 |
| Dispersant #1 | 1.48 | 1.48 | 1.48 | 0.14 | 0.14 |
| Dispersant #2 | — | — | — | — | — |
| Synergist | — | — | — | 0.02 | 0.02 |
| PB 15:3 | — | — | — | 0.28 | 0.28 |
| PR 202 | — | — | — | — | — |
| PY 150 | — | — | — | — | — |
| PB 7 | — | — | — | — | — |
| PW 6 | 16.00 | 16.00 | 16.00 | — | — |
| Total | 100.00 | 100.00 | 100.00 | 100.00 | 100.00 |
| Data | | | | | |
| Viscosity (cP) at 45 C. and 1200/s | 10.54 | 10.69 | 10.73 | 10.21 | 10.70 |
| Viscosity Ratio - 14.7/s over 1200/s | 1.05 | 1.05 | 1.05 | 1.04 | 1.02 |
| Calculated Tg (C.) - Fox Equation | 19.2 | 40.0 | 44.6 | 23.3 | 26.8 |
| RT % Elongation Limit | 213% | 213% | 213% | 213% | 163% |
| Stretch-Then-Heat % Elongation Limit | 163% | 213% | 213% | 113% | 88% |
| Moles Difunction in 1 kg of Ink | 0.046 | 0.041 | 0.036 | 0.080 | 0.168 |

TABLE 4u

| | Example | | | | |
|---|---|---|---|---|---|
| Ingredients | LC-0403 | LC-0404 | LC-0405 | LC-0407 | LC-0408 |
| IOA | 0.58 | 0.58 | 0.58 | 0.58 | 0.58 |
| IBOA | 38.58 | 36.48 | 39.08 | 39.68 | 40.38 |
| THFA | 20.00 | 20.00 | 20.00 | 20.00 | 20.00 |
| EEEA | — | — | — | — | — |
| PEA | 15.90 | 15.90 | 15.90 | 15.90 | 15.90 |

TABLE 4u-continued

| Example | LC-0403 | LC-0404 | LC-0405 | LC-0407 | LC-0408 |
|---|---|---|---|---|---|
| HDDA | — | — | — | — | — |
| HX-220 | — | — | — | — | — |
| CTFA | — | — | — | — | — |
| CN981B88 | — | — | — | — | — |
| CN981 | 11.50 | — | — | — | — |
| CN991 | — | 13.60 | — | — | — |
| CN9007 | — | — | 11.00 | — | — |
| CN964 | — | — | — | 10.40 | — |
| CN965 | — | — | — | — | 9.70 |
| E-1010 | — | — | — | — | — |
| 4188/M22 | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| S-64 | 2.00 | 2.00 | 2.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.14 | 0.14 | 0.14 | 0.14 | 0.14 |
| Dispersant #2 | — | — | — | — | — |
| Synergist | 0.02 | 0.02 | 0.02 | 0.02 | 0.02 |
| PB 15:3 | 0.28 | 0.28 | 0.28 | — | — |
| PR 202 | — | — | — | — | — |
| PY 150 | — | — | — | — | — |
| PB 7 | — | — | — | 2.00 | 2.00 |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.48 | 10.52 | 10.48 | 10.32 | 10.60 |
| Viscosity Ratio - 14.7/s over 1200/s | 1.02 | 1.01 | 1.02 | 1.02 | 1.02 |
| Calculated Tg (C.) - Fox Equation | 28.0 | 27.3 | 25.3 | 22.0 | 20.8 |
| RT % Elongation Limit | 213% | 163% | 213% | 213% | 213% |
| Stretch-Then-Heat % Elongation Limit | 113% | 88% | 138% | 163% | 213% |
| Moles Difunction in 1 kg of Ink | 0.090 | 0.126 | 0.000 | 0.063 | 0.000 |

TABLE 5a

| Example | C-0501 | C-0502 | C-0503 | C-0504 | C-0505 |
|---|---|---|---|---|---|
| Ingredients | | | | | |
| IOA | 2.70 | 2.70 | 2.70 | 2.70 | 2.70 |
| EHA | — | — | — | — | — |
| IBOA | 42.75 | 36.45 | 38.15 | 38.55 | 44.55 |
| THFA | 15.00 | 20.00 | 17.50 | 17.50 | — |
| EEEA | — | — | — | — | — |
| PEA | 15.90 | 15.90 | 15.90 | 15.90 | 30.90 |
| HDDA | — | — | — | — | — |
| HX-220 | — | — | — | — | — |
| CN981B88 | — | — | — | — | — |
| CN981 | 8.50 | 5.30 | 8.60 | 10.20 | 6.70 |
| E-1010 | — | — | — | — | — |
| 4188/M22 | — | — | — | — | — |
| 4188/EHA | — | — | — | — | — |
| TPO | 8.00 | 8.00 | 12.00 | 10.00 | 10.00 |
| DETX | 2.00 | 2.00 | — | — | — |
| T-152 | — | — | — | — | — |
| S-64 | 2.00 | 6.50 | 2.00 | — | — |
| T-144 | — | — | — | — | 2.00 |
| PR31 | — | — | — | 2.00 | — |
| Inhibitor #1 | 0.10 | 0.10 | 0.10 | 0.10 | 0.10 |
| Inhibitor #2 | 0.05 | 0.05 | 0.05 | 0.05 | 0.05 |
| SURF #1 | 0.90 | 0.90 | 0.90 | 0.90 | 0.90 |
| Dispersant #1 | 0.65 | 0.65 | 0.65 | 0.65 | 0.65 |
| Dispersant #2 | — | — | — | — | — |
| Synergist | 0.12 | 0.12 | 0.12 | 0.12 | 0.12 |
| PB 15:3 | 1.33 | 1.33 | 1.33 | 1.33 | 1.33 |
| PR 202 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 9.55 | 10.44 | 10.33 | 10.49 | 10.39 |
| Viscosity Ratio - 14.7/s over 1200/s | 1.04 | 1.05 | 1.03 | 1.04 | 1.05 |
| Viscosity (cP) at 25 C. and 1200/s | nm | nm | nm | nm | nm |
| Calculated Tg (C.) - Fox Equation | 31 | 24 | 27 | 27 | 31 |
| RT % Elongation Limit | nm | 213% | 213% | 213% | 213% |
| Stretch-Then-Heat % Elongation Limit | nm | 213% | 200% | 163% | 188% |
| Moles Difunction in 1 kg of Ink | 0.066 | 0.041 | 0.067 | 0.080 | 0.052 |

TABLE 5b

| Example | C-0506 | M-0501 | M-0502 | M-0503 | M-0504 |
|---|---|---|---|---|---|
| Ingredients | | | | | |
| IOA | 2.70 | — | — | — | — |
| EHA | — | — | — | — | — |
| IBOA | 42.35 | 41.10 | 37.90 | 38.50 | 34.45 |
| THFA | 10.00 | 21.19 | 19.99 | 19.99 | 19.99 |
| EEEA | — | — | — | — | — |
| PEA | 20.90 | 10.90 | 15.90 | 15.90 | 20.90 |
| HDDA | — | — | — | — | — |
| HX-220 | — | — | — | — | — |
| VCAP | — | — | — | — | — |
| CN371 | — | 3.20 | — | — | — |
| CN981B88 | — | — | 7.60 | 5.60 | — |
| CN981 | 8.90 | — | — | — | 4.60 |
| E-1010 | — | — | — | — | — |
| 4188/M22 | — | — | — | — | — |
| 4188/EHA | — | — | — | — | — |
| TPO | 10.00 | 8.00 | 8.00 | 8.00 | 8.00 |
| DETX | — | 2.00 | 2.00 | 2.00 | 2.00 |
| T-152 | — | — | — | — | — |
| S-64 | — | 7.00 | 2.00 | 2.00 | 2.00 |
| T-144 | 2.00 | — | — | — | — |
| PR31 | — | — | — | — | — |
| Inhibitor #1 | 0.10 | 0.10 | 0.10 | 0.10 | 0.10 |
| Inhibitor #2 | 0.05 | 0.01 | 0.01 | 0.01 | 0.06 |
| SURF #1 | 0.90 | 0.90 | 0.90 | 0.90 | 0.90 |
| Dispersant #1 | 0.65 | 1.45 | 1.45 | 1.81 | 1.81 |
| Dispersant #2 | — | — | — | — | — |
| Synergist | 0.12 | — | — | — | — |
| PB 15:3 | 1.33 | — | — | — | — |
| PR 202 | — | 4.15 | 4.15 | 5.19 | 5.19 |
| PY 150 | | | | | |

TABLE 5b-continued

| Example | C-0506 | M-0501 | M-0502 | M-0503 | M-0504 |
|---|---|---|---|---|---|
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C and 1200/s | 10.51 | 11.00 | 10.27 | 10.16 | 9.60 |
| Viscosity Ratio – 14.7/s over 1200/s | 1.04 | 1.07 | 1.06 | 1.11 | 1.05 |
| Viscosity (cP) at 25 C and 1200/s | 21.68 | nm | nm | nm | nm |
| Calculated Tg (C) – Fox Equation | 30 | 31 | 29 | 29.3 | 22.8 |
| RT % Elongation Limit | 213% | 213% | 213% | 213% | 213% |
| Stretch-Then-Heat % Elongation Limit | 150% | 213% | 200% | 213% | 213% |
| Moles Difunction in 1 kg of Ink | 0.070 | 0.048 | 0.093 | 0.068 | 0.036 |

TABLE 5c

| Example | M-0505 | M-0506 | M-0507 | M-0508 | M-0509 |
|---|---|---|---|---|---|
| Ingredients | | | | | |
| IOA | — | — | — | — | — |
| EHA | — | 5.00 | — | — | — |
| IBOA | 33.15 | 32.85 | 35.55 | 33.35 | 37.05 |
| THFA | 19.99 | 19.99 | 19.99 | 19.99 | 19.99 |
| EEEA | 5.00 | — | — | — | — |
| PEA | 15.90 | 15.90 | 20.90 | 20.90 | 15.90 |
| HDDA | — | — | — | 0.50 | — |
| HX-220 | — | — | — | — | 3.00 |
| VCAP | — | — | — | — | — |
| CN371 | — | — | — | — | — |
| CN981B88 | — | — | — | 5.20 | — |
| CN981 | 5.90 | 6.20 | 4.40 | — | — |
| E-1010 | — | — | — | — | — |
| 4188/M22 | — | — | — | — | — |
| 4188/EHA | — | — | — | — | — |
| TPO | 8.00 | 8.00 | 10.00 | 8.00 | 8.00 |
| DETX | 2.00 | 2.00 | — | 2.00 | 2.00 |
| T-152 | — | — | — | — | — |
| S-64 | 2.00 | 2.00 | 2.00 | 2.00 | 6.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.06 | 0.06 | 0.06 | 0.06 | 0.06 |
| SURF #1 | 0.90 | 0.90 | — | 0.90 | 0.90 |
| Dispersant #1 | 1.81 | 1.81 | 1.81 | 1.81 | 1.81 |
| Dispersant #2 | — | — | — | — | — |
| Synergist | — | — | — | — | — |
| PB 15:3 | — | — | — | — | — |
| PR 202 | 5.19 | 5.19 | 5.19 | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C and 1200/s | 9.49 | 9.73 | 9.81 | 9.71 | 9.66 |
| Viscosity Ratio – 14.7/s over 1200/s | 1.10 | 1.12 | 1.06 | 1.08 | 1.08 |
| Viscosity (cP) at 25 C and 1200/s | nm | nm | nm | nm | nm |
| Calculated Tg (C) – Fox Equation | 18.8 | 19.0 | 23.6 | 22.3 | 28.0 |
| RT % Elongation Limit | 213% | nm | 213% | 213% | 213% |
| Stretch-Then-Heat % Elongation Limit | 213% | nm | 213% | 213% | 213% |
| Moles Difunction in 1 kg of Ink | 0.046 | 0.048 | 0.034 | 0.085 | 0.055 |

TABLE 5d

| Example | M-0510 | M-0511 | M-0512 | M-0513 | M-0514 |
|---|---|---|---|---|---|
| Ingredients | | | | | |
| IOA | — | — | — | — | — |
| EHA | — | — | — | — | — |
| IBOA | 34.45 | 39.15 | 24.35 | 37.35 | 37.25 |
| THFA | 19.99 | 19.99 | 19.99 | 19.99 | 19.99 |
| EEEA | — | — | — | — | — |

TABLE 5d-continued

| Example | M-0510 | M-0511 | M-0512 | M-0513 | M-0514 |
|---|---|---|---|---|---|
| PEA | 20.90 | 15.90 | 20.90 | 18.40 | 18.40 |
| HDDA | — | — | — | — | — |
| HX-220 | — | — | — | — | — |
| VCAP | — | — | 10.00 | — | — |
| CN371 | — | — | — | — | — |
| CN981B88 | 2.60 | — | — | — | — |
| CN981 | — | 4.90 | 4.70 | 4.20 | 4.30 |
| E-1010 | 2.00 | — | — | — | — |
| 4188/M22 | — | — | — | — | — |
| 4188/EHA | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | — | — | — | — | — |
| S-64 | 2.00 | 2.00 | 2.00 | 2.00 | — |
| T-144 | — | — | — | — | 2.00 |
| PR31 | — | — | — | — | — |
| Inhibitor #1 | 0.10 | 0.10 | 0.10 | 0.10 | 0.10 |
| Inhibitor #2 | 0.06 | 0.06 | 0.06 | 0.06 | 0.06 |
| SURF #1 | 0.90 | 0.90 | 0.90 | 0.90 | 0.90 |
| Dispersant #1 | 1.81 | 1.81 | 1.81 | 1.81 | 1.81 |
| Dispersant #2 | — | — | — | — | — |
| Synergist | — | — | — | — | — |
| PB 15:3 | — | — | — | — | — |
| PR 202 | 5.19 | 5.19 | 5.19 | 5.19 | 5.19 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C and 1200/s | 9.65 | 9.92 | 10.46 | 9.76 | 10.44 |
| Viscosity Ratio – 14.7/s over 1200/s | 1.08 | 1.07 | 1.07 | 1.06 | 1.09 |
| Viscosity (cP) at 25 C and 1200/s | nm | nm | nm | nm | nm |
| Calculated Tg (C) – Fox Equation | 22.9 | 29.7 | 26.5 | 26.6 | 26.6 |
| RT % Elongation Limit | 213% | 213% | 213% | 213% | 213% |
| Stretch-Then-Heat % Elongation Limit | 213% | 213% | 213% | 213% | 213% |
| Moles Difunction in 1 kg of Ink | 0.032 | 0.038 | 0.037 | 0.033 | 0.034 |

TABLE 5e

| Example | M-0515 | M-0516 | M-0517 | Y-0501 | Y-0502 |
|---|---|---|---|---|---|
| Ingredients | | | | | |
| IOA | — | — | — | 3.60 | 3.60 |
| EHA | — | — | — | — | — |
| IBOA | 39.75 | 46.45 | 41.45 | 39.35 | 38.85 |
| THFA | 19.99 | 14.39 | 14.39 | 15.00 | 15.00 |
| EEEA | — | — | — | — | — |
| PEA | 15.90 | 15.90 | 20.90 | 15.90 | 15.90 |
| HDDA | — | — | — | — | — |
| HX-220 | — | — | — | — | — |
| VCAP | — | — | — | — | — |
| CN371 | — | — | — | — | — |
| CN981B88 | — | — | — | 6.30 | 10.80 |
| CN981 | 4.30 | 4.60 | 4.60 | — | — |
| E-1010 | — | — | — | — | — |
| 4188/M22 | — | — | — | — | — |
| 4188/EHA | — | — | — | — | — |
| TPO | 8.00 | 8.00 | 8.00 | 8.00 | 8.00 |
| DETX | 2.00 | 2.00 | 2.00 | 2.00 | 2.00 |
| T-152 | 2.00 | 2.00 | 2.00 | — | — |
| S-64 | — | — | — | 6.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.06 | 0.06 | 0.06 | 0.06 | 0.06 |
| SURF +#1 | 0.90 | 0.90 | 0.90 | 0.90 | 0.90 |
| Dispersant #1 | 1.81 | 1.45 | 1.45 | 0.80 | 0.80 |
| Dispersant #2 | — | — | — | — | — |
| Synergist | — | — | — | — | — |
| PB 15:3 | — | — | — | — | — |
| PR 202 | 5.19 | 4.15 | 4.15 | — | — |

TABLE 5e-continued

| Example | M-0515 | M-0516 | M-0517 | Y-0501 | Y-0502 |
|---|---|---|---|---|---|
| PY 150 | — | — | — | 2.00 | 2.00 |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C and 1200/s | 10.66 | 10.65 | 10.69 | 9.81 | 9.94 |
| Viscosity Ratio – 14.7/s over 1200/s | 1.08 | 1.08 | 1.08 | 1.06 | 1.08 |
| Viscosity (cP) at 25 C and 1200/s | nm | 19.68 | 19.88 | nm | nm |
| Calculated Tg (C) – Fox Equation | 30.1 | 38.3 | 31.0 | 27.9 | 27.4 |
| RT % Elongation Limit | 188% | 38% | 213% | 213% | 213% |
| Stretch-Then-Heat % Elongation Limit | 188% | 38% | 213% | 175% | 138% |
| Moles Difunction in 1 kg of Ink | 0.034 | 0.036 | 0.036 | 0.077 | 0.132 |

TABLE 5f

| Example | Y-0503 | Y-0504 | Y-0505 | K-0501 | K-0506 |
|---|---|---|---|---|---|
| Ingredients | | | | | |
| IOA | 3.60 | 3.60 | 3.60 | — | — |
| EHA | — | — | — | — | — |
| IBOA | 40.35 | 40.15 | 40.95 | 37.74 | 48.17 |
| THFA | 15.00 | 15.00 | 15.00 | 20.00 | — |
| EEEA | — | — | — | — | 10.00 |
| PEA | 15.90 | 15.90 | 15.90 | 15.90 | 15.90 |
| HDDA | — | — | 1.50 | — | — |
| HX-220 | — | — | — | — | — |
| VCAP | — | — | — | — | — |
| CN981B88 | — | — | — | 6.60 | — |
| CN981 | 9.30 | 5.50 | — | — | 8.30 |
| E-1010 | — | — | — | — | — |
| 4188/M22 | — | — | 7.20 | — | — |
| 4188/EHA | — | — | — | — | — |
| TPO | 8.00 | 8.00 | 8.00 | 8.00 | 8.00 |
| DETX | 2.00 | 2.00 | 2.00 | 2.00 | 4.00 |
| T-152 | — | — | — | — | — |
| S-64 | 2.00 | 6.00 | 2.00 | 6.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.06 | 0.06 | 0.06 | 0.03 | 0.03 |
| SURF #1 | 0.90 | 0.90 | 0.90 | 0.90 | 0.90 |
| Dispersant #1 | 0.80 | 0.80 | 0.80 | — | — |
| Dispersant #2 | — | — | — | 0.78 | 0.74 |
| Synergist | — | — | — | — | — |
| PB 15:3 | — | — | — | — | — |
| PR 202 | — | — | — | — | — |
| PY 150 | 2.00 | 2.00 | 2.00 | — | — |
| PB 7 | — | — | — | 1.95 | 1.86 |
| PW 6 | — | — | — | — | — |
| Total | 100.00 | 100.00 | 100.00 | 100.00 | 100.00 |
| Data | | | | | |
| Viscosity (cP) at 45 C and 1200/s | 9.77 | 10.34 | 10.35 | 9.78 | 10.24 |
| Viscosity Ratio – 14.7/s over 1200/s | 1.07 | 1.09 | 1.08 | 1.04 | 1.04 |
| Viscosity (cP) at 25 C and 1200/s | nm | nm | nm | nm | nm |
| Calculated Tg (C) – Fox Equation | 28.2 | 28.4 | 26.6 | 28.8 | 33.9 |
| RT % Elongation Limit | 213% | 213% | 213% | 213% | 213% |
| Stretch-Then-Heat % Elongation Limit | 163% | 213% | 213% | 175% | 175% |
| Moles Difunction in 1 kg of Ink | 0.073 | 0.043 | 0.066 | 0.080 | 0.065 |

TABLE 5g

| Example | K-0502 | K-0503 | K-0504 | K-0505 | K-0507 |
|---|---|---|---|---|---|
| Ingredients | | | | | |
| IOA | — | — | — | — | — |
| EHA | — | — | — | — | — |
| IBOA | 36.77 | 37.97 | 37.47 | 38.47 | 38.17 |
| THFA | 20.00 | 20.00 | 20.00 | 20.00 | 15.00 |
| EEEA | — | — | — | — | — |
| PEA | 15.90 | 15.90 | 15.90 | 15.90 | 20.90 |
| HDDA | — | — | — | — | — |
| HX-220 | — | — | — | — | — |
| VCAP | — | — | — | — | — |
| CN371 | — | — | — | — | — |
| CN981B88 | 9.70 | — | — | 4.00 | — |
| CN981 | — | 8.50 | 5.00 | — | 8.30 |
| E-1010 | — | — | — | — | — |
| 4188/M22 | — | — | — | 4.00 | — |
| 4188/EHA | — | — | — | — | — |
| TPO | 8.00 | 8.00 | 10.00 | 10.00 | 8.00 |
| DETX | 4.00 | 4.00 | 2.00 | 2.00 | 4.00 |
| T-152 | — | — | — | — | — |
| S-64 | 2.00 | 2.00 | 6.00 | 2.00 | 2.00 |
| T-144 | — | — | — | — | — |
| PR31 | — | — | — | — | — |
| Inhibitor #1 | 0.10 | 0.10 | 0.10 | 0.10 | 0.10 |
| Inhibitor #2 | 0.03 | 0.03 | 0.03 | 0.03 | 0.03 |
| SURF #1 | 0.90 | 0.90 | 0.90 | 0.90 | 0.90 |
| Dispersant #1 | — | — | — | — | — |
| Dispersant #2 | 0.74 | 0.74 | 0.74 | 0.74 | 0.74 |
| Synergist | — | — | — | — | — |
| PB 15:3 | — | — | — | — | — |
| PR 202 | — | — | — | — | — |
| PY 150 | — | — | — | — | — |
| PB 7 | 1.86 | 1.86 | 1.86 | 1.86 | 1.86 |
| PW 6 | — | — | — | — | — |
| Total | 100.00 | 100.00 | 100.00 | 100.00 | 100.00 |
| Data | | | | | |
| Viscosity (cP) at 45 C and 1200/s | 9.65 | 9.59 | 10.59 | 10.58 | 10.66 |
| Viscosity Ratio – 14.7/s over 1200/s | 1.02 | 1.04 | 1.03 | 1.03 | 1.03 |
| Viscosity (cP) at 25 C and 1200/s | nm | nm | nm | nm | 21.65 |
| Calculated Tg (C) – Fox Equation | 28.0 | 28.6 | 28.5 | 27.7 | 28.1 |
| RT % Elongation Limit | 213% | 213% | 213% | 213% | 213% |
| Stretch-Then-Heat % Elongation Limit | 138% | 150% | 175% | 200% | 150% |
| Moles Difunction in 1 kg of Ink | 0.118 | 0.066 | 0.039 | 0.049 | 0.065 |

TABLE 5h

| Example | K-0508 | LY-0501 | LC-0501 | LM-0501 | LK-0501 |
|---|---|---|---|---|---|
| Ingredients | | | | | |
| IOA | — | 1.37 | 0.58 | — | — |
| EHA | — | — | — | — | — |
| IBOA | 39.17 | 47.62 | 43.33 | 44.15 | 44.29 |
| THFA | 10.00 | 15.00 | 15.00 | 14.99 | 15.00 |
| EEEA | — | — | — | — | — |
| PEA | 25.90 | 15.90 | 20.90 | 20.90 | 20.90 |
| HDDA | — | — | — | — | — |
| HX-220 | — | — | — | — | — |
| VCAP | — | — | — | — | — |
| CN371 | — | — | — | — | — |
| CN981B88 | — | — | — | — | — |
| CN981 | 7.30 | 8.00 | 8.00 | 8.00 | 8.00 |
| E-1010 | — | — | — | — | — |
| 4188/M22 | — | — | — | — | — |
| 4188/EHA | — | 2.00 | 2.70 | 1.90 | 2.20 |
| TPO | 8.00 | 6.00 | 6.00 | 6.00 | 6.00 |
| DETX | 4.00 | — | — | — | — |
| T-152 | — | — | — | 2.00 | — |
| S-64 | 2.00 | 2.00 | — | — | 2.00 |
| T-144 | — | — | 2.00 | — | — |
| PR31 | — | — | — | — | — |
| Inhibitor #1 | 0.10 | 0.10 | 0.10 | 0.10 | 0.10 |
| Inhibitor #2 | 0.03 | 0.05 | 0.05 | 0.05 | 0.05 |
| SURF #1 | 0.90 | 0.90 | 0.90 | 0.90 | 0.90 |
| Dispersant #1 | — | 0.30 | 0.14 | 0.26 | — |
| Dispersant #2 | 0.74 | — | — | — | 0.16 |
| Synergist | — | — | 0.02 | — | — |
| PB 15:3 | — | — | 0.28 | — | — |
| PR 202 | — | — | — | 0.75 | — |
| PY 150 | — | 0.76 | — | — | — |
| PB 7 | 1.86 | — | — | — | 0.40 |
| PW 6 | — | — | — | — | — |
| Total | 100.00 | 100.00 | 100.00 | 100.00 | 100.00 |
| Data | | | | | |
| Viscosity (cP) at 45 C and 1200/s | 10.62 | 10.61 | 10.50 | 10.46 | 10.54 |
| Viscosity Ratio – 14.7/s over 1200/s | 1.04 | 1.07 | 1.00 | 1.00 | 1.00 |
| Viscosity (cP) at 25 C and 1200/s | 21.84 | 20.20 | nm | nm | nm |

TABLE 5h-continued

| Example | K-0508 | LY-0501 | LC-0501 | LM-0501 | LK-0501 |
|---|---|---|---|---|---|
| Calculated Tg (C) – Fox Equation | 28.3 | 34.4 | 28.9 | 30.6 | 30.5 |
| RT % Elongation Limit | 213% | 213% | nm | nm | nm |
| Stretch-Then-Heat % Elongation Limit | 150% | 175% | nm | nm | nm |
| Moles Difunction in1 kg of Ink | 0.057 | 0.063 | 0.063 | 0.063 | 0.063 |

The room temperature percent elongation limit determined by the stretch-then-heat test and the calculated glass transition temperature for the printed examples are presented in Table 5. Only example M-0516 with a calculated glass transition temperature of approximately 38 C had a room temperature percent elongation of less than 188%.

Two examples (M-0505 and M-0506) had very high levels of subsurface tack coming out of the printer. Examples M-0505 and M-0506 have calculated glass transition temperatures of approximately 19 C.

In general, an ink of a given color with a higher calculated glass transition temperature has lower subsurface tack and a reduced tendency to surface impress.

The data in FIG. 1 represented by the solid diamonds, open triangles, and stars are for examples that contain less than 0.1, between 0.1 and 0.2, and greater than or equal to 0.2 moles of difunctional reactants per kg of ink, respectively. As the amount of difunctional reactants per kg of ink was increased through these ranges, there was a greater tendency for the room temperature percent elongation limit to be less than 200% for ink examples with a calculated glass transition temperature of less than 45 C. This tendency is also seen in Table 6 below.

As shown in the top half of Table 6, if the number of moles of difunctional reactant per kg of ink is less than 0.1, then the room temperature percent elongation limit values were predominately (approximately 80%) equal to or greater than 200%. On the other hand, if the number of moles of difunctional reactant per kg of ink is equal to or more than 0.1, then none of the room temperature percent elongation limit values were equal to or greater than 200%.

Figure 2:
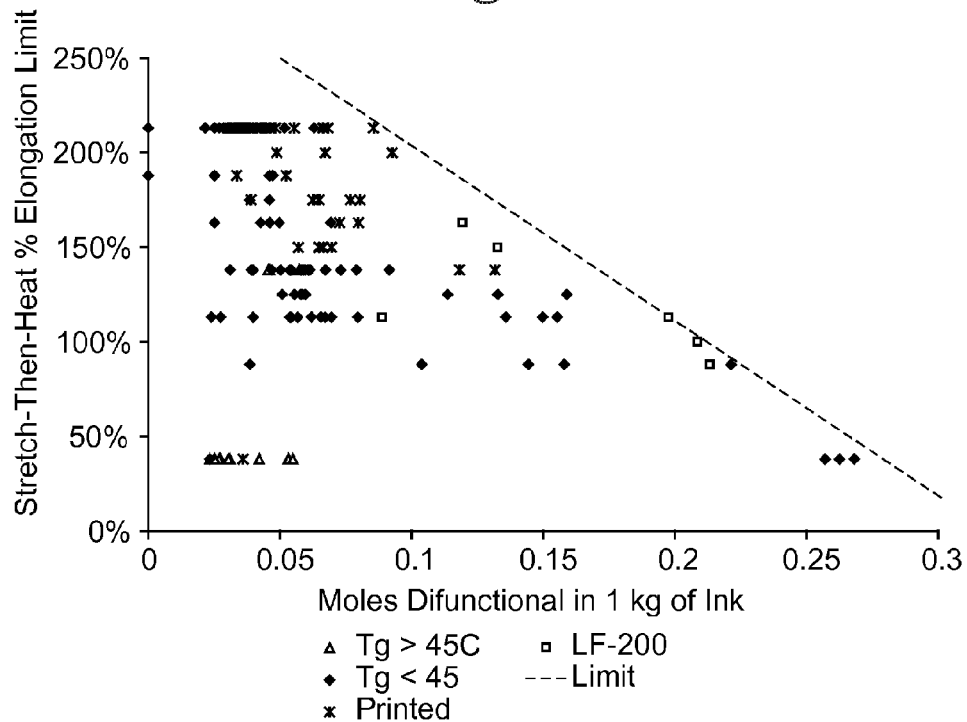
FIG. 2 is a graph of the stretch-then-heat percent elongation limits determined by the stretch-then-heat test are plotted against the number of moles of difunctional reactant per kg of ink for the Examples in Table 4.

The stretch-then-heat percent elongation limit (STHPEL) data in FIG. 2 are summarized in Table 7. The bottom half of Table 7 gives the stretch-then-heat percent elongation limit results for examples with a calculated glass transition of 45 C or greater. Of the thirteen example inks, ten (85%) had a stretch-then-heat percent elongation limit of 38%. The top half of Table 7 gives the stretch-then-heat percent elongation limit results for examples with a calculated glass transition of less than 45 C. Of the ninety-one example inks, only six (7%) had stretch-then-heat percent elongation limit of 38%. As shown in the top half of Table 7, as the number of moles of difunctional reactant per kg was increased, then the stretch-then-heat percent elongation limit values were shifted to lower values. When the number of moles of

TABLE 6

| | Room Temperature Percent Elongation Limit | | | |
|---|---|---|---|---|
| | Mols < 0.05 | 0.05 < Mols < 0.1 | 0.1 < Mols < 0.2 | 0.2 < Mols |
| Tg < 45 C | | | | |
| Total Number | 43 | 33 | 9 | 6 |
| RTPEL = 38% | 2% | 0% | 0% | 0% |
| 38% < RTPEL < 200% | 16% | 18% | 100% | 100% |
| RTPEL > 200% | 81% | 82% | 0% | 0% |
| Tg ≥ 45 C | | | | |
| Total Number | 10 | 3 | 0 | 0 |
| RTPEL = 38% | 90% | 67% | — | — |
| 38% < RTPEL < 200% | 10% | 33% | — | — |
| RTPEL > 200% | 0% | 0% | — | — |

The bottom half of Table 6 gives the room temperature percent elongation limit (RTPEL) results for examples with a calculated glass transition of 45 C or greater. Of the thirteen example inks, eleven (85%) had a room temperature percent elongation limit of 38%.

The top half of Table 6 gives the room temperature percent elongation limit results for examples with a calculated glass transition of less than 45 C. Of the ninety-one example inks, only one (1%) had room temperature percent elongation limit of 38%.

difunctional reactant per kg was less than 0.05, then approximately half (53%) the stretch-then-heat percent elongation limit values are greater than or equal to 200%. When the number of moles of difunctional reactant per kg was greater than or equal to 0.05 and less than 0.2, then almost all (39 of 42, or 93%) of the stretch-then-heat percent elongation limit values were between 38 and 200%. When the number of moles of difunctional reactant per kg was greater than or equal to 0.2, then almost all (5 of 6, or 83%) of the stretch-then-heat percent elongation limit values were 38%.

TABLE 7

Stretch-Then-Heat Percent Elongation Limit

| | Mols < 0.05 | 0.05 < Mols < 0.1 | 0.1 < Mols < 0.2 | 0.2 < Mols |
|---|---|---|---|---|
| Tg < 45 C | | | | |
| Total Number | 43 | 33 | 9 | 6 |
| STHPEL = 38% | 2% | 0% | 0% | 83% |
| 38% < STHPEL < 200% | 44% | 91% | 100% | 17% |
| STHPEL > 200% | 53% | 9% | 0% | 0% |
| Tg ≥ 45 C | | | | |
| Total Number | 10 | 3 | 0 | 0 |
| STHPEL = 38% | 80% | 67% | — | — |
| 38% < STHPEL < 200% | 20% | 33% | — | — |
| STHPEL > 200% | 0% | 0% | — | — |

TABLE 8a

| Example | Y-0801 | Y-0802 | Y-0803 | Y-0804 |
|---|---|---|---|---|
| Ingredients | | | | |
| IOA | 3.60 | 3.60 | 3.60 | 3.60 |
| IBOA | 42.70 | 42.70 | 42.70 | 42.70 |
| THFA | 15.00 | 15.00 | 15.00 | 15.00 |
| PEA | 15.90 | 15.90 | 15.90 | 15.90 |
| 4188/M22 | 6.00 | 5.00 | 3.00 | 1.00 |
| CN929 | 1.00 | 2.00 | 4.00 | 6.00 |
| CN989 | — | — | — | — |
| CN9008 | — | — | — | — |
| TPO | 8.00 | 8.00 | 8.00 | 8.00 |
| DETX | 2.00 | 2.00 | 2.00 | 2.00 |
| S-64 | 2.00 | 2.00 | 2.00 | 2.00 |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 0.80 | 0.80 | 0.80 | 0.80 |
| PY 150 | 2.00 | 2.00 | 2.00 | 2.00 |
| Total | 100.00 | 100.00 | 100.00 | 100.00 |
| Data | | | | |
| Viscosity (cP) at 45 C and 1200/s | 10.31 | 10.17 | 9.91 | 9.56 |
| Viscosity Ratio – 14.7/s over 1200/s | 1.10 | 1.15 | 1.13 | 1.12 |
| Predicted Tg (C) – Fox Equation | 28 | 28 | 29 | 29 |
| RT % Elongation Limit | 213% | 213% | 213% | 213% |
| Stretch-Then-Heat % Elongation Limit | 213% | 200% | 125% | 113% |

TABLE 8b

| Example | Y-0805 | Y-0806 | Y-0807 | Y-0808 |
|---|---|---|---|---|
| Ingredients | | | | |
| IOA | 3.60 | 3.60 | 3.60 | 3.60 |
| IBOA | 42.70 | 42.70 | 42.70 | 42.70 |
| THFA | 15.00 | 15.00 | 15.00 | 15.00 |
| PEA | 15.90 | 15.90 | 15.90 | 15.90 |
| 4188/M22 | 6.00 | 5.00 | 3.00 | 1.00 |
| CN929 | — | — | — | — |
| CN989 | 1.00 | 2.00 | 4.00 | 6.00 |
| CN9008 | — | — | — | — |
| TPO | 8.00 | 8.00 | 8.00 | 8.00 |
| DETX | 2.00 | 2.00 | 2.00 | 2.00 |
| S-64 | 2.00 | 2.00 | 2.00 | 2.00 |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 0.80 | 0.80 | 0.80 | 0.80 |
| PY 150 | 2.00 | 2.00 | 2.00 | 2.00 |
| Total | 100.00 | 100.00 | 100.00 | 100.00 |
| Data | | | | |
| Viscosity (cP) at 45 C and 1200/s | 10.31 | 10.27 | 9.93 | 9.76 |
| Viscosity Ratio – 14.7/s over 1200/s | 1.10 | 1.09 | 1.09 | 1.07 |
| Predicted Tg (C) – Fox Equation | 28 | 29 | 31 | 33 |
| RT % Elongation Limit | 213% | 213% | 213% | 213% |
| Stretch-Then-Heat % Elongation Limit | 213% | 213% | 163% | 113% |

TABLE 8c

| Example | Y-0809 | Y-0810 | Y-0811 | Y-0812 |
|---|---|---|---|---|
| Ingredients | | | | |
| IOA | 3.60 | 3.60 | 3.60 | 3.60 |
| IBOA | 42.70 | 42.70 | 42.70 | 42.70 |
| THFA | 15.00 | 15.00 | 15.00 | 15.00 |
| PEA | 15.90 | 15.90 | 15.90 | 15.90 |
| 4188/M22 | 6.00 | 5.00 | 3.00 | 1.00 |
| CN929 | — | — | — | — |
| CN989 | — | — | — | — |
| CN9008 | 1.00 | 2.00 | 4.00 | 6.00 |
| TPO | 8.00 | 8.00 | 8.00 | 8.00 |
| DETX | 2.00 | 2.00 | 2.00 | 2.00 |
| S-64 | 2.00 | 2.00 | 2.00 | 2.00 |
| Inhibitor #1 | 0.10 | 0.10 | 0.10 | 0.10 |
| Inhibitor #2 | 0.01 | 0.01 | 0.01 | 0.01 |
| SURF #1 | 0.90 | 0.90 | 0.90 | 0.90 |
| Dispersant #1 | 0.80 | 0.80 | 0.80 | 0.80 |
| PY 150 | 2.00 | 2.00 | 2.00 | 2.00 |
| Total | 100.00 | 100.00 | 100.00 | 100.00 |
| Data | | | | |
| Viscosity (cP) at 45 C and 1200/s | 10.12 | 9.91 | 9.39 | 8.82 |
| Viscosity Ratio – 14.7/s over 1200/s | 1.07 | 1.10 | 1.06 | 1.06 |
| Predicted Tg (C) – Fox Equation | 29 | 30 | 32 | 35 |
| RT % Elongation Limit | 213% | 213% | 188% | 113% |
| Stretch-Then-Heat % Elongation Limit | 213% | 163% | 88% | 38% |

TABLE 9a

| Example | C-0901 | C-0902 | C-0903 | C-0904 | C-0905 |
|---|---|---|---|---|---|
| Ingredients | | | | | |
| IOA | 2.70 | 2.70 | 2.70 | 2.70 | 2.70 |
| IBOA | 41.30 | 26.30 | 26.30 | 26.30 | 26.30 |

TABLE 9a-continued

| Example | C-0901 | C-0902 | C-0903 | C-0904 | C-0905 |
|---|---|---|---|---|---|
| THFA | 20.00 | 20.00 | 20.00 | 20.00 | 20.00 |
| PEA | 15.90 | 15.90 | 15.90 | 15.90 | 15.90 |
| TC-110S | — | 15.00 | — | — | — |
| HX-620 | — | — | 15.00 | — | — |
| DCPA | — | — | — | 15.00 | — |
| CTFA | — | — | — | — | 15.00 |
| PEA 6 | — | — | — | — | — |
| DAAM | — | — | — | — | — |
| Medol 10 | — | — | — | — | — |
| M144 | — | — | — | — | — |
| M164 | — | — | — | — | — |
| M166 | — | — | — | — | — |
| 1122 | — | — | — | — | — |
| CN981 | 5.00 | 5.00 | 5.00 | 5.00 | 5.00 |
| CN131 | — | — | — | — | — |
| CN3105 | — | — | — | — | — |
| CN3100 | — | — | — | — | — |
| 4188/M22 | — | — | — | — | — |
| 4188/EHA | — | — | — | — | — |
| DM5400 | — | — | — | — | — |
| CN9001 | — | — | — | — | — |
| E-1010 | — | — | — | — | — |
| TPO | 8.00 | 8.00 | 8.00 | 8.00 | 8.00 |
| DETX | 2.00 | 2.00 | 2.00 | 2.00 | 2.00 |
| S-64 | 2.00 | 2.00 | 2.00 | 2.00 | 2.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Synergist | 0.12 | 0.12 | 0.12 | 0.12 | 0.12 |
| PB 15:3 | 1.33 | 1.33 | 1.33 | 1.33 | 1.33 |
| Total | 100.00 | 100.00 | 100.00 | 100.00 | 100.00 |
| Data | | | | | |
| Viscosity (cP) at 45 C and 1200/s | 7.30 | 10.98 | 12.03 | 7.84 | 8.08 |
| Viscosity Ratio – 14.7/s over 1200/s | 1.05 | 1.03 | 1.03 | 1.14 | 1.04 |
| Calculated Tg (C) – Fox Equation | 27.3 | −0.5 | 6.9 | — | 20.0 |

TABLE 9b

| Example | C-0906 | C-0907 | C-0908 | C-0909 | C-0910 |
|---|---|---|---|---|---|
| Ingredients | | | | | |
| IOA | 2.70 | 2.70 | 2.70 | 2.70 | 2.70 |
| IBOA | 26.30 | 26.30 | 26.30 | 26.30 | 26.30 |
| THFA | 20.00 | 20.00 | 20.00 | 20.00 | 20.00 |
| PEA | 15.90 | 15.90 | 15.90 | 15.90 | 15.90 |
| TC-110S | — | — | — | — | — |
| HX-620 | — | — | — | — | — |
| DCPA | — | — | — | — | — |
| CTFA | — | — | — | — | — |
| PEA 6 | 15.00 | — | — | — | — |
| DAAM | — | 15.00 | — | — | — |
| Medol 10 | — | — | 15.00 | — | — |
| M144 | — | — | — | 15.00 | — |
| M164 | — | — | — | — | 15.00 |
| M166 | — | — | — | — | — |
| 1122 | — | — | — | — | — |
| CN981 | 5.00 | 5.00 | 5.00 | 5.00 | 5.00 |
| CN131 | — | — | — | — | — |
| CN3105 | — | — | — | — | — |
| CN3100 | — | — | — | — | — |
| 4188/M22 | — | — | — | — | — |
| 4188/EHA | — | — | — | — | — |
| DM5400 | — | — | — | — | — |
| CN9001 | — | — | — | — | — |
| E-1010 | — | — | — | — | — |
| TPO | 8.00 | 8.00 | 8.00 | 8.00 | 8.00 |
| DETX | 2.00 | 2.00 | 2.00 | 2.00 | 2.00 |
| S-64 | 2.00 | 2.00 | 2.00 | 2.00 | 2.00 |

TABLE 9b-continued

| Example | C-0906 | C-0907 | C-0908 | C-0909 | C-0910 |
|---|---|---|---|---|---|
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Synergist | 0.12 | 0.12 | 0.12 | 0.12 | 0.12 |
| PB 15:3 | 1.33 | 1.33 | 1.33 | 1.33 | 1.33 |
| Total | 100.00 | 100.00 | 100.00 | 100.00 | 100.00 |
| Data | | | | | |
| Viscosity (cP) at 45 C and 1200/s | 10.05 | 9.31 | 7.02 | 8.78 | 10.16 |
| Viscosity Ratio – 14.7/s over 1200/s | 1.04 | 1.05 | 1.04 | 1.04 | 1.04 |
| Calculated Tg (C) – Fox Equation | — | 25.2 | 11.7 | — | 7.2 |

TABLE 9c

| Example | C-0911 | C-0912 | C-0913 | C-0914 | C-0915 |
|---|---|---|---|---|---|
| Ingredients | | | | | |
| IOA | 2.70 | 2.70 | 2.70 | 2.70 | 2.70 |
| IBOA | 26.30 | 26.30 | 26.30 | 26.30 | 26.30 |
| THFA | 20.00 | 20.00 | 20.00 | 20.00 | 20.00 |
| PEA | 15.90 | 15.90 | 15.90 | 15.90 | 15.90 |
| TC-110S | — | — | — | — | — |
| HX-620 | — | — | — | — | — |
| DCPA | — | — | — | — | — |
| CTFA | — | — | — | — | — |
| PEA 6 | — | — | — | — | — |
| DAAM | — | — | — | — | — |
| Medol 10 | — | — | — | — | — |
| M144 | — | — | — | — | — |
| M164 | — | — | — | — | — |
| M166 | 15.00 | — | — | — | — |
| 1122 | — | 15.00 | — | — | — |
| CN981 | 5.00 | 5.00 | — | 5.00 | 5.00 |
| CN131 | — | — | 15.00 | — | — |
| CN3105 | — | — | — | 15.00 | — |
| CN3100 | — | — | — | — | 15.00 |
| 4188/M22 | — | — | — | — | — |
| 4188/EHA | — | — | — | — | — |
| DM5400 | — | — | — | — | — |
| CN9001 | — | — | — | — | — |
| E-1010 | — | — | — | — | — |
| TPO | 8.00 | 8.00 | 8.00 | 8.00 | 8.00 |
| DETX | 2.00 | 2.00 | 2.00 | 2.00 | 2.00 |
| S-64 | 2.00 | 2.00 | 2.00 | 2.00 | 2.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| SURF #1 | 0.90 | 0.90 | 0.90 | 0.90 | 0.90 |
| Dispersant #1 | 0.65 | 0.65 | 0.65 | 0.65 | 0.65 |
| Synergist | 0.12 | 0.12 | 0.12 | 0.12 | 0.12 |
| PB 15:3 | 1.33 | 1.33 | 1.33 | 1.33 | 1.33 |
| Total | 100.00 | 100.00 | 100.00 | 100.00 | 100.00 |
| Data | | | | | |
| Viscosity (cP) at 45 C and 1200/s | 11.12 | 9.29 | 14.77 | 12.41 | 11.16 |
| Viscosity Ratio – 14.7/s over 1200/s | 1.04 | 1.06 | 20.85 | 1.43 | 1.11 |
| Calculated Tg (C) – Fox Equation | 4.0 | 12.5 | 13.9 | 14.1 | 14.4 |

TABLE 9d

| Example | C-0916 | C-0917 | C-0918 |
|---|---|---|---|
| Ingredients | | | |
| IOA | 2.70 | 2.70 | 2.70 |
| IBOA | 36.30 | 36.30 | 36.30 |
| THFA | 20.00 | 20.00 | 20.00 |
| PEA | 15.90 | 15.90 | 15.90 |
| TC-110S | — | — | — |
| HX-620 | — | — | — |
| DCPA | — | — | — |
| CTFA | — | — | — |
| PEA 6 | — | — | — |
| DAAM | — | — | — |
| Medol 10 | — | — | — |
| M144 | — | — | — |
| M164 | — | — | — |
| M166 | — | — | — |
| 1122 | — | — | — |
| CN981 | 5.00 | 5.00 | 5.00 |
| CN131 | — | — | — |
| CN3105 | — | — | — |
| CN3100 | 5.00 | — | — |
| 4188/M22 | — | 5.00 | — |
| 4188/EHA | — | — | 5.00 |
| DM5400 | — | — | — |
| CN9001 | — | — | — |
| E-1010 | — | — | — |
| TPO | 8.00 | 8.00 | 8.00 |
| DETX | 2.00 | 2.00 | 2.00 |
| S-64 | 2.00 | 2.00 | 2.00 |
| Inhibitor #1 | 0.10 | 0.10 | 0.10 |
| Inhibitor #2 | 0.00 | 0.00 | 0.00 |
| SURF #1 | 0.90 | 0.90 | 0.90 |
| Dispersant #1 | 0.65 | 0.65 | 0.65 |
| Synergist | 0.12 | 0.12 | 0.12 |
| PB 15:3 | 1.33 | 1.33 | 1.33 |
| Total | 100.00 | 100.00 | 100.00 |
| Data | | | |
| Viscosity (cP) at 45 C. and 1200/s | 8.53 | 12.07 | 13.82 |
| Viscosity Ratio - 14.7/s over 1200/s | 1.54 | 1.05 | 1.04 |
| Calculated Tg (C.) - Fox Equation | 22.9 | 22.2 | 21.2 |

TABLE 9e

| Example | C-0920 | C-0921 | C-0922 |
|---|---|---|---|
| Ingredients | | | |
| IOA | 2.70 | 2.70 | 2.70 |
| IBOA | 36.30 | 36.30 | 36.30 |
| THFA | 20.00 | 20.00 | 20.00 |
| PEA | 15.90 | 15.90 | 15.90 |
| TC-110S | — | — | — |
| HX-620 | — | — | — |
| DCPA | — | — | — |
| CTFA | — | — | — |
| PEA 6 | — | — | — |
| DAAM | — | — | — |
| Medol 10 | — | — | — |
| M144 | — | — | — |
| M164 | — | — | — |
| M166 | — | — | — |
| 1122 | — | — | — |
| CN981 | 5.00 | 5.00 | 5.00 |
| CN131 | — | — | — |
| CN3105 | — | — | — |
| CN3100 | — | — | — |
| 4188/M22 | — | — | — |
| 4188/EHA | — | — | — |
| DM5400 | 5.00 | — | — |
| CN9001 | — | 5.00 | — |
| E-1010 | — | — | 5.00 |
| TPO | 8.00 | 8.00 | 8.00 |
| DETX | 2.00 | 2.00 | 2.00 |
| S-64 | 2.00 | 2.00 | 2.00 |
| Inhibitor #1 | 0.10 | 0.10 | 0.10 |
| Inhibitor #2 | 0.00 | 0.00 | 0.00 |
| SURF #1 | 0.90 | 0.90 | 0.90 |
| Dispersant #1 | 0.65 | 0.65 | 0.65 |
| Synergist | 0.12 | 0.12 | 0.12 |
| PB 15:3 | 1.33 | 1.33 | 1.33 |
| Total | 100.00 | 100.00 | 100.00 |
| Data | | | |
| Viscosity (cP) at 45 C. and 1200/s | 12.84 | 13.61 | 12.88 |
| Viscosity Ratio - 14.7/s over 1200/s | 1.04 | 1.04 | 1.04 |
| Calculated Tg (C.) - Fox Equation | — | 25.9 | 24.0 |

The examples in Table 9 contain a different reactant at either 5 or 15 wt %. The viscosities of these samples were measured and their viscosity ratios at shear rates of 14.7/s and 1200/s were calculated. A larger viscosity ratio indicates that an ingredient may be interacting with the pigment and could potentially destabilize the dispersion over time.

Five of the examples (C-0904 and C-0913 through C-0916) in Table 9 had a viscosity ratio of greater than 1.1. The ingredients screened in these examples were DCPA, CN131, CN3100 and CN3105. These are not preferred ingredients. CN131, CN3100 and CN3105 are mono-functional acrylated oligomers containing hydroxyl-functionality and all have a number average molecular weight below 500 g/mol as measured by GPC. CN131, CN3100 and CN3105 have published viscosities at 25 C of 170, 370 and 300 mPa*s.

Four of the examples (C-0912, and C-0917 through C-0919) contained a mono-functional acrylated urethane which is free of hydroxyl-functionality. These four samples had a viscosity ratio below 1.1. Example C-0912 contained 1122 which has a low viscosity (20-50 mPa*s at 25 C) and has a molecular weight of approximately 215 g/mol. The three other examples contain a high viscosity, high molecular weight mono-functional acrylated urethane. Examples C-0917 and C-0918 contained 4188/M22 which has a high viscosity (60,000-85,000 mPa*s at 25 C) and 4188/EHA which has a high viscosity (100,000-140,000 mPa*s at 25 C) per their technical data sheets. The high molecular weight portion of 4188/M22 and 4188/EHA has a number average molecular weight of 5900 g/mol as measured by GPC. Example C-0919 contained DM500 which has a published viscosity of 30,000-50,000 mPa*s at 25 C and has a number average molecular weight of approximately 4000 g/mol as measured by GPC.

Example C-0921 contains 5% of E-1010. E-1010 is mono-functional acrylated polymethacrylate resin. E-1010 is a solid at room temperature.

Comparative Examples

Table 10 contains the calculated glass transition temperature, the room temperature percent elongation limit, the stretch-then heat percent elongation limit, and the moles of difunctional reactant in 1 kg of ink for the Mimaki UVink LF-200 series (manufactured by 3M, St. Paul, Minn., USA) and for the 3M Piezo Ink Jet Ink Series 2200UV (3M, St. Paul, Minn., USA).

The moles of difunctional reactant in 1 kg of ink are greater than 0.3 and the calculated glass transition temperatures are below 45 C for all five of the 3M Series 2200UV inks listed in Table 10. In agreement with FIG. 1, the room temperature percent elongation limit values are above 38%. In agreement with FIG. 2, the stretch-then-heat percent elongation limit values are 38%. The 3M Series 2200 UV inks contain less than 0.2% of a 2,2,6,6-tetramethylpiperidinyl compound with an oxygen radical attached to the 2,2,6,6-tetramethylpiperidinyl nitrogen atom(s).

The moles of difunctional reactant in 1 kg of ink are below than 0.3 and the calculated glass transition temperatures are below 45 C for all five of the Mimaki UVink LF-200 inks listed in Table 10. In agreement with FIG. 1, the room temperature percent elongation limit values are above 38%. In agreement with FIG. 2, the stretch-then-heat percent elongation limit values are above 38%. These data are shown as the open rectangles in FIG. 1 and FIG. 2.

The LF-200 white "v5" ink contains more than 0.5 wt % of a "polymeric" 2,2,6,6-tetramethylpiperidinyl compound with predominately carbon atoms attached to their 2,2,6,6-tetramethylpiperidinyl nitrogen atoms. The LF-200 white "v5" ink contains less than 0.2% of a 2,2,6,6-tetramethylpiperidinyl compound with an oxygen radical attached to the 2,2,6,6-tetramethylpiperidinyl nitrogen atom(s). The calculated glass transition temperature for this ink is below 20 C.

The five other LF-200 inks ink contains more than 0.5 wt % of a 2,2,6,6-tetramethylpiperidinyl compound with predominately an ether group attached to their 2,2,6,6-tetramethylpiperidinyl nitrogen atoms. These five ink also contain less than 0.2% of a 2,2,6,6-tetramethylpiperidinyl compound with an oxygen radical attached to the 2,2,6,6-tetramethylpiperidinyl nitrogen atom(s). Inks similar to the LF-200 cyan, magenta, yellow and black inks were tested in the VUTEk printer. The prints had substantial sub-surface tack exiting the printer.

The room temperature percent elongation limit values were equal to 213% for all thicknesses. The stretch-then-heat percent elongation limits values decreased as the ink thickness increased.

Examples C-1102 had a calculated glass transition temperature of 45 C. The room temperature and stretch-then-heat percent elongation limit values dropped from 213% to 38% when for thicknesses greater than or equal to approximately 25 microns.

When a droplet is placed at every pixel (100% fill maximum), the VUTEk GS3250LX printer deposits an ink film thickness of approximately 10 micrometers. For digital printing, the ink limiting function is typically set at 250 to 300%. This translates to an ink film thickness of approximately 25 to 30 micrometers; which is approximately the thickness obtained from a two-layer coating with a red-handled wire-wound rod. Testing at an ink film thickness of 3 micrometers is not adequate.

TABLE 10

| Ink Color | Cyan | Magenta | Yellow | Black | White 1 | White 2 |
|---|---|---|---|---|---|---|
| Mimaki UVink LF-200 | SPC-0591C | SPC-0591M | SPC-0591Y | SPC-0591K | SPC-0591W | "v5" |
| Calculated Tg (C.) - Fox Equation | 27.6 | 28.7 | 28.2 | 25.0 | 27.5 | 17.5 |
| RT % Elongation Limit | 163% | 188% | 163% | 138% | 213% | 188% |
| Stretch-Then-Heat % Elongation | 100% | 150% | 113% | 88% | 163% | 113% |
| Moles difunctional in 1 kg of ink | 0.21 | 0.13 | 0.20 | 0.21 | 0.12 | 0.10 |
| 3M Series 2200 UV | 2296 | 2291 | 2292 | 2295 | 2280 | |
| Calculated Tg (C.) - Fox Equation | −1.7 | −4.1 | −1.0 | −2.1 | 4.4 | |
| RT % Elongation Limit | 63% | 63% | 38% | 38% | 63% | |
| Stretch-Then-Heat % Elongation | 38% | 38% | 38% | 38% | 38% | |
| Moles difunctional in 1 kg of ink | 0.55 | 0.48 | 0.54 | 0.54 | 0.36 | |

Thickness Dependence of the Room Temperature and Stretch-then-Heat Percent Elongation Limits The thickness dependence of the room temperature and stretch-then-heat percent elongation limits for two different examples were measured and tabulated in Table 11. Coatings were made with a white-handled wire-wound coating rod once and twice to obtain thickness of approximately 4 and 8 micrometers, respectively. Coatings were made with a red-handled wire-wound coating rod once, twice and three times to obtain thickness of approximately 12, 25 and 38 micrometers, respectively.

Examples C-1101 had a calculated glass transition temperature of approximately 24 C.

TABLE 11

| Example | C-1101 | C-1102 |
|---|---|---|
| Ingredients | | |
| IOA | 2.70 | 2.70 |
| IBOA | 39.50 | 54.70 |
| PEA | 35.90 | 20.90 |
| CN981 | 6.80 | 6.60 |
| TPO | 10.00 | 10.00 |
| T-144 | 2.00 | 2.00 |
| Inhibitor #1 | 0.10 | 0.10 |
| Inhibitor #2 | 0.00 | 0.00 |

TABLE 11-continued

| Example | C-1101 | C-1102 |
|---|---|---|
| TF-425 | 0.90 | 0.90 |
| Dispersant #1 | 0.65 | 0.65 |
| Synergist | 0.12 | 0.12 |
| PB 15:3 | 1.33 | 1.33 |
| Total | 100.00 | 100.00 |
| Data | | |
| Viscosity (cP) at 45 C. and 1200/s | 10.45 | 10.49 |
| Viscosity Ratio - 14.7/s over 1200/s | 1.04 | 1.08 |
| Calculated Tg (C.) - Fox Equation | 23.8 | 45.0 |

TABLE 11-continued

| Example | C-1101 | C-1102 |
|---|---|---|
| RT % Elongation Limit | | |
| at 0.15 mils (4 microns) | 213% | 213% |
| at 0.3 mils (8 microns) | 213% | 213% |
| at 0.5 mils (12 microns) | 213% | 213% |
| at 1 mils (25 microns) | 213% | 38% |
| at 1.5 mils (38 microns) | 213% | 38% |
| Stretch-Then-Heat % Elongation | | |

TABLE 11-continued

| Example | C-1101 | C-1102 |
|---|---|---|
| Limit | | |
| at 0.15 mils (4 microns) | 213% | 213% |
| at 0.3 mils (8 microns) | 213% | 213% |
| at 0.5 mils (12 microns) | 188% | 213% |
| at 1 mils (25 microns) | 163% | 38% |
| at 1.5 mils (38 microns) | 138% | 38% |

TABLE 12a

| Example | LY-1201 | LY-1202 | LY-1203 | LY-1204 | LY-1205 |
|---|---|---|---|---|---|
| Ingredients | | | | | |
| IOA | 1.37 | 1.37 | 1.37 | 1.37 | 1.37 |
| IBOA | 54.67 | 49.67 | 44.67 | 39.67 | 53.67 |
| THFA | 10.00 | 10.00 | 10.00 | 10.00 | 10.00 |
| PEA | 15.90 | 20.90 | 25.90 | 30.90 | 15.90 |
| HDDA | — | — | — | — | 1.00 |
| CN981B88 | 4.00 | 4.00 | 4.00 | 4.00 | 4.00 |
| 4188/EHA | 5.50 | 5.50 | 5.50 | 5.50 | 5.50 |
| TPO | 6.00 | 6.00 | 6.00 | 6.00 | 6.00 |
| S-64 | 0.50 | 0.50 | 0.50 | 0.50 | 0.50 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 11.27 | 11.27 | 11.37 | 11.45 | 11.20 |
| Viscosity Ratio - 14.7/s over 1200/s | 1.12 | 1.03 | 1.03 | 1.05 | 1.04 |
| Calculated Tg (C.) - Fox Equation | 39.9 | 33.3 | 26.9 | 20.9 | 39.4 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.04 | 0.04 | 0.04 | 0.04 | 0.09 |

TABLE 12b

| Example | LY-1206 | LY-1207 | LY-1208 | LY-1209 | LY-1210 |
|---|---|---|---|---|---|
| Ingredients | | | | | |
| IOA | 1.37 | 1.37 | 1.37 | 1.37 | 1.37 |
| IBOA | 48.67 | 43.67 | 38.67 | 52.67 | 47.67 |
| THFA | 10.00 | 10.00 | 10.00 | 10.00 | 10.00 |
| PEA | 20.90 | 25.90 | 30.90 | 15.90 | 20.90 |
| HDDA | 1.00 | 1.00 | 1.00 | 2.00 | 2.00 |
| CN981B88 | 4.00 | 4.00 | 4.00 | 4.00 | 4.00 |
| 4188/EHA | 5.50 | 5.50 | 5.50 | 5.50 | 5.50 |
| TPO | 6.00 | 6.00 | 6.00 | 6.00 | 6.00 |
| S-64 | 0.50 | 0.50 | 0.50 | 0.50 | 0.50 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 11.26 | 11.33 | 11.42 | 11.14 | 11.21 |
| Viscosity Ratio - 14.7/s over 1200/s | 1.04 | 1.04 | 1.04 | 1.05 | 1.04 |
| Calculated Tg (C.) - Fox Equation | 32.8 | 26.5 | 20.5 | 38.9 | 32.4 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.09 | 0.09 | 0.09 | 0.13 | 0.13 |

TABLE 12c

| Example | LY-1211 | LY-1212 | LY-1213 | LY-1214 | LY-1215 |
|---|---|---|---|---|---|
| Ingredients | | | | | |
| IOA | 1.37 | 1.37 | 1.37 | 1.37 | 1.37 |
| IBOA | 42.67 | 37.67 | 51.67 | 46.67 | 41.67 |
| THFA | 10.00 | 10.00 | 10.00 | 10.00 | 10.00 |
| PEA | 25.90 | 30.90 | 15.90 | 20.90 | 25.90 |
| HDDA | 2.00 | 2.00 | 3.00 | 3.00 | 3.00 |
| CN981B88 | 4.00 | 4.00 | 4.00 | 4.00 | 4.00 |
| 4188/EHA | 5.50 | 5.50 | 5.50 | 5.50 | 5.50 |
| TPO | 6.00 | 6.00 | 6.00 | 6.00 | 6.00 |
| S-64 | 0.50 | 0.50 | 0.50 | 0.50 | 0.50 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 11.27 | 11.39 | 11.09 | 11.23 | 11.19 |
| Viscosity Ratio - 14.7/s over 1200/s | 1.03 | 1.05 | 1.03 | 1.03 | 1.03 |
| Calculated Tg (C.) - Fox Equation | 26.1 | 20.0 | 38.5 | 31.9 | 25.7 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.13 | 0.13 | 0.17 | 0.17 | 0.17 |

TABLE 12d

| Example | LY-1216 | LY-1217 | LY-1218 | LY-1219 | LY-1220 |
|---|---|---|---|---|---|
| Ingredients | | | | | |
| IOA | 1.37 | 1.37 | 1.37 | 1.37 | 1.37 |
| IBOA | 36.67 | 54.67 | 49.67 | 44.67 | 39.67 |
| THFA | 10.00 | 10.00 | 10.00 | 10.00 | 10.00 |
| PEA | 30.90 | 15.90 | 20.90 | 25.90 | 30.90 |
| HDDA | 3.00 | — | — | — | — |
| CN981B88 | 4.00 | 4.00 | 4.00 | 4.00 | 4.00 |
| 4188/EHA | 5.50 | 5.00 | 5.00 | 5.00 | 5.00 |
| TPO | 6.00 | 6.00 | 6.00 | 6.00 | 6.00 |
| S-64 | 0.50 | 1.00 | 1.00 | 1.00 | 1.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 11.30 | 10.95 | 10.96 | 11.04 | 11.12 |
| Viscosity Ratio - 14.7/s over 1200/s | 1.05 | 1.05 | 1.05 | 1.04 | 1.04 |
| Calculated Tg (C.) - Fox Equation | 19.6 | 40.3 | 33.6 | 27.2 | 21.1 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.17 | 0.04 | 0.04 | 0.04 | 0.04 |

TABLE 12e

| Example | LY-1221 | LY-1222 | LY-1223 | LY-1224 | LY-1225 |
|---|---|---|---|---|---|
| Ingredients | | | | | |
| IOA | 1.37 | 1.37 | 1.37 | 1.37 | 1.37 |
| IBOA | 53.67 | 48.67 | 43.67 | 38.67 | 52.67 |
| THFA | 10.00 | 10.00 | 10.00 | 10.00 | 10.00 |
| PEA | 15.90 | 20.90 | 25.90 | 30.90 | 15.90 |
| HDDA | 1.00 | 1.00 | 1.00 | 1.00 | 2.00 |

TABLE 12e-continued

| Example | LY-1221 | LY-1222 | LY-1223 | LY-1224 | LY-1225 |
|---|---|---|---|---|---|
| CN981B88 | 4.00 | 4.00 | 4.00 | 4.00 | 4.00 |
| 4188/EHA | 5.00 | 5.00 | 5.00 | 5.00 | 5.00 |
| TPO | 6.00 | 6.00 | 6.00 | 6.00 | 6.00 |
| S-64 | 1.00 | 1.00 | 1.00 | 1.00 | 1.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 10.93 | 11.60 | 10.96 | 10.96 | 10.88 |
| Viscosity Ratio - 14.7/s over 1200/s | 1.05 | 1.00 | 1.05 | 1.05 | 1.04 |
| Calculated Tg (C.) - Fox Equation | 39.8 | 33.2 | 26.8 | 20.7 | 39.3 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.09 | 0.09 | 0.09 | 0.09 | 0.13 |

TABLE 12f

| Example | LY-1226 | LY-1227 | LY-1228 | LY-1229 | LY-1230 |
|---|---|---|---|---|---|
| Ingredients | | | | | |
| IOA | 1.37 | 1.37 | 1.37 | 1.37 | 1.37 |
| IBOA | 47.67 | 42.67 | 37.67 | 51.67 | 46.67 |
| THFA | 10.00 | 10.00 | 10.00 | 10.00 | 10.00 |
| PEA | 20.90 | 25.90 | 30.90 | 15.90 | 20.90 |
| HDDA | 2.00 | 2.00 | 2.00 | 3.00 | 3.00 |
| CN981B88 | 4.00 | 4.00 | 4.00 | 4.00 | 4.00 |
| 4188/EHA | 5.00 | 5.00 | 5.00 | 5.00 | 5.00 |
| TPO | 6.00 | 6.00 | 6.00 | 6.00 | 6.00 |
| S-64 | 1.00 | 1.00 | 1.00 | 1.00 | 1.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 10.98 | 10.99 | 11.08 | 10.83 | 10.87 |
| Viscosity Ratio - 14.7/s over 1200/s | 1.08 | 1.05 | 1.04 | 1.04 | 1.04 |
| Calculated Tg (C.) - Fox Equation | 32.7 | 26.4 | 20.3 | 38.8 | 32.2 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.13 | 0.13 | 0.13 | 0.17 | 0.17 |

TABLE 12g

| Example | LY-1231 | LY-1232 | LY-1233 | LY-1234 | LY-1235 |
|---|---|---|---|---|---|
| Ingredients | | | | | |
| IOA | 1.37 | 1.37 | 1.37 | 1.37 | 1.37 |
| IBOA | 41.67 | 36.67 | 43.67 | 38.67 | 42.67 |
| THFA | 10.00 | 10.00 | 10.00 | 10.00 | 10.00 |
| PEA | 25.90 | 30.90 | 20.90 | 25.90 | 20.90 |
| HDDA | 3.00 | 3.00 | 1.00 | 1.00 | 2.00 |
| CN981B88 | 4.00 | 4.00 | 4.00 | 4.00 | 4.00 |
| 4188/EHA | 5.00 | 5.00 | 10.00 | 10.00 | 10.00 |
| TPO | 6.00 | 6.00 | 6.00 | 6.00 | 6.00 |
| S-64 | 1.00 | 1.00 | 1.00 | 1.00 | 1.00 |
| Inhibitor #1 | 0.10 | 0.10 | 0.10 | 0.10 | 0.10 |
| Inhibitor #2 | 0.00 | 0.00 | 0.00 | 0.00 | 0.00 |

TABLE 12g-continued

| Example | LY-1231 | LY-1232 | LY-1233 | LY-1234 | LY-1235 |
|---|---|---|---|---|---|
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 10.98 | 11.06 | 18.44 | 18.35 | 18.11 |
| Viscosity Ratio - 14.7/s over 1200/s | 1.04 | 1.04 | 1.05 | 1.04 | 1.04 |
| Calculated Tg (C.) - Fox Equation | 25.9 | 19.9 | 27.2 | 21.1 | 26.7 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.17 | 0.17 | 0.09 | 0.09 | 0.13 |

TABLE 12h

| Example | LY-1236 | LY-1237 | LY-1238 | LY-1239 | LY-1240 |
|---|---|---|---|---|---|
| Ingredients | | | | | |
| IOA | 1.37 | 1.37 | 1.37 | 1.37 | 1.37 |
| IBOA | 37.67 | 54.67 | 49.67 | 44.67 | 39.67 |
| THFA | 10.00 | 10.00 | 10.00 | 10.00 | 10.00 |
| PEA | 25.90 | 15.90 | 20.90 | 25.90 | 30.90 |
| HDDA | 2.00 | — | — | — | — |
| CN981B88 | 4.00 | 4.00 | 4.00 | 4.00 | 4.00 |
| 4188/EHA | 10.00 | 3.00 | 3.00 | 3.00 | 3.00 |
| TPO | 6.00 | 6.00 | 6.00 | 6.00 | 6.00 |
| S-64 | 1.00 | 3.00 | 3.00 | 3.00 | 3.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 18.27 | 10.03 | 10.01 | 10.02 | 10.07 |
| Viscosity Ratio - 14.7/s over 1200/s | 1.06 | 1.04 | 1.04 | 1.05 | 1.05 |
| Calculated Tg (C.) - Fox Equation | 20.7 | 41.8 | 35.0 | 28.4 | 22.1 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.13 | 0.04 | 0.04 | 0.04 | 0.04 |

TABLE 12i

| Example | LY-1241 | LY-1242 | LY-1243 | LY-1244 | LY-1245 |
|---|---|---|---|---|---|
| Ingredients | | | | | |
| IOA | 1.37 | 1.37 | 1.37 | 1.37 | 1.37 |
| IBOA | 53.67 | 48.67 | 43.67 | 38.67 | 52.67 |
| THFA | 10.00 | 10.00 | 10.00 | 10.00 | 10.00 |
| PEA | 15.90 | 20.90 | 25.90 | 30.90 | 15.90 |
| HDDA | 1.00 | 1.00 | 1.00 | 1.00 | 2.00 |
| CN981B88 | 4.00 | 4.00 | 4.00 | 4.00 | 4.00 |
| 4188/EHA | 3.00 | 3.00 | 3.00 | 3.00 | 3.00 |
| TPO | 6.00 | 6.00 | 6.00 | 6.00 | 6.00 |
| S-64 | 3.00 | 3.00 | 3.00 | 3.00 | 3.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |

TABLE 12i-continued

| Example | LY-1241 | LY-1242 | LY-1243 | LY-1244 | LY-1245 |
|---|---|---|---|---|---|
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 9.68 | 9.98 | 10.00 | 10.05 | 9.96 |
| Viscosity Ratio - 14.7/s over 1200/s | 1.07 | 1.05 | 1.05 | 1.04 | 1.03 |
| Calculated Tg (C.) - Fox Equation | 41.3 | 34.5 | 28.0 | 21.7 | 40.9 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.09 | 0.09 | 0.09 | 0.09 | 0.13 |

TABLE 12j

| Example | LY-1246 | LY-1247 | LY-1248 | LY-1249 | LY-1250 |
|---|---|---|---|---|---|
| Ingredients | | | | | |
| IOA | 1.37 | 1.37 | 1.37 | 1.37 | 1.37 |
| IBOA | 47.67 | 42.67 | 37.67 | 51.67 | 46.67 |
| THFA | 10.00 | 10.00 | 10.00 | 10.00 | 10.00 |
| PEA | 20.90 | 25.90 | 30.90 | 15.90 | 20.90 |
| HDDA | 2.00 | 2.00 | 2.00 | 3.00 | 3.00 |
| CN981B88 | 4.00 | 4.00 | 4.00 | 4.00 | 4.00 |
| 4188/EHA | 3.00 | 3.00 | 3.00 | 3.00 | 3.00 |
| TPO | 6.00 | 6.00 | 6.00 | 6.00 | 6.00 |
| S-64 | 3.00 | 3.00 | 3.00 | 3.00 | 3.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 9.94 | 9.94 | 10.04 | 9.88 | 9.88 |
| Viscosity Ratio - 14.7/s over 1200/s | 1.05 | 1.04 | 1.04 | 1.05 | 1.04 |
| Calculated Tg (C.) - Fox Equation | 34.0 | 27.5 | 21.2 | 40.4 | 33.6 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.13 | 0.13 | 0.13 | 0.17 | 0.17 |

TABLE 12k

| Example | LY-1251 | LY-1252 | LY-1253 | LY-1254 | LY-1255 |
|---|---|---|---|---|---|
| Ingredients | | | | | |
| IOA | 1.37 | 1.37 | 1.37 | 1.37 | 1.37 |
| IBOA | 41.67 | 36.67 | 41.67 | 36.67 | 40.67 |
| THFA | 10.00 | 10.00 | 10.00 | 10.00 | 10.00 |
| PEA | 25.90 | 30.90 | 20.90 | 25.90 | 20.90 |
| HDDA | 3.00 | 3.00 | 1.00 | 1.00 | 2.00 |
| CN981B88 | 4.00 | 4.00 | 4.00 | 4.00 | 4.00 |
| 4188/EHA | 3.00 | 3.00 | 10.00 | 10.00 | 10.00 |
| TPO | 6.00 | 6.00 | 6.00 | 6.00 | 6.00 |
| S-64 | 3.00 | 3.00 | 3.00 | 3.00 | 3.00 |
| Inhibitor #1 | 0.10 | 0.10 | 0.10 | 0.10 | 0.10 |
| Inhibitor #2 | 0.00 | 0.00 | 0.00 | 0.00 | 0.00 |
| TF-425 | 0.90 | 0.90 | 0.90 | 0.90 | 0.90 |

TABLE 12k-continued

| Example | LY-1251 | LY-1252 | LY-1253 | LY-1254 | LY-1255 |
|---|---|---|---|---|---|
| Dispersant #1 | 0.30 | 0.30 | 0.30 | 0.30 | 0.30 |
| PY 150 | 0.76 | 0.76 | 0.76 | 0.76 | 0.76 |
| Total | 100.00 | 100.00 | 100.00 | 100.00 | 100.00 |
| Data | | | | | |
| Viscosity (cP) at 45 C. and 1200/s | 9.92 | 10.00 | 19.94 | 20.71 | 19.69 |
| Viscosity Ratio - 14.7/s over 1200/s | 1.04 | 1.05 | 1.03 | 1.03 | 1.04 |
| Calculated Tg (C.) - Fox Equation | 27.1 | 20.8 | 26.0 | 19.8 | 25.5 |
| RT % Elongation Limit | nm | nm | nm | nm | nm |
| Stretch-Then-Heat % Elongation Limit | nm | nm | nm | nm | nm |
| Moles Difunction in 1 kg of Ink | 0.17 | 0.17 | 0.09 | 0.09 | 0.13 |

TABLE 12l

| Example | LY-1256 |
|---|---|
| Ingredients | |
| IOA | 1.37 |
| IBOA | 35.67 |
| THFA | 10.00 |
| PEA | 25.90 |
| HDDA | 2.00 |
| CN981B88 | 4.00 |
| 4188/EHA | 10.00 |
| TPO | 6.00 |
| S-64 | 3.00 |
| Inhibitor #1 | 0.10 |
| Inhibitor #2 | 0.00 |
| TF-425 | 0.90 |
| Dispersant #1 | 0.30 |
| PY 150 | 0.76 |
| Total | 100.00 |
| Data | |
| Viscosity (cP) at 45 C. and 1200/s | 19.93 |
| Viscosity Ratio - 14.7/s over 1200/s | 1.03 |
| Calculated Tg (C.) - Fox Equation | 19.3 |
| RT % Elongation Limit | nm |
| Stretch-Then-Heat % Elongation Limit | nm |
| Moles Difunction in 1 kg of Ink | 0.13 |

TABLE 13a

| Example | C-1301 | C-1302 | M-1301 | M-1302 | M-1303 |
|---|---|---|---|---|---|
| Ingredients | | | | | |
| IOA | — | — | — | — | — |
| IBOA | 22.00 | 22.00 | 39.95 | 37.85 | 36.95 |
| THFA | 27.05 | 34.85 | 14.39 | 14.39 | 14.39 |
| PEA | 0.28 | 0.28 | 20.90 | 23.40 | 23.40 |
| HDDA | — | — | 1.50 | 2.00 | 2.00 |
| VCAP | — | — | — | — | — |
| PONPGDA | 3.00 | 3.00 | — | — | — |
| CTFA | 27.50 | 20.00 | — | — | — |
| CN981B88 | — | — | — | — | — |
| CN981 | — | — | 4.60 | — | — |
| E-1010 | — | — | — | 3.70 | — |
| 4188/EHA | 6.60 | 8.30 | — | — | — |
| CN9011 | — | — | — | — | — |
| N-9100 | — | — | — | — | 4.60 |
| DM-55 | — | — | — | — | — |
| TPO | 8.00 | 8.00 | 8.00 | 8.00 | 8.00 |
| DETX | — | — | 2.00 | 2.00 | 2.00 |
| T-152 | — | — | 2.00 | 2.00 | 2.00 |
| S-64 | — | — | — | — | — |
| T-144 | 2.00 | — | — | — | — |
| BLS 1622 | — | — | — | — | — |
| T-622 | — | — | — | — | — |
| Inhibitor #1 | — | — | 0.10 | 0.10 | 0.10 |
| Inhibitor #2 | — | — | 0.06 | 0.06 | 0.06 |
| Inhibitor #3 | 0.02 | 0.02 | — | — | — |
| Inhibitor #4 | — | — | — | — | — |
| SURF #1 | — | — | 0.90 | 0.90 | 0.90 |
| SURF #2 | 0.50 | 0.50 | — | — | — |
| SURF #3 | 0.05 | 0.05 | — | — | — |
| Dispersant #1 | 0.75 | 0.75 | 1.45 | 1.45 | 1.45 |
| Dispersant #2 | — | — | — | — | — |
| Cyan Pigment #2 | 2.25 | 2.25 | — | — | — |
| PR 202 | — | — | 4.15 | 4.15 | 4.15 |
| Magenta Pigment #2 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 11.35 | 11.39 | nm | 10.62 | 10.48 |
| Viscosity Ratio - 14.7/s over 1200/s | 1.04 | 1.04 | nm | 1.08 | 1.07 |
| RT % Elongation Limit | 163% | 163% | 188% | 213% | 213% |
| Stretch-Then-Heat % Elongation | 125% | 150% | 138% | 188% | 150% |
| Moles Difunction in 1 kg of Ink | 0.09 | 0.09 | 0.09 | 0.09 | 0.09 |
| Calculated Tg (C.) - Fox Equation | 25.7 | 19.5 | 30.2 | 27.4 | 26.7 |

TABLE 13b

| Example | M-1304 | M-1305 | M-1306 | M-1307 | M-1308 |
|---|---|---|---|---|---|
| Ingredients | | | | | |
| IOA | — | — | — | — | — |
| IBOA | 37.25 | 23.55 | 24.85 | 37.95 | 22.00 |
| THFA | 14.39 | 19.99 | 14.39 | 14.39 | 27.49 |
| PEA | 23.40 | 20.90 | 25.90 | 20.90 | 0.90 |
| HDDA | 2.00 | 0.50 | 0.50 | 1.50 | — |
| VCAP | — | 10.00 | 10.00 | — | — |
| PONPGDA | — | — | — | — | — |
| CTFA | — | — | — | — | 25.00 |
| CN981B88 | — | 5.00 | 5.70 | — | — |
| CN981 | — | — | — | 4.60 | 6.30 |
| E-1010 | — | — | — | — | — |
| 4188/EHA | — | — | — | — | — |
| CN9011 | — | — | — | — | — |
| N-9100 | — | — | — | — | — |
| DM-55 | 4.30 | — | — | — | — |
| TPO | 8.00 | 8.00 | 8.00 | 8.00 | 8.00 |
| DETX | 2.00 | 2.00 | 2.00 | 4.00 | 2.00 |
| T-152 | 2.00 | 2.00 | 2.00 | 2.00 | 2.00 |
| S-64 | — | — | — | — | — |
| T-144 | — | — | — | — | — |

TABLE 13b-continued

| Example | M-1304 | M-1305 | M-1306 | M-1307 | M-1308 |
|---|---|---|---|---|---|
| BLS 1622 | — | — | — | — | — |
| T-622 | — | — | — | — | — |
| Inhibitor #1 | 0.10 | 0.10 | 0.10 | 0.10 | 0.10 |
| Inhibitor #2 | 0.06 | 0.06 | 0.06 | 0.06 | 0.06 |
| Inhibitor #3 | — | — | — | — | — |
| Inhibitor #4 | — | — | — | — | — |
| SURF #1 | 0.90 | 0.90 | 0.90 | 0.90 | — |
| SURF #2 | — | — | — | — | 0.50 |
| SURF #3 | — | — | — | — | 0.05 |
| Dispersant #1 | 1.45 | 1.81 | 1.45 | 1.45 | 1.45 |
| Dispersant #2 | — | — | — | — | — |
| Cyan Pigment #2 | — | — | — | — | — |
| PR 202 | 4.15 | 5.19 | 4.15 | 4.15 | 4.15 |
| Magenta Pigment #2 | — | — | — | — | — |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 10.54 | 10.63 | 10.32 | nm | 11.35 |
| Viscosity Ratio - 14.7/s over 1200/s | 1.07 | 1.08 | 1.07 | nm | 1.09 |
| RT % Elongation Limit | 213% | 188% | 213% | nm | 213% |
| Stretch-Then-Heat % Elongation | 163% | 150% | 125% | nm | 138% |
| Moles Difunction in 1 kg of Ink | 0.09 | 0.07 | 0.08 | 0.09 | 0.04 |
| Calculated Tg (C.) - Fox Equation | 27.0 | 26.2 | 26.8 | 28.9 | 28.1 |

TABLE 13c

| Example | M-1309 | M-1310 | M-1311 | M-1312 | M-1313 |
|---|---|---|---|---|---|
| Ingredients | | | | | |
| IOA | — | — | — | — | — |
| IBOA | 22.00 | 22.00 | 22.04 | 22.04 | 22.04 |
| THFA | 26.59 | 24.89 | 26.95 | 26.85 | 27.05 |
| PEA | 0.90 | 0.90 | 0.46 | 0.46 | 0.46 |
| HDDA | 1.00 | 3.00 | 1.00 | 2.00 | — |
| VCAP | — | — | — | — | — |
| PONPGDA | — | — | — | — | — |
| CTFA | 25.00 | 25.00 | 29.00 | 28.00 | 30.00 |
| CN981B88 | — | — | — | — | — |
| CN981 | 6.20 | 5.90 | 3.50 | 3.60 | 3.40 |
| E-1010 | — | — | — | — | — |
| 4188/EHA | — | — | — | — | — |
| CN9011 | — | — | — | — | — |
| N-9100 | — | — | — | — | — |
| DM-55 | — | — | — | — | — |
| TPO | 8.00 | 8.00 | 8.00 | 8.00 | 8.00 |
| DETX | 2.00 | 2.00 | — | — | — |
| T-152 | 2.00 | 2.00 | — | — | — |
| S-64 | — | — | 2.00 | 2.00 | 2.00 |
| T-144 | — | — | — | — | — |
| BLS 1622 | — | — | — | — | — |
| T-622 | — | — | — | — | — |
| Inhibitor #1 | 0.10 | 0.10 | — | — | — |
| Inhibitor #2 | 0.06 | 0.06 | 0.02 | 0.02 | — |
| Inhibitor #3 | — | — | 0.04 | 0.04 | 0.04 |
| Inhibitor #4 | — | — | — | — | 0.02 |
| SURF #1 | — | — | — | — | — |
| SURF #2 | 0.50 | 0.50 | 0.50 | 0.50 | 0.50 |
| SURF #3 | 0.05 | 0.05 | 0.05 | 0.05 | 0.05 |
| Dispersant #1 | 1.45 | 1.45 | — | — | — |
| Dispersant #2 | — | — | 2.42 | 2.42 | 2.41 |
| Cyan Pigment #2 | — | — | — | — | — |
| PR 202 | 4.15 | 4.15 | — | — | — |
| Magenta Pigment #2 | — | — | 4.03 | 4.03 | 4.02 |
| PY 150 | — | — | — | — | — |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 11.49 | 11.46 | 11.39 | 11.44 | 11.27 |
| Viscosity Ratio - 14.7/s over 1200/s | 1.08 | 1.08 | 1.09 | 1.08 | 1.07 |
| RT % Elongation Limit | 163% | 138% | 188% | 138% | nm |
| Stretch-Then-Heat % Elongation | 100% | 38% | 125% | 88% | nm |
| Moles Difunction in 1 kg of Ink | 0.08 | 0.17 | 0.06 | 0.11 | 0.02 |
| Calculated Tg (C.) - Fox Equation | 28.8 | 30.3 | 29.7 | 29.8 | 29.6 |

TABLE 13d

| Example | Y-1301 | Y-1302 | Y-1303 | Y-1304 | Y-1305 |
|---|---|---|---|---|---|
| Ingredients | | | | | |
| IOA | — | — | — | — | — |
| IBOA | 22.00 | 22.00 | 22.00 | 22.00 | 22.00 |
| THFA | 25.65 | 23.95 | 23.95 | 23.85 | 25.45 |
| PEA | 0.28 | 0.28 | 0.28 | 0.28 | 0.28 |
| HDDA | — | 0.50 | 1.00 | 2.00 | — |
| VCAP | — | — | — | — | — |
| PONPGDA | — | — | — | — | — |
| CTFA | 28.00 | 32.50 | 32.00 | 31.00 | 30.00 |
| CN981B88 | — | — | — | — | — |
| CN981 | 6.70 | — | — | — | 2.90 |
| E-1010 | — | — | — | — | — |
| 4188/EHA | — | 3.40 | 3.40 | 3.50 | 2.00 |
| CN9011 | — | — | — | — | — |
| N-9100 | — | — | — | — | — |
| DM-55 | — | — | — | — | — |
| TPO | 12.00 | 12.00 | 12.00 | 12.00 | 12.00 |
| DETX | — | — | — | — | — |
| T-152 | — | — | — | — | — |
| S-64 | 2.00 | 2.00 | 2.00 | 2.00 | 2.00 |
| T-144 | — | — | — | — | — |
| BLS 1622 | — | — | — | — | — |
| T-622 | — | — | — | — | — |
| Inhibitor #1 | — | — | — | — | — |
| Inhibitor #2 | 0.01 | 0.01 | 0.01 | 0.01 | 0.01 |
| Inhibitor #3 | 0.02 | 0.02 | 0.02 | 0.02 | 0.02 |
| Inhibitor #4 | — | — | — | — | — |
| SURF #1 | — | — | — | — | — |
| SURF #2 | 0.50 | 0.50 | 0.50 | 0.50 | 0.50 |
| SURF #3 | 0.05 | 0.05 | 0.05 | 0.05 | 0.05 |
| Dispersant #1 | 0.80 | 0.80 | 0.80 | 0.80 | 0.80 |
| Dispersant #2 | — | — | — | — | — |
| Cyan Pigment #2 | — | — | — | — | — |
| PR 202 | — | — | — | — | — |
| Magenta Pigment #2 | — | — | — | — | — |
| PY 150 | 2.00 | 2.00 | 2.00 | 2.00 | 2.00 |
| PB 7 | — | — | — | — | — |
| PW 6 | — | — | — | — | — |
| Total | 100.00 | 100.00 | 100.00 | 100.00 | 100.00 |
| Data | | | | | |
| Viscosity (cP) at 45 C. and 1200/s | 11.45 | nm | 11.43 | 11.10 | 11.59 |
| Viscosity Ratio - 14.7/s over 1200/s | 1.14 | nm | 1.16 | 1.15 | 1.16 |
| RT % Elongation Limit | 188% | nm | 213% | 163% | 213% |
| Stretch-Then-Heat % Elongation | 125% | nm | 125% | 100% | 150% |

TABLE 13d-continued

| Example | Y-1301 | Y-1302 | Y-1303 | Y-1304 | Y-1305 |
|---|---|---|---|---|---|
| Moles Difunction in 1 kg of Ink | 0.04 | 0.02 | 0.04 | 0.09 | 0.02 |
| Calculated Tg (C.) - Fox Equation | 30.1 | 30.1 | 30.2 | 30.2 | 29.5 |

TABLE 13e

| Example | K-1301 | K-1302 | K-1303 | K-1304 | K-1305 | K-1306 |
|---|---|---|---|---|---|---|
| Ingredients | | | | | | |
| IOA | — | — | — | — | — | — |
| IBOA | 21.93 | 21.93 | 21.93 | 21.93 | 21.93 | 21.93 |
| THFA | 24.75 | 24.85 | 26.05 | 27.05 | 24.35 | 38.95 |
| PEA | 0.46 | 0.46 | 0.46 | 0.46 | 0.46 | 0.46 |
| HDDA | — | — | — | — | — | — |
| VCAP | — | — | — | — | — | 11.00 |
| PONPGDA | 0.30 | 0.30 | 0.30 | 0.30 | 0.30 | 0.30 |
| CTFA | 25.00 | 28.00 | 29.00 | 22.00 | 29.00 | — |
| CN981B88 | — | — | — | — | — | — |
| CN981 | 3.50 | 3.50 | 3.50 | — | 3.50 | 8.00 |
| E-1010 | — | — | — | — | — | — |
| 4188/EHA | — | — | — | — | 2.20 | — |
| CN9011 | — | — | — | 10.00 | — | — |
| N-9100 | — | — | — | — | — | — |
| DM-55 | — | — | — | — | — | — |
| TPO | 12.00 | 12.00 | 12.00 | 12.00 | 12.00 | 12.00 |
| DETX | — | — | — | — | — | — |
| T-152 | — | — | — | — | — | — |
| S-64 | — | — | — | — | — | — |
| T-144 | 2.00 | 2.00 | — | 2.00 | 2.00 | — |
| BLS 1622 | — | — | 2.50 | — | — | — |
| T-622 | — | — | — | — | — | 2.00 |
| Inhibitor #1 | — | — | — | — | — | — |
| Inhibitor #2 | 0.01 | 0.01 | 0.01 | 0.01 | 0.01 | 0.01 |
| Inhibitor #3 | 0.04 | 0.04 | 0.04 | 0.04 | 0.04 | 0.04 |
| Inhibitor #4 | — | — | — | — | — | — |
| SURF #1 | — | — | — | — | — | — |
| SURF #2 | 6.30 | 0.50 | 0.50 | 0.50 | 0.50 | 0.50 |
| SURF #3 | 0.05 | 0.05 | 0.05 | 0.05 | 0.05 | 0.05 |
| Dispersant #1 | — | — | — | — | — | — |
| Dispersant #2 | 0.96 | 3.66 | 0.96 | 0.96 | 0.96 | 2.06 |
| Cyan Pigment #2 | 0.23 | 0.23 | 0.23 | 0.23 | 0.23 | 0.23 |
| PR 202 | — | — | — | — | — | — |
| Magenta Pigment #2 | — | — | — | — | — | — |
| PY 150 | — | — | — | — | — | — |
| PB 7 | — | — | — | — | — | — |
| PW 6 | — | — | — | — | — | — |
| Total | 100.00 | 100.00 | 100.00 | 100.00 | 100.00 | 100.00 |
| Data | | | | | | |
| Viscosity (cP) at 45 C. and 1200/s | 11.32 | 11.34 | 11.74 | 11.46 | 11.26 | nm |
| Viscosity Ratio - 14.7/s over 1200/s | 1.04 | 1.03 | 1.04 | 1.04 | 1.03 | nm |
| RT % Elongation Limit | 163% | 163% | 163% | 163% | 213% | 213% |
| Stretch-Then-Heat % Elongation | 125% | 125% | 113% | 113% | 138% | 138% |
| Moles Difunction in 1 kg of Ink | 0.03 | 0.03 | 0.03 | 0.01 | 0.03 | 0.06 |
| Calculated Tg (C.) - Fox Equation | 30.5 | 30.8 | 30.1 | 28.8 | 29.7 | 29.1 |

TABLE 13f

| Example | W-1301 |
|---|---|
| Ingredients | |
| IOA | 4.25 |
| IBOA | 39.90 |
| THFA | 10.00 |
| PEA | 10.90 |
| HDDA | — |
| VCAP | — |
| PONPGDA | — |
| CTFA | — |
| CN981B88 | 4.40 |
| CN981 | — |
| E-1010 | — |
| 4188/EHA | — |
| CN9011 | — |
| N-9100 | — |
| DM-55 | — |
| TPO | 10.00 |
| DETX | — |
| T-152 | — |
| S-64 | 2.00 |
| T-144 | — |
| BLS 1622 | — |
| T-622 | — |
| Inhibitor #1 | 0.10 |
| Inhibitor #2 | 0.07 |
| Inhibitor #3 | — |

TABLE 13f-continued

| Example | W-1301 |
|---|---|
| Inhibitor #4 | — |
| SURF #1 | 0.90 |
| SURF #2 | — |
| SURF #3 | — |
| Dispersant #1 | 1.48 |
| Dispersant #2 | — |
| Cyan Pigment #2 | — |
| PR 202 | — |
| Magenta Pigment #2 | — |
| PY 150 | — |
| PB 7 | — |
| PW 6 | 16.00 |
| Total | 100.00 |
| Data | |
| Viscosity (cP) at 45 C. and 1200/s | 10.45 |
| Viscosity Ratio - 14.7/s over 1200/s | 1.06 |
| RT % Elongation Limit | 213% |
| Stretch-Then-Heat % Elongation | 188% |
| Moles Difunction in 1 kg of Ink | 0.05 |
| Calculated Tg (C.) - Fox Equation | 35.5 |

TABLE 14a

| Example | C-1401 | C-1402 | C-1403 | C-1404 | C-1405 |
|---|---|---|---|---|---|
| Ingredients | | | | | |
| IOA | 3.42 | — | — | — | — |
| IBOA | 48.47 | 42.67 | 41.27 | 37.37 | 35.17 |
| THFA | — | — | — | 10.00 | 10.00 |
| PEA | 25.90 | 35.90 | 35.73 | 15.90 | 19.90 |
| HDDA | — | — | 0.50 | 0.80 | — |
| VCAP | — | — | — | 10.00 | 10.00 |
| DCP | — | — | — | 4.50 | 3.00 |
| DMAA | — | — | — | — | — |
| DMAEA | — | — | — | — | — |
| AA | — | — | — | — | — |
| beta-CEA | — | — | — | — | — |
| CN981 | 6.50 | 6.00 | 5.47 | 6.00 | 6.50 |
| TPO | 8.00 | 8.00 | 7.96 | 8.00 | 8.00 |
| DETX | 2.00 | 2.00 | 3.98 | 2.00 | 2.00 |
| S-64 | — | 2.00 | 1.99 | — | — |
| T-144 | 2.00 | — | — | — | — |
| C-3529 | — | — | — | 2.00 | 2.00 |
| T-622 | — | — | — | — | — |
| Inhibitor #1 | 0.10 | 0.10 | 0.10 | 0.10 | 0.10 |
| Inhibitor #2 | 0.05 | 0.05 | 0.02 | 0.05 | 0.05 |
| SURF #1 | 0.90 | 0.90 | 0.90 | 0.90 | 0.90 |
| Inhibitor #5 | — | — | — | — | — |
| Dispersant #1 | 0.83 | — | — | — | — |
| Dispersant #2 | — | — | — | — | — |
| Dispersant | — | 0.68 | 0.60 | 0.68 | 0.68 |
| Synergist | 0.15 | — | — | — | — |
| PB 15:3 | 1.69 | — | — | — | — |
| PB 15:4 | — | 1.70 | — | 1.70 | 1.70 |
| PR122 | — | — | — | — | — |
| PY 150 | — | — | — | — | — |
| PY 150 #2 | — | — | — | — | — |
| PB 7 | — | — | — | — | — |
| Black Pigment #2 | — | — | 1.49 | — | — |
| Total | 100.00 | 100.00 | 100.01 | 100.00 | 100.00 |
| Data | | | | | |
| Moles difunc in 1 kg of ink | 0.04 | 0.04 | 0.05 | 0.22 | 0.14 |
| Predicted Alt Tg (C.) - Fox Equation | 35.9 | 29.4 | 28.8 | 47.5 | 41.9 |

TABLE 14b

| Example | C-1406 | C-1407 | M-1401 | M-1402 | M-1403 |
|---|---|---|---|---|---|
| Ingredients | | | | | |
| IOA | — | — | — | — | — |
| IBOA | 30.17 | 30.17 | 44.05 | 43.55 | 41.27 |
| THFA | 10.00 | 10.00 | — | — | — |
| PEA | 23.40 | 25.90 | 35.90 | 35.90 | 35.73 |
| HDDA | — | — | — | — | 0.50 |
| VCAP | 10.00 | 10.00 | — | — | — |
| DCP | 4.50 | 4.50 | — | — | — |
| DMAA | — | — | — | — | — |
| DMAEA | — | — | — | — | — |
| AA | — | — | — | — | — |
| beta-CEA | — | — | — | — | — |
| CN981 | 6.50 | 4.00 | 1.00 | 1.50 | 5.47 |
| TPO | 8.00 | 8.00 | 8.00 | 8.00 | 7.96 |
| DETX | 2.00 | 2.00 | 2.00 | 2.00 | 3.98 |
| S-64 | — | — | — | 2.00 | 1.99 |
| T-144 | — | — | 2.00 | — | — |
| C-3529 | 2.00 | — | — | — | — |
| T-622 | — | 2.00 | — | — | — |
| Inhibitor #1 | 0.10 | 0.10 | 0.10 | 0.10 | 0.10 |
| Inhibitor #2 | 0.05 | — | 0.05 | 0.05 | 0.02 |
| SURF #1 | 0.90 | 0.90 | 0.90 | 0.90 | 0.90 |
| Inhibitor #5 | — | 0.05 | — | — | — |
| Dispersant #1 | — | — | — | — | — |
| Dispersant #2 | — | — | — | — | — |
| Dispersant | 0.68 | 0.68 | 2.00 | 2.00 | 0.60 |
| Synergist | — | — | — | — | — |
| PB 15:3 | — | — | — | — | — |
| PB 15:4 | 1.70 | 1.70 | — | — | — |
| PR122 | — | — | 4.00 | 4.00 | — |
| PY 150 | — | — | — | — | — |
| PY 150 #2 | — | — | — | — | — |
| PB 7 | — | — | — | — | — |
| Black Pigment #2 | — | — | — | — | 1.49 |
| Total | 100.00 | 100.00 | 100.00 | 100.00 | 100.01 |
| Data | | | | | |
| Moles difunc in 1 kg of ink | 0.19 | 0.17 | 0.01 | 0.01 | 0.05 |
| Predicted Alt Tg (C.) - Fox Equation | 36.4 | 34.7 | 30.8 | 30.4 | 28.8 |

TABLE 14c

| Example | M-1404 | M-1405 | M-1406 | M-1407 | Y-1401 |
|---|---|---|---|---|---|
| Ingredients | | | | | |
| IOA | — | — | — | — | 4.50 |
| IBOA | 37.81 | 35.60 | 30.60 | 30.60 | 47.55 |
| THFA | 10.00 | 10.00 | 10.00 | 10.00 | — |
| PEA | 15.90 | 19.95 | 23.45 | 28.45 | 25.90 |
| HDDA | 0.34 | — | — | — | — |
| VCAP | 10.00 | 10.00 | 10.00 | 5.00 | — |
| DCP | 5.00 | 3.00 | 4.50 | 4.50 | — |
| DMAA | — | — | — | — | — |
| DMAEA | — | — | — | — | — |
| AA | — | — | — | — | — |
| beta-CEA | — | — | — | — | — |
| CN981 | 2.50 | 3.00 | 3.00 | 3.00 | 5.50 |
| TPO | 8.00 | 8.00 | 8.00 | 8.00 | 8.00 |
| DETX | 2.00 | 2.00 | 2.00 | 2.00 | 2.00 |
| S-64 | — | — | — | — | 2.00 |
| T-144 | — | — | — | — | — |
| C-3529 | 2.00 | 2.00 | 2.00 | 2.00 | — |
| T-622 | — | — | — | — | — |
| Inhibitor #1 | 0.10 | 0.10 | 0.10 | 0.10 | 0.10 |
| Inhibitor #2 | 0.05 | 0.05 | 0.05 | — | 0.06 |
| SURF #1 | 0.90 | 0.90 | 0.90 | 0.90 | 0.90 |
| Inhibitor #5 | — | — | — | 0.05 | — |
| Dispersant #1 | — | — | — | — | 1.00 |
| Dispersant #2 | — | — | — | — | — |
| Dispersant | 1.80 | 1.80 | 1.80 | 1.80 | — |

TABLE 14c-continued

| Example | M-1404 | M-1405 | M-1406 | M-1407 | Y-1401 |
|---|---|---|---|---|---|
| Synergist | — | — | — | — | — |
| PB 15:3 | — | — | — | — | — |
| PB 15:4 | — | — | — | — | — |
| PR122 | 3.60 | 3.60 | 3.60 | 3.60 | — |
| PY 150 | — | — | — | — | 2.50 |
| PY 150 #2 | — | — | — | — | — |
| PB 7 | — | — | — | — | — |
| Black Pigment #2 | — | — | — | — | — |
| Total | 100.00 | 100.00 | 100.00 | 100.00 | 100.00 |
| Data |  |  |  |  |  |
| Moles difunc in 1 kg of ink | 0.19 | 0.12 | 0.17 | 0.17 | 0.03 |
| Predicted Alt Tg (C.) - Fox Equation | 49.0 | 43.0 | 37.3 | 28.1 | 33.9 |

TABLE 14d

| Example | Y-1402 | Y-1403 | Y-1404 | Y-1405 | Y-1406 |
|---|---|---|---|---|---|
| Ingredients |  |  |  |  |  |
| IOA | 4.50 | 4.47 | — | — | — |
| IBOA | 47.45 | 47.21 | 36.25 | 36.58 | 31.55 |
| THFA | — | — | 10.00 | 10.00 | 10.00 |
| PEA | 25.90 | 25.78 | 15.90 | 17.90 | 21.40 |
| HDDA | — | 0.50 | 0.80 | — | — |
| VCAP | — | — | 10.00 | 10.00 | 10.00 |
| DCP | — | — | 4.50 | 3.00 | 4.50 |
| DMAA | — | — | — | — | — |
| DMAEA | — | — | — | — | — |
| AA | — | — | — | — | — |
| beta-CEA | — | — | — | — | — |
| CN981 | 6.50 | 6.47 | 6.00 | 6.00 | 6.00 |
| TPO | 8.00 | 7.96 | 8.00 | 8.00 | 8.00 |
| DETX | 2.00 | 1.99 | 2.00 | 2.00 | 2.00 |
| S-64 | 2.00 | 1.99 | — | — | — |
| T-144 | — | — | — | — | — |
| C-3529 | — | — | 2.00 | 2.00 | 2.00 |
| T-622 | — | — | — | — | — |
| Inhibitor #1 | 0.10 | 0.10 | 0.10 | 0.10 | 0.10 |
| Inhibitor #2 | 0.06 | 0.06 | 0.05 | 0.02 | — |
| SURF #1 | — | — | 0.90 | 0.90 | 0.90 |
| Inhibitor #5 | — | — | — | — | 0.05 |
| Dispersant #1 | 1.00 | 1.00 | — | — | — |
| Dispersant #2 | — | — | — | — | — |
| Dispersant | — | — | 1.00 | 1.00 | 1.00 |
| Synergist | — | — | — | — | — |
| PB 15:3 | — | — | — | — | — |
| PB 15:4 | — | — | — | — | — |
| PR122 | — | — | — | — | — |
| PY 150 | 2.50 | 2.49 | — | — | — |
| PY 150 #2 | — | — | 2.50 | 2.50 | 2.50 |
| PB 7 | — | — | — | — | — |
| Black Pigment #2 | — | — | — | — | — |
| Total | 100.00 | 100.02 | 100.00 | 100.00 | 100.00 |
| Data |  |  |  |  |  |
| Moles difunc in 1 kg of ink | 0.04 | 0.06 | 0.22 | 0.13 | 0.18 |
| Predicted Alt Tg (C.) - Fox Equation | 33.7 | 33.7 | 46.9 | 44.7 | 39.0 |

TABLE 14e

| Example | Y-1407 | K-1401 | K-1402 | K-1403 | K-1404 |
|---|---|---|---|---|---|
| Ingredients |  |  |  |  |  |
| IOA | 4.50 | — | — | — | — |
| IBOA | 36.75 | 35.13 | 40.08 | 35.47 | 36.47 |
| THFA | 5.00 | — | — | — | — |
| PEA | 15.90 | 30.59 | 25.64 | 29.40 | 30.90 |
| HDDA | 0.80 | 0.99 | 0.99 | 1.50 | 1.50 |
| VCAP | 10.00 | — | — | — | — |
| DCP | 4.50 | — | — | — | — |
| DMAA | — | 4.95 | — | 5.00 | 2.50 |
| DMAEA | — | — | 4.95 | — | — |
| AA | — | 4.95 | 4.95 | 5.00 | 5.00 |
| beta-CEA | — | — | — | — | — |
| CN981 | 6.00 | 5.94 | 5.94 | 6.00 | 6.00 |
| TPO | 8.00 | 7.92 | 7.92 | 8.00 | 8.00 |
| DETX | 2.00 | 3.96 | 3.96 | 4.00 | 4.00 |
| S-64 | — | 1.98 | 1.98 | 2.00 | 2.00 |
| T-144 | — | — | — | — | — |
| C-3529 | 2.00 | — | — | — | — |
| T-622 | — | — | — | — | — |
| Inhibitor #1 | 0.10 | 0.10 | 0.10 | 0.10 | 0.10 |
| Inhibitor #2 | 0.06 | 0.01 | 0.01 | 0.01 | 0.01 |
| SURF #1 | 0.90 | 0.89 | 0.89 | 0.90 | 0.90 |
| Inhibitor #5 | — | 0.02 | 0.02 | 0.02 | 0.02 |
| Dispersant #1 | 1.00 | — | — | — | — |
| Dispersant #2 | — | 0.74 | 0.74 | 0.74 | 0.74 |
| Dispersant | — | — | — | — | — |
| Synergist | — | — | — | — | — |
| PB 15:3 | — | — | — | — | — |
| PB 15:4 | — | — | — | — | — |
| PR122 | — | — | — | — | — |
| PY 150 | 2.50 | — | — | — | — |
| PY 150 #2 | — | — | — | — | — |
| PB 7 | — | 1.84 | 1.84 | 1.86 | 1.86 |
| Black Pigment #2 | — | — | — | — | — |
| Total | 100.00 | 100.00 | 100.00 | 100.00 | 100.00 |
| Data |  |  |  |  |  |
| Moles difunc in 1 kg of ink | 0.22 | 0.08 | 0.08 | 0.10 | 0.10 |
| Predicted Alt Tg (C.) - Fox Equation | 43.8 | 36.7 | 38.9 | 38.0 | 35.3 |

TABLE 14f

| Example | K-1405 | K-1406 | K-1407 | K-1408 | K-1409 |
|---|---|---|---|---|---|
| Ingredients |  |  |  |  |  |
| IOA | — | — | — | — | — |
| IBOA | 36.47 | 35.47 | 35.47 | 35.47 | 34.94 |
| THFA | — | — | — | — | — |
| PEA | 30.90 | 26.90 | 24.40 | 21.90 | 15.67 |
| HDDA | 1.50 | 1.50 | 1.50 | 1.50 | 1.48 |
| VCAP | — | — | — | — | — |
| DCP | — | — | — | — | — |
| DMAA | 5.00 | 7.50 | 10.00 | 10.00 | 14.78 |
| DMAEA | — | — | — | — | — |
| AA | 2.50 | 5.00 | — | — | — |
| beta-CEA | — | — | 5.00 | 7.50 | 9.85 |
| CN981 | 6.00 | 6.00 | 6.00 | 6.00 | 5.91 |
| TPO | 8.00 | 8.00 | 8.00 | 8.00 | 7.88 |
| DETX | 4.00 | 4.00 | 4.00 | 4.00 | 3.94 |
| S-64 | 2.00 | 2.00 | 2.00 | 2.00 | 1.97 |
| T-144 | — | — | — | — | — |
| C-3529 | — | — | — | — | — |
| T-622 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.89 |
| Inhibitor #5 | 0.02 | 0.02 | 0.02 | 0.02 | 0.02 |
| Dispersant #1 | — | — | — | — | — |
| Dispersant #2 | 0.74 | 0.74 | 0.74 | 0.74 | 0.73 |
| Dispersant | — | — | — | — | — |
| Synergist | — | — | — | — | — |
| PB 15:3 | — | — | — | — | — |
| PB 15:4 | — | — | — | — | — |
| PR122 | — | — | — | — | — |

TABLE 14f-continued

| Example | K-1405 | K-1406 | K-1407 | K-1408 | K-1409 |
|---|---|---|---|---|---|
| PY 150 | — | — | — | — | — |
| PY 150 #2 | — | — | — | — | — |
| PB 7 | 1.86 | 1.86 | 1.86 | 1.86 | 1.83 |
| Black Pigment #2 | — | — | — | — | — |
| Total | 100.00 | 100.00 | 100.00 | 100.00 | 100.00 |
| Data | | | | | |
| Moles difunc in 1 kg of ink | 0.10 | 0.10 | 0.10 | 0.10 | 0.10 |
| Predicted Alt Tg (C.) - Fox Equation | 35.6 | 42.3 | 43.1 | 45.4 | 55.1 |

TABLE 14g

| Example | K-1410 | K-1411 | K-1412 | K-1413 | K-1414 |
|---|---|---|---|---|---|
| Ingredients | | | | | |
| IOA | — | — | — | — | — |
| IBOA | 35.47 | 40.47 | 40.47 | 38.97 | 40.47 |
| THFA | — | — | — | — | — |
| PEA | 15.90 | 34.90 | 30.90 | 30.90 | 33.40 |
| HDDA | — | 1.00 | 5.00 | 1.50 | — |
| VCAP | — | — | — | — | — |
| DCP | — | — | — | — | — |
| DMAA | 15.00 | — | — | 5.00 | — |
| DMAEA | — | — | — | — | — |
| AA | — | — | — | — | 2.50 |
| beta-CEA | 10.00 | — | — | — | — |
| CN981 | 6.00 | 6.00 | 6.00 | 6.00 | 6.00 |
| TPO | 8.00 | 8.00 | 8.00 | 8.00 | 8.00 |
| DETX | 4.00 | 4.00 | 4.00 | 4.00 | 4.00 |
| S-64 | 2.00 | 2.00 | 2.00 | 2.00 | 2.00 |
| T-144 | — | — | — | — | — |
| C-3529 | — | — | — | — | — |
| T-622 | — | — | — | — | — |
| Inhibitor #1 | 0.10 | 0.10 | 0.10 | 0.10 | 0.10 |
| Inhibitor #2 | 0.01 | 0.01 | 0.01 | 0.01 | 0.01 |
| SURF #1 | 0.90 | 0.90 | 0.90 | 0.90 | 0.90 |
| Inhibitor #5 | 0.02 | 0.02 | 0.02 | 0.02 | 0.02 |
| Dispersant #1 | — | — | — | — | — |
| Dispersant #2 | 0.74 | 0.74 | 0.74 | 0.74 | 0.74 |
| Dispersant | — | — | — | — | — |
| Synergist | — | — | — | — | — |
| PB 15:3 | — | — | — | — | — |
| PB 15:4 | — | — | — | — | — |
| PR122 | — | — | — | — | — |
| PY 150 | — | — | — | — | — |
| PY 150 #2 | — | — | — | — | — |
| PB 7 | 1.86 | 1.86 | 1.86 | 1.86 | 1.86 |
| Black Pigment #2 | — | — | — | — | — |
| Total | 100.00 | 100.00 | 100.00 | 100.00 | 100.00 |
| Data | | | | | |
| Moles difunc in 1 kg of ink | 0.04 | 0.08 | 0.26 | 0.10 | 0.04 |
| Predicted Alt Tg (C.) - Fox Equation | 55.4 | 28.9 | 32.6 | 35.3 | 31.8 |

TABLE 14h

| Example | K-1415 | K-1416 | K-1417 | K-1418 | K-1419 |
|---|---|---|---|---|---|
| Ingredients | | | | | |
| IOA | — | — | — | — | — |
| IBOA | 40.47 | 40.47 | 41.48 | 41.48 | 36.48 |
| THFA | — | — | — | — | — |
| PEA | 30.90 | 29.40 | 35.90 | 30.90 | 30.90 |
| HDDA | — | 1.50 | — | — | — |
| VCAP | — | — | — | — | — |
| DCP | — | — | — | 5.00 | 10.00 |
| DMAA | — | — | — | — | — |
| DMAEA | — | — | — | — | — |
| AA | 5.00 | — | — | — | — |
| beta-CEA | — | 5.00 | — | — | — |
| CN981 | 6.00 | 6.00 | 5.50 | 5.50 | 5.50 |
| TPO | 8.00 | 8.00 | 8.00 | 8.00 | 8.00 |
| DETX | 4.00 | 4.00 | 4.00 | 4.00 | 4.00 |
| S-64 | 2.00 | 2.00 | — | — | — |
| T-144 | — | — | — | — | — |
| C-3529 | — | — | 2.00 | 2.00 | 2.00 |
| T-622 | — | — | — | — | — |
| Inhibitor #1 | 0.10 | 0.10 | 0.10 | 0.10 | 0.10 |
| Inhibitor #2 | 0.01 | 0.01 | — | — | — |
| SURF #1 | 0.90 | 0.90 | 0.90 | 0.90 | 0.90 |
| Inhibitor #5 | 0.02 | 0.02 | 0.02 | 0.02 | 0.02 |
| Dispersant #1 | — | — | — | — | — |
| Dispersant #2 | 0.74 | 0.74 | — | — | — |
| Dispersant | — | — | 0.60 | 0.60 | 0.60 |
| Synergist | — | — | — | — | — |
| PB 15:3 | — | — | — | — | — |
| PB 15:4 | — | — | — | — | — |
| PR122 | — | — | — | — | — |
| PY 150 | — | — | — | — | — |
| PY 150 #2 | — | — | — | — | — |
| PB 7 | 1.86 | 1.86 | — | — | — |
| Black Pigment #2 | — | — | 1.50 | 1.50 | 1.50 |
| Total | 100.00 | 100.00 | 100.00 | 100.00 | 100.00 |
| Data | | | | | |
| Moles difunc in 1 kg of ink | 0.04 | 0.10 | 0.03 | 0.20 | 0.36 |
| Predicted Alt Tg (C.) - Fox Equation | 35.6 | 33.6 | 28.7 | 34.6 | 33.3 |

TABLE 14i

| Example | K-1420 | K-1421 | K-1422 | K-1423 | K-1424 |
|---|---|---|---|---|---|
| Ingredients | | | | | |
| IOA | — | — | — | — | — |
| IBOA | 36.48 | 36.48 | 41.48 | 41.48 | 36.48 |
| THFA | — | — | — | — | 10.00 |
| PEA | 30.90 | 30.90 | 26.40 | 20.90 | 18.90 |
| HDDA | — | — | — | — | — |
| VCAP | 5.00 | 10.00 | 10.00 | 10.00 | 10.00 |
| DCP | 5.00 | — | 2.50 | 5.00 | 5.00 |
| DMAA | — | — | — | — | — |
| DMAEA | — | — | — | — | — |
| AA | — | — | — | — | — |
| beta-CEA | — | — | — | — | — |
| CN981 | 5.50 | 5.50 | 2.50 | 5.50 | 2.50 |
| TPO | 8.00 | 8.00 | 8.00 | 8.00 | 8.00 |
| DETX | 4.00 | 4.00 | 4.00 | 4.00 | 4.00 |
| S-64 | — | — | — | — | — |
| T-144 | — | — | — | — | — |
| C-3529 | 2.00 | 2.00 | 2.00 | 2.00 | 2.00 |
| T-622 | — | — | — | — | — |
| Inhibitor #1 | 0.10 | 0.10 | 0.10 | 0.10 | 0.10 |
| Inhibitor #2 | — | — | — | — | — |
| SURF #1 | 0.90 | 0.90 | 0.90 | 0.90 | 0.90 |
| Inhibitor #5 | 0.02 | 0.02 | 0.02 | 0.02 | 0.02 |
| Dispersant #1 | — | — | — | — | — |
| Dispersant #2 | — | — | — | — | — |
| Dispersant | 0.60 | 0.60 | 0.60 | 0.60 | 0.60 |
| Synergist | — | — | — | — | — |
| PB 15:3 | — | — | — | — | — |
| PB 15:4 | — | — | — | — | — |
| PR122 | — | — | — | — | — |
| PY 150 | — | — | — | — | — |

TABLE 14i-continued

| Example | K-1420 | K-1421 | K-1422 | K-1423 | K-1424 |
|---|---|---|---|---|---|
| PY 150 #2 | — | — | — | — | — |
| PB 7 | — | — | — | — | — |
| Black Pigment #2 | 1.50 | 1.50 | 1.50 | 1.50 | 1.50 |
| Total | 100.00 | 100.00 | 100.00 | 100.00 | 100.00 |
| Data | | | | | |
| Moles difunc in 1 kg of ink | 0.20 | 0.03 | 0.10 | 0.20 | 0.18 |
| Predicted Alt Tg (C.) - Fox Equation | 36.5 | 39.7 | 48.4 | 53.9 | 45.2 |

TABLE 14J

| Example | K-1425 | K-1426 | K-1427 | K-1428 | K-1429 | K-1430 |
|---|---|---|---|---|---|---|
| Ingredients | | | | | | |
| IOA | — | — | — | — | — | — |
| IBOA | 36.48 | 36.48 | 36.48 | 36.48 | 36.48 | 36.48 |
| THFA | — | — | 5.00 | 10.00 | — | — |
| PEA | 25.90 | 20.90 | 15.90 | 10.90 | 20.90 | 15.90 |
| HDDA | — | — | — | — | — | — |
| VCAP | 15.00 | 15.00 | 15.00 | 15.00 | 20.00 | 25.00 |
| DCP | — | 5.00 | 5.00 | 5.00 | — | — |
| DMAA | — | — | — | — | — | — |
| DMAEA | — | — | — | — | — | — |
| AA | — | — | — | — | — | — |
| beta-CEA | — | — | — | — | — | — |
| CN981 | 5.50 | 5.50 | 5.50 | 5.50 | 5.50 | 5.50 |
| TPO | 8.00 | 8.00 | 8.00 | 8.00 | 8.00 | 8.00 |
| DETX | 4.00 | 4.00 | 4.00 | 4.00 | 4.00 | 4.00 |
| S-64 | — | — | — | — | — | — |
| T-144 | — | — | — | — | — | — |
| C-3529 | 2.00 | 2.00 | 2.00 | 2.00 | 2.00 | 2.00 |
| T-622 | — | — | — | — | — | — |
| Inhibitor #1 | 0.10 | 0.10 | 0.10 | 0.10 | 0.10 | 0.10 |
| Inhibitor #2 | — | — | — | — | — | — |
| SURF #1 | 0.90 | 0.90 | 0.90 | 0.90 | 0.90 | 0.90 |
| Inhibitor #5 | 0.02 | 0.02 | 0.02 | 0.02 | 0.02 | 0.02 |
| Dispersant #1 | — | — | — | — | — | — |
| Dispersant #2 | — | — | — | — | — | — |
| Dispersant Synergist | 0.60 | 0.60 | 0.60 | 0.60 | 0.60 | 0.60 |
| PB 15:3 | — | — | — | — | — | — |
| PB 15:4 | — | — | — | — | — | — |
| PR122 | — | — | — | — | — | — |
| PY 150 | — | — | — | — | — | — |
| PY 150 #2 | — | — | — | — | — | — |
| PB 7 | — | — | — | — | — | — |
| Black Pigment #2 | 1.50 | 1.50 | 1.50 | 1.50 | 1.50 | 1.50 |
| Total | 100.00 | 100.00 | 100.00 | 100.00 | 100.00 | 100.00 |
| Data | | | | | | |
| Moles difunc in 1 kg of ink | 0.03 | 0.20 | 0.20 | 0.20 | 0.03 | 0.03 |
| Predicted Alt Tg (C.) - Fox Equation | 49.5 | 56.1 | 56.8 | 57.5 | 59.8 | 70.8 |

TABLE 14k

| Example | K-1431 | K-1432 | K-1433 | K-1434 | K-1435 |
|---|---|---|---|---|---|
| Ingredients | | | | | |
| IOA | — | — | — | — | — |
| IBOA | 40.47 | 41.48 | 41.27 | 35.98 | 30.95 |
| THFA | — | — | — | 10.00 | 10.00 |
| PEA | 35.02 | 35.90 | 35.73 | 16.90 | 21.40 |
| HDDA | — | — | 0.50 | — | — |
| VCAP | — | — | — | 10.00 | 10.00 |
| DCP | — | — | — | 4.00 | 4.50 |
| DMAA | — | — | — | — | — |
| DMAEA | — | — | — | — | — |
| AA | — | — | — | — | — |
| beta-CEA | — | — | — | — | — |
| CN981 | 6.00 | 5.50 | 5.47 | 6.00 | 6.00 |
| TPO | 8.00 | 8.00 | 7.96 | 8.00 | 8.00 |
| DETX | 4.00 | 4.00 | 3.98 | 4.00 | 4.00 |
| S-64 | 2.00 | — | — | — | — |
| T-144 | — | — | — | — | — |
| C-3529 | — | 2.00 | 1.99 | 2.00 | 2.00 |
| T-622 | — | — | — | — | — |
| Inhibitor #1 | 0.00 | 0.10 | 0.10 | 0.10 | 0.10 |
| Inhibitor #2 | 1.01 | 0.02 | 0.02 | 0.02 | — |
| SURF #1 | 0.90 | 0.90 | 0.90 | 0.90 | 0.90 |
| Inhibitor #5 | — | — | — | — | 0.05 |
| Dispersant #1 | — | — | — | — | — |

TABLE 14k-continued

| | Example | | | | |
|---|---|---|---|---|---|
| | K-1431 | K-1432 | K-1433 | K-1434 | K-1435 |
| Dispersant #2 | 0.74 | — | — | — | — |
| Dispersant | — | 0.60 | 0.60 | 0.60 | 0.60 |
| Synergist | — | — | — | — | — |
| PB 15:3 | — | — | — | — | — |
| PB 15:4 | — | — | — | — | — |
| PR122 | — | — | — | — | — |
| PY 150 | — | — | — | — | — |
| PY 150 #2 | — | — | — | — | — |
| PB 7 | 1.86 | — | — | — | — |
| Black Pigment #2 | — | 1.50 | 1.49 | 1.50 | 1.50 |
| Total | 100.00 | 100.00 | 100.01 | 100.00 | 100.00 |
| Data | | | | | |
| Moles difunc in 1 kg of ink | 0.04 | 0.03 | 0.05 | 0.17 | 0.18 |
| Predicted Alt Tg (C.) - Fox Equation | 28.7 | 28.7 | 28.8 | 45.6 | 38.7 |

Thus, embodiments of RADIATION CURABLE INK COMPOSITION are disclosed. One skilled in the art will appreciate that the compositions described herein can be practiced with embodiments other than those disclosed. The disclosed embodiments are presented for purposes of illustration and not limitation.

What is claimed is:

1. A radiation curable ink composition, comprising:
   a colorant; and
   a 2,2,6,6-tetramethylpiperidinyl compound, wherein the 2,2,6,6-tetramethylpiperidinyl compound includes 5 or more 2,6,6,6-tetramethylpiperidinyl groups;
   wherein the ink composition is free-radically polymerizable and the 2,2,6,6-tetramethylpiperidinyl compound is present in the radiation curable ink composition at a concentration above 0.5 wt %,
   wherein a hindered amine group of the 2,2,6,6-tetramethylpiperidinyl compound is substituted with only carbon and
   wherein the 2,2,6,6-tetramethylpiperidinyl compound is a solid at 20 degrees centigrade and does not include carbon to carbon double bonds; and
   further comprising a difunctional reactant in a range from 0.05 to 0.21 moles of difunctional reactant per kilogram of radiation curable ink composition.

2. The radiation curable ink composition of claim 1, wherein the 2,2,6,6-tetramethylpiperidinyl compound has a concentration in a range from 0.5 wt % to 15 wt % of a total radiation curable ink composition weight.

3. The radiation curable ink composition of claim 1, wherein the radiation curable ink composition includes 7 wt % or less of a trifunctional or higher functionality reactant.

4. The radiation curable ink composition of claim 1, wherein the radiation curable ink composition includes 4.5 wt % or less of a trifunctional or higher functionality reactant.

5. The radiation curable ink composition of claim 1, wherein the radiation curable ink composition includes 2 wt % or less of a trifunctional or higher functionality reactant.

* * * * *

UNITED STATES PATENT AND TRADEMARK OFFICE
CERTIFICATE OF CORRECTION

PATENT NO.       : 9,718,975 B2
APPLICATION NO.  : 14/431203
DATED            : August 1, 2017
INVENTOR(S)      : Bruce Nerad It is certified that error appears in the above-identified patent and that said Letters Patent is hereby corrected as shown below:

In the Specification

Column 4
Line 29, delete "and or" and insert -- and/or --

Column 7
Line 10, delete "ethoxyethoxyl)" and insert -- ethoxyethoxy) --

Column 14
Line 16, delete "USA).\" and insert -- USA). --

Column 16
Line 15, delete "methyhyl-," and insert -- methyl-, --

Column 33
Table 4k, Line 33, delete "14.50" and insert -- 14.20 --
Table 4k, Line 40 (first occurrence), delete "10.00" and insert -- 8.00 --
Table 4k, Line 40 (second occurrence), delete "10.00" and insert -- 8.00 --

Column 36
Table 4o, Line 45, delete "—" and insert -- 2.00 --

Column 39
Table 4s, Line 46 (first occurrence), delete "0.01" and insert -- 0.02 --
Table 4s, Line 46 (second occurrence), delete "0.01" and insert -- 0.02 --

Column 40
Table 4t, Line 5, delete "Y-407" and insert -- W-0407 --
Table 4t, Line 8 (first occurrence), delete "4.25" and insert -- 0.58 --
Table 4t, Line 8 (second occurrence), delete "4.25" and insert -- 0.58 --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*

Columns 45-46
Table 5e, Line 26, delete "SURF+#1" and insert -- SURF #1 --

Column 51
Table 5H, Line 12, delete "in1" and insert -- in 1 --